United States Patent
Hsu et al.

(10) Patent No.: US 10,334,423 B2
(45) Date of Patent: Jun. 25, 2019

(54) METHOD AND APPARATUS FOR SELF-FORMING A TREE TOPOLOGY NETWORK IN A COMMUNICATIONS NETWORK

(71) Applicant: MediaTek Inc., Hsin-Chu (TW)

(72) Inventors: Chia-Hsiang Hsu, Kaohsiung (TW); Hao-Hua Kang, Taoyuan (TW)

(73) Assignee: MEDIATEK INC., Hsin-Chu (TW)

( * ) Notice: Subject to any disclaimer, the term of this patent is extended or adjusted under 35 U.S.C. 154(b) by 249 days.

(21) Appl. No.: 15/208,045

(22) Filed: Jul. 12, 2016

(65) Prior Publication Data
US 2017/0019298 A1    Jan. 19, 2017

Related U.S. Application Data

(60) Provisional application No. 62/192,159, filed on Jul. 14, 2015.

(51) Int. Cl.
| | |
|---|---|
| H04W 8/00 | (2009.01) |
| H04W 40/24 | (2009.01) |
| H04W 48/16 | (2009.01) |
| H04W 84/18 | (2009.01) |
| H04W 76/14 | (2018.01) |
| H04W 76/15 | (2018.01) |

(52) U.S. Cl.
CPC ......... *H04W 8/005* (2013.01); *H04W 40/246* (2013.01); *H04W 48/16* (2013.01); *H04W 76/14* (2018.02); *H04W 76/15* (2018.02); *H04W 84/18* (2013.01)

(58) Field of Classification Search
CPC .... H04W 8/005; H04W 40/246; H04W 76/15
See application file for complete search history.

(56) References Cited

U.S. PATENT DOCUMENTS

| | | | | |
|---|---|---|---|---|
| 9,705,856 | B2 * | 7/2017 | Gehrmann | H04L 63/062 |
| 2004/0003111 | A1 * | 1/2004 | Maeda | H04L 45/02 |
| | | | | 709/237 |
| 2017/0208482 | A1 * | 7/2017 | Yamazaki | H04W 16/32 |

FOREIGN PATENT DOCUMENTS

KR    100695333 B1 *   3/2007    ............. H04L 12/24

* cited by examiner

*Primary Examiner* — Zhensheng Zhang
(74) *Attorney, Agent, or Firm* — McClure, Qualey & Rodack, LLP

(57) ABSTRACT

A method for self-forming a tree topology network is provided. The method is used in a communications apparatus. The method includes: broadcasting a discovery message; determining whether the communications apparatus receives one or more discovery responses from one or more nodes in a lower level of the tree topology network; and establishing a link with each node in the lower level according to the discovery responses.

12 Claims, 69 Drawing Sheets

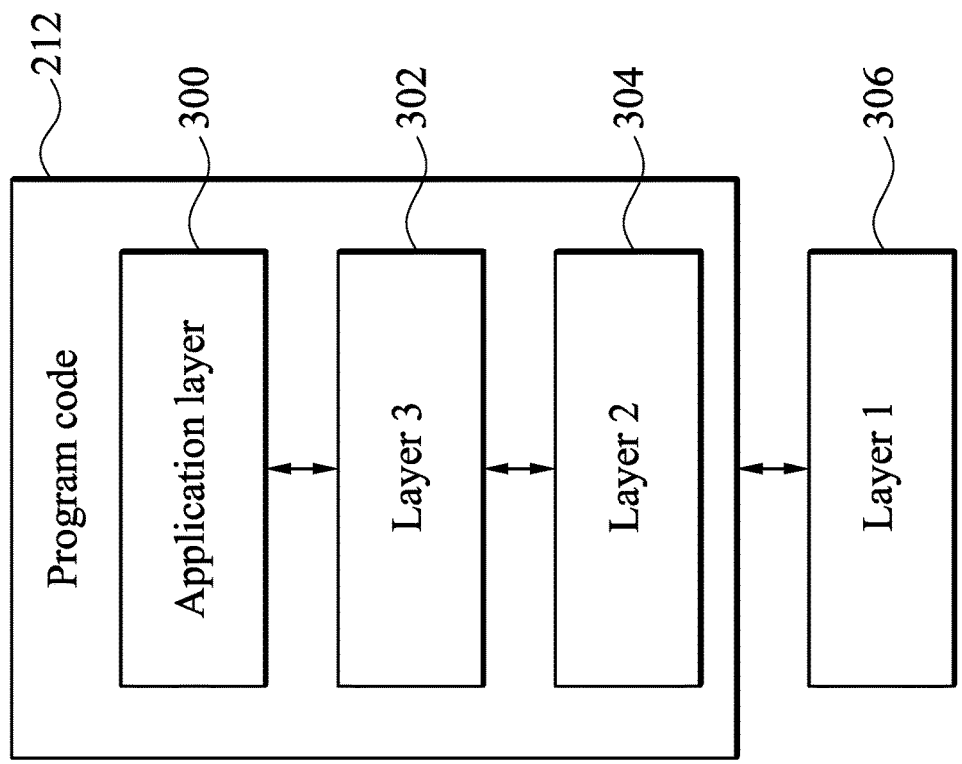

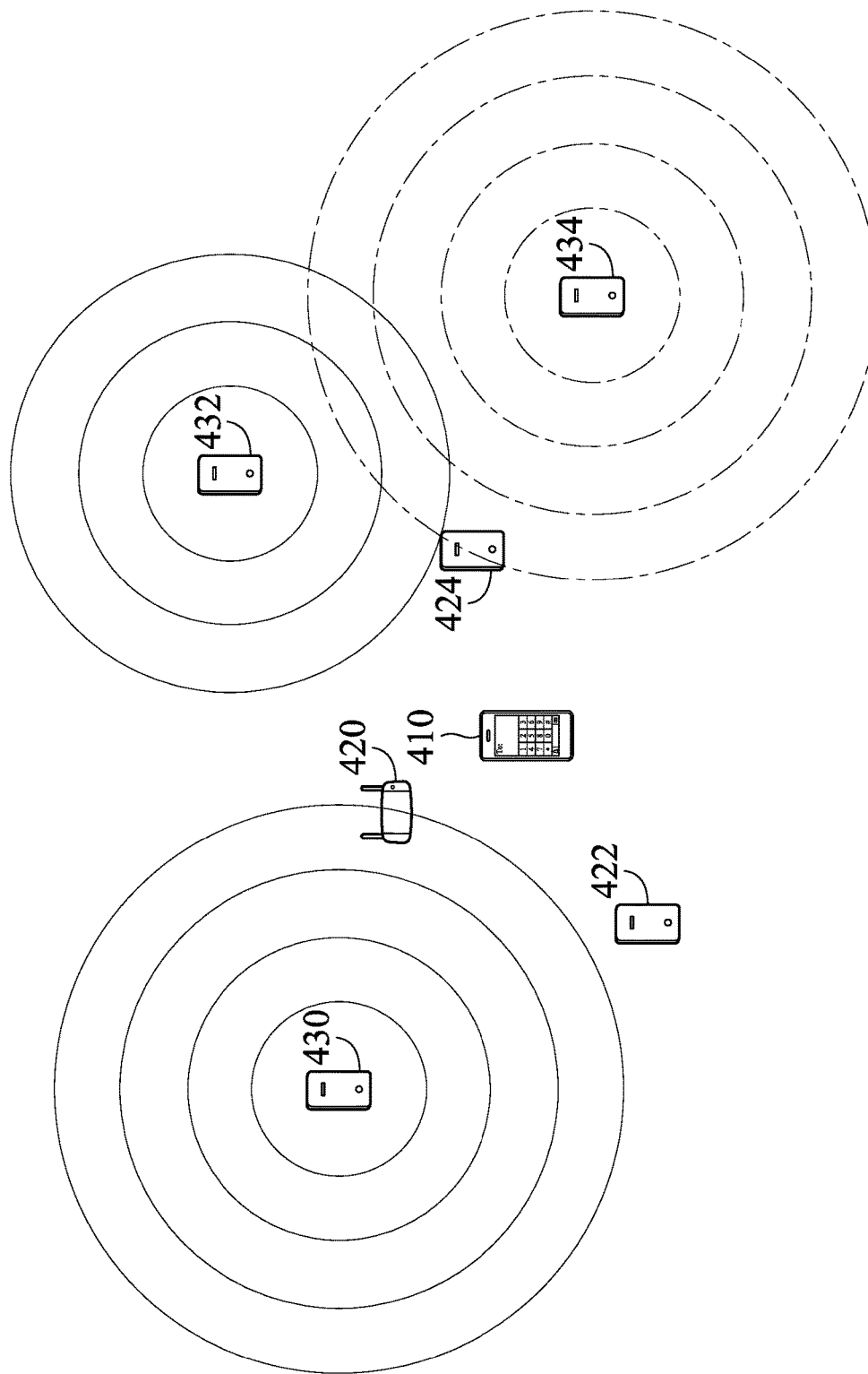

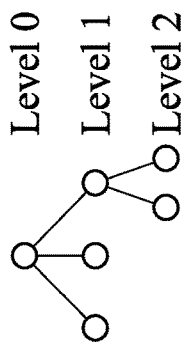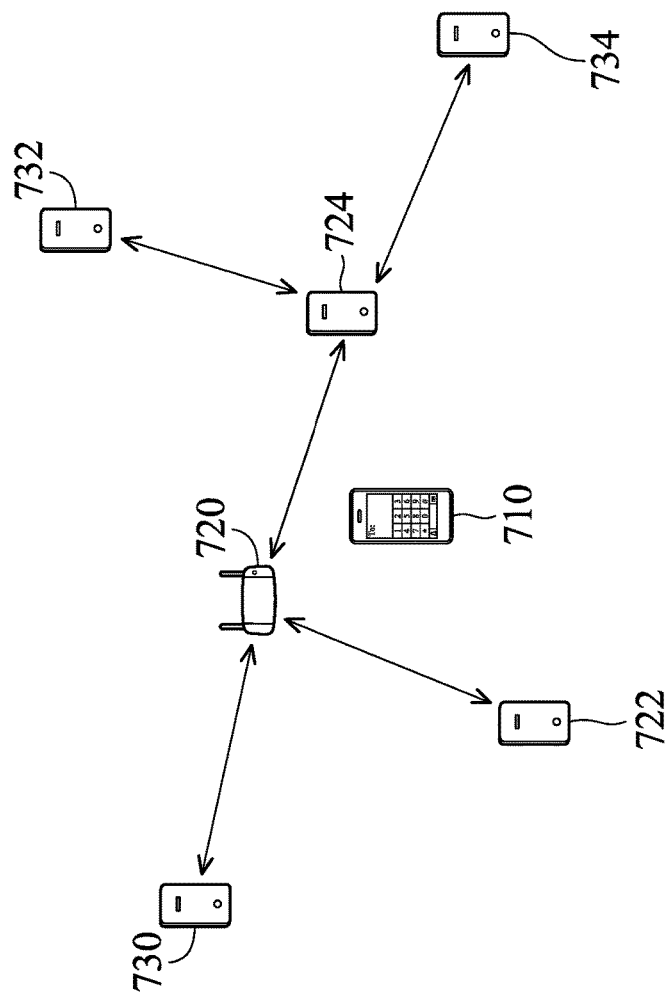
FIG. 7H

METHOD AND APPARATUS FOR SELF-FORMING A TREE TOPOLOGY NETWORK IN A COMMUNICATIONS NETWORK

CROSS REFERENCE TO RELATED APPLICATIONS

This Application claims priority of U.S. Provisional Patent Application No. 62/192,159, filed on Jul. 14, 2015, the entirety of which is incorporated by reference herein.

BACKGROUND OF THE INVENTION

Field of the Invention

Aspects of the present invention relate generally to a communications network and, more particularly, to a method and an apparatus for self-forming a tree topology network in a communications network.

Description of the Related Art

Networks are increasingly used for high-speed wireless or wired connectivity in the home, office, and in public hotspots. However, there are many applications for communications networks, such as wireless routers, Wi-Fi repeaters, and so on. The manual configuration for setting up each application can be time consuming and expensive.

Therefore, there is a need for a method and an apparatus for self-forming a tree topology network in a communications network. That is, a network with a tree topology in which the network organization and maintenance occur without human intervention.

BRIEF SUMMARY OF THE INVENTION

The following summary is illustrative only and is not intended to be limiting in any way. That is, the following summary is provided to introduce concepts, highlights, benefits and advantages of the novel and non-obvious techniques described herein. Select, not all, implementations are further described below in the detailed description. Thus, the following summary is not intended to identify essential features of the claimed subject matter, nor is it intended for use in determining the scope of the claimed subject matter.

In a preferred embodiment, the invention is directed to a method for self-forming a tree topology network. The method is used in a communications apparatus. The method comprises: broadcasting a discovery message; determining whether the communications apparatus receives one or more discovery responses from one or more nodes in a lower level of the tree topology network; and establishing a link with each node in the lower level according to the discovery responses.

In a preferred embodiment, the invention is directed to a method for self-forming a tree topology network. The method is used in a communications apparatus. The method comprises: broadcasting a root discovery message; receiving one or more root discovery responses from one or more root candidates; selecting one of the root candidates as a root node according to the root discovery responses; and transmitting a first command message to the root node for instructing the root node to broadcast a discovery message.

In a preferred embodiment, the invention is directed to a method for self-forming a tree topology network. The method is used in a communications apparatus. The method comprises: receiving a first command message from an initiating node for instructing to broadcast a discovery message; broadcasting the discovery message; determining whether the communications apparatus receives one or more discovery responses from one or more nodes in a lower level of the tree topology network; and establishing a link with each node in the lower level according to the discovery responses.

BRIEF DESCRIPTION OF THE DRAWINGS

The accompanying drawings are included to provide a further understanding of the invention, and are incorporated in and constitute a part of the present invention. The drawings illustrate implementations of the invention and, together with the description, serve to explain the principles of the invention. It is appreciable that the drawings are not necessarily in scale as some components may be shown to be out of proportion than the size in actual implementation in order to clearly illustrate the concept of the present invention.

FIG. 3 is a simplified block diagram of the program code shown in FIG. 2 in accordance with one embodiment of the invention.

FIGS. 4A~4E show a process for self-forming a tree topology network by using a one-time and outside-in fashion in accordance with one embodiment of the invention.

FIGS. 7A~7H show a process for self-forming a tree topology network by using a persistent and outside-in fashion in accordance with one embodiment of the invention.

DETAILED DESCRIPTION OF THE INVENTION

Exemplary embodiments of the present invention are described below in sufficient detail to enable those of ordinary skill in the art to embody and practice the present invention. It is important to understand that the present invention may be embodied in many alternate forms and should not be construed as being limited to the exemplary embodiments set forth herein.

Figure 1:
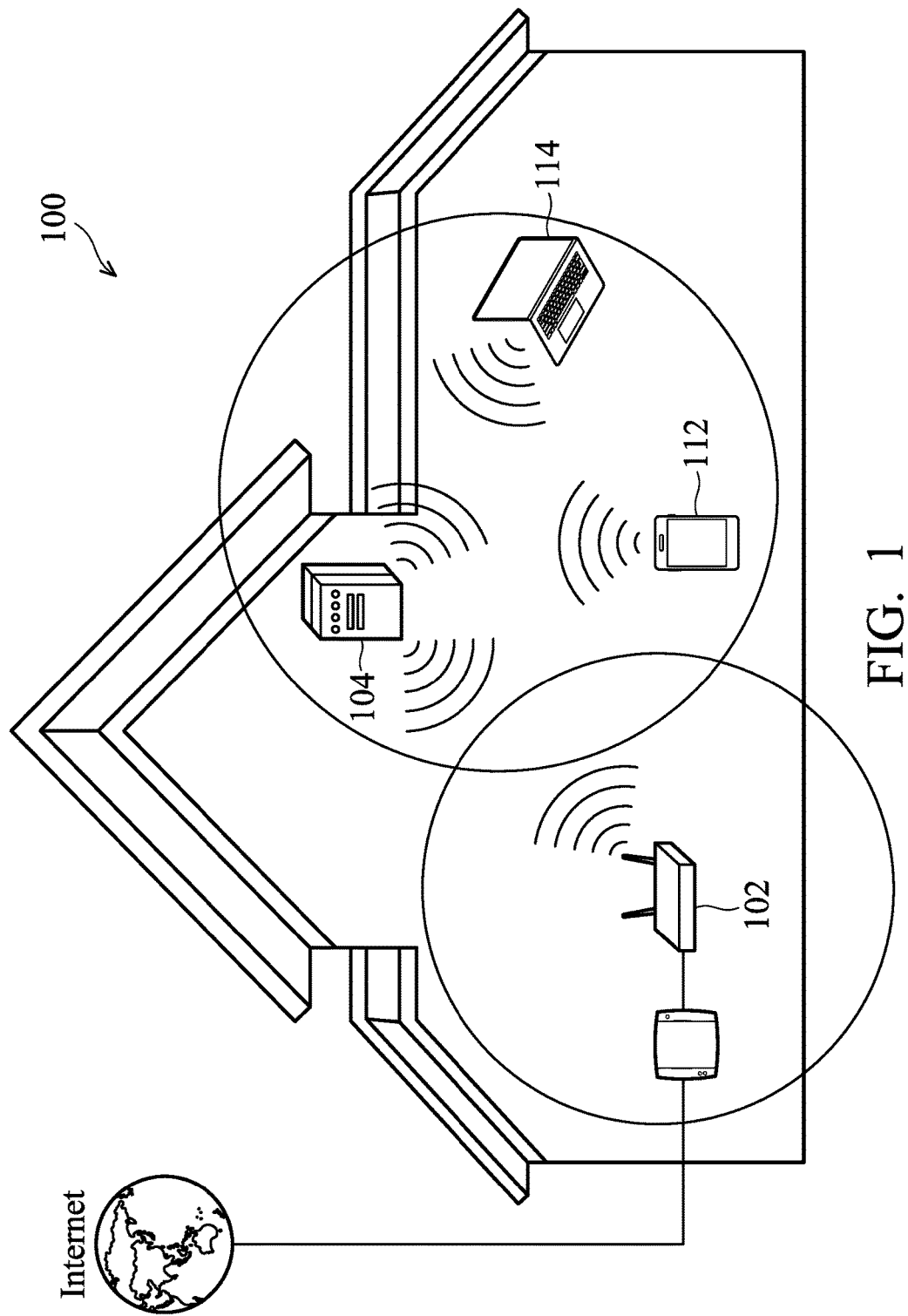
FIG. 1 illustrates a communications network according to one embodiment of the invention.

Communications networks can be formed using one or more access points (APs), which can be deployed in homes, apartments, office buildings, and as outdoor hotspots. FIG. 1 illustrates a communications network 100 according to one embodiment of the invention. In FIG. 1, user equipment 112 or user equipment 114 may connect to any AP (102 or 104) wirelessly, or via wires.

An access point (AP) may be a fixed station or a base station used for communicating with the terminals and may also be referred to as a Node B, a base station, an enhanced base station, an eNodeB, or some other terminology. User equipment (UE) may also be called a wireless communications device, terminal, access terminal or some other terminology.

Figure 2:
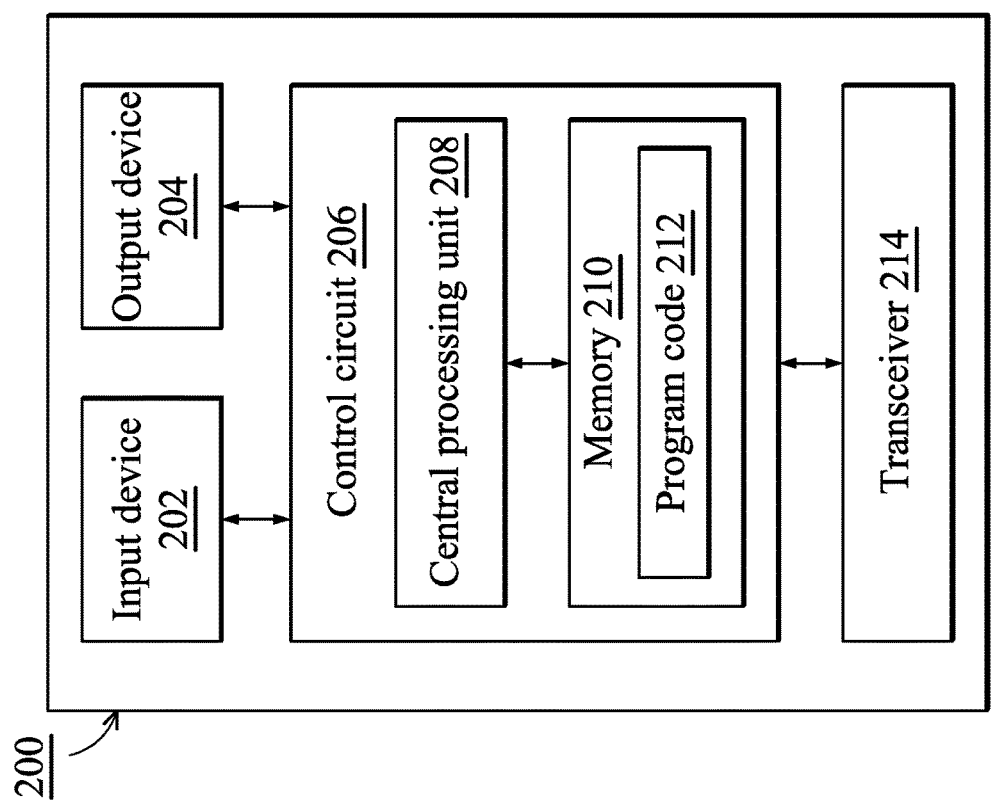
FIG. 2 is a functional block diagram of a communications apparatus according to an embodiment of the present invention.

FIG. 2 is a functional block diagram of a communications apparatus according to an embodiment of the present invention. As shown in FIG. 2, the communications apparatus 200 in a communications system can be utilized for realizing the APs 102 and 104 or the UEs 112 and 114 in FIG. 1. The communications apparatus 200 may include an input device 202, an output device 204, a control circuit 206, a processor 208 (which may be referred to as a central processor unit (CPU)), a memory 210, a program code 212, and a transceiver 214, wherein the processor 208. The control circuit 206 executes the program code 212 in the memory 210 through the processor 208, thereby controlling the operation of the communications apparatus 200. The communications apparatus 200 can receive signals input by a user through the input device 202, such as a keyboard or keypad, and can output images and sounds through the output device 204, such as a monitor or speakers. The transceiver 214 is used to receive and transmit wireless signals, delivering received signals to the control circuit 206, and outputting signals generated by the control circuit 206 wirelessly.

In addition, the communications apparatus 200 may maintain a configurable timer that may be defined to use a timeout value, wherein the timeout value can specify an amount of time to perform an action (i.e., broadcasting a message).

FIG. 3 is a simplified block diagram of the program code 212 shown in FIG. 2 in accordance with one embodiment of the invention. In this embodiment, the program code 212 includes an application layer 300, a Layer 3 portion 302, a Layer 2 portion 304, and a Layer 1 portion 306. The Layer 3 portion 302 generally performs radio resource control. The Layer 2 portion 304 generally performs link control. The Layer 1 portion 306 generally performs physical connections.

Certain embodiments of the present invention of a tree topology network can be self-formed in different fashions. Also, the detailed description of the self-forming fashions will be described below.

Please note that, in the following embodiments, the tree topology network can include a root node and one or more child or descendant nodes arranged in hierarchical levels. A node in the "top" level can be defined as the root node, and nodes in the "bottom" level can be defined as leaf nodes. The root node and the descendent nodes have a parent-child relationship between two nodes hierarchically adjacent. The parent-child relationship defines the connection between a node in the upper level of the tree and the node's direct child nodes.

One-Time and Outside-In Fashion

FIGS. 4A~4E show a process for self-forming a tree topology network by using a one-time and outside-in fashion in accordance with one embodiment of the invention. In the embodiment, the initiating node 410 is an initiator, or a root node, and the one-time tree topology network is formed from outside to inside.

Figure 4A:
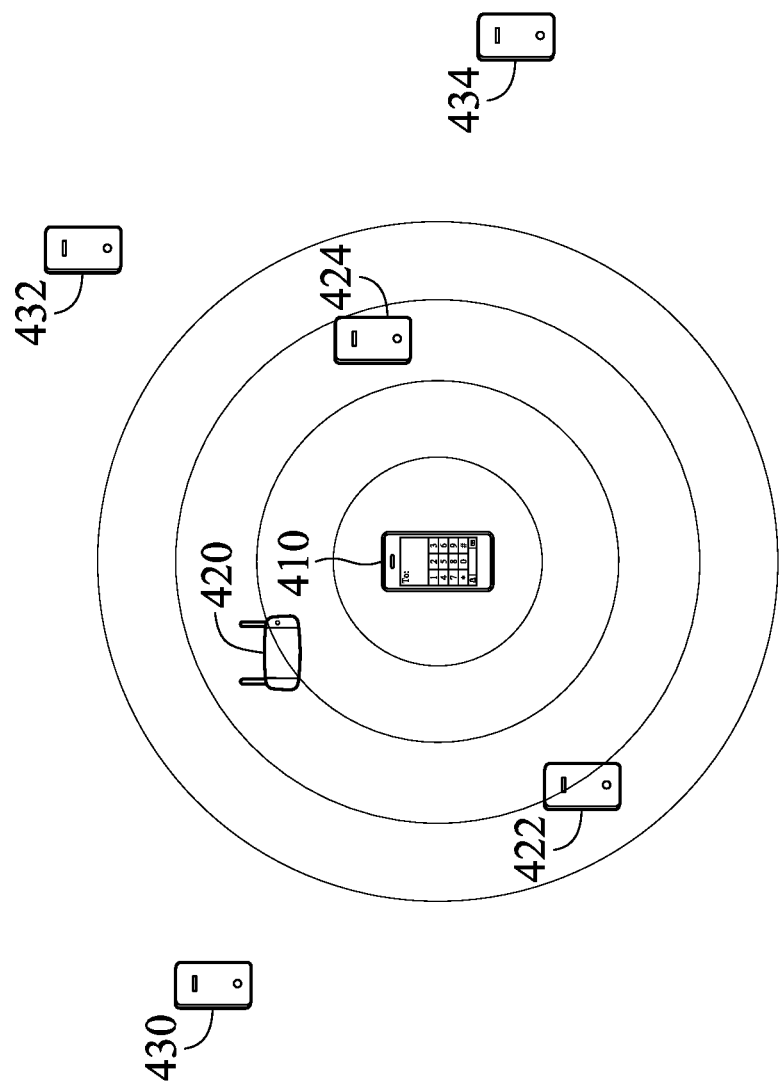
Figure 4B:
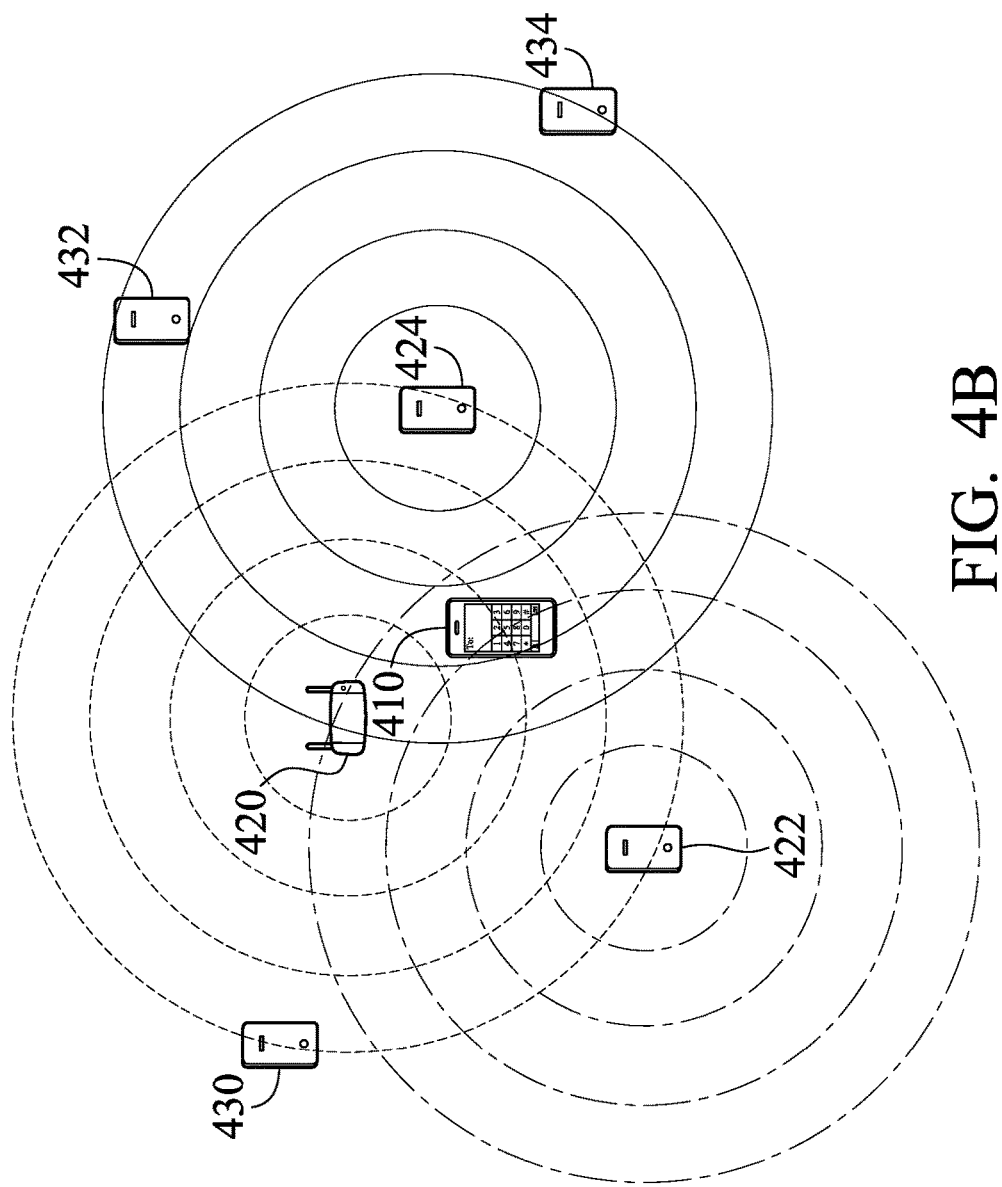

In FIG. 4A, an initiating node 410 broadcasts a first discovery message and starts a first timer using a first timeout value, wherein the first timeout value specifies an amount of time to broadcast the first discovery message. In FIG. 4B, the inner nodes 420, 422 and 424 broadcast a respective second discovery message and start a respective second timer using a respective second timeout value after receiving the first discovery message from the initiating node 410 wherein the respective second timeout value specifies an amount of time to broadcast the respective second discovery message. In FIG. 4C, the outer nodes 430, 432 and 434 broadcast a respective third discovery message and start a respective third timer using a respective third timeout value after receiving the second discovery messages from the inner nodes 420, 422 and 424, wherein the respective third timeout value specifies an amount of time to broadcast the respective third discovery message.

In the embodiment, the first timeout value is set at a longer time than the second timeout value, and the second timeout value is set at a longer time than the third timeout value, and so on. In other words, the timeout value used by the timer corresponding to the node at the higher level is longer than that at the lower level. Therefore, the one-time tree topology is formed from outside to inside. In addition, it should be noted that every node does not receive another discovery message after receiving one discovery message.

Figure 4D:
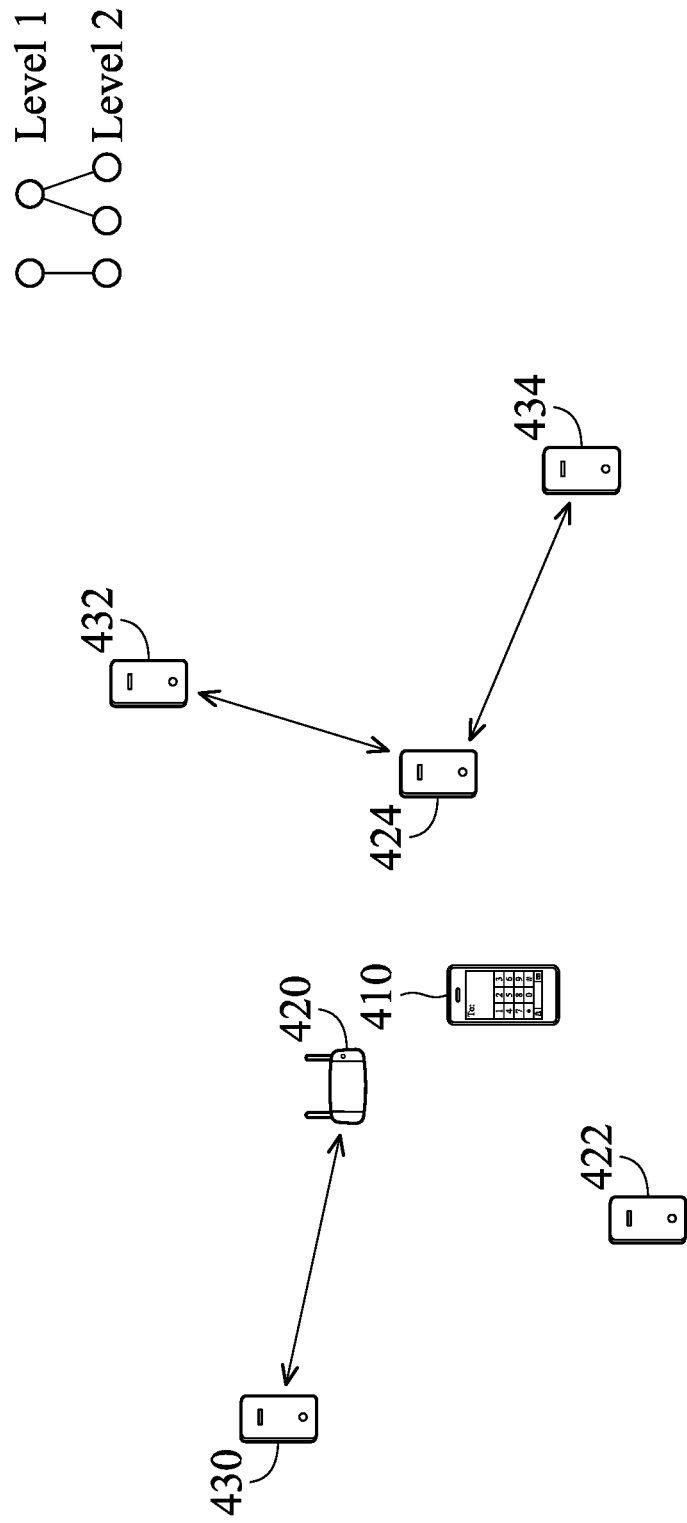

In FIG. 4D, after the respective third timeout values of the outer nodes 430, 432 and 434 elapse, the outer nodes 430, 432 and 434 may establish links with the inner nodes 420, 422 and 424 according to the second discovery messages. The corresponding tree topology for the outer nodes and the inner nodes is shown at the right side of FIG. 4D.

Figure 4E:
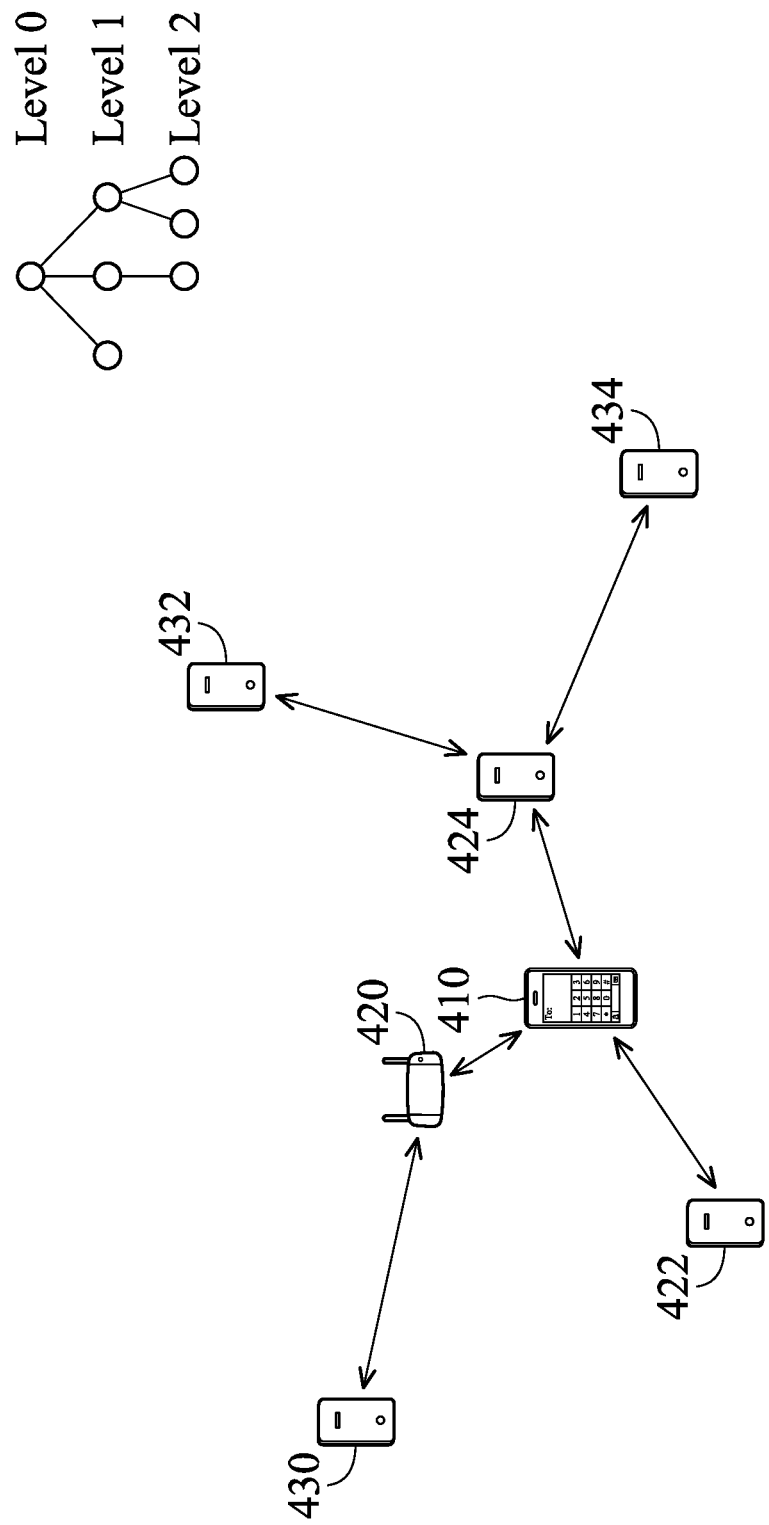

In FIG. 4E, after the respective second timeout values of the inner nodes 420, 422 and 424 elapse, the inner nodes 420, 422 and 424 may establish links with the initiating node 410 according to the first discovery messages. The tree topology is completed after all links are established and is shown at the right side of FIG. 4E. In the tree topology, the initiating node 410 (or the root node) is referred to as "level 0." The child nodes are at "level 1" and so on. "Level 1" as used herein is a lower level in the tree topology than "level 0." Likewise, "Level 1" is a higher level in the tree topology than "level 2." Since the initiating node 410 which is the root node can be moved from one location to another, the tree topology network can vary with the initiating node 410. Therefore, the tree topology network can be considered as a "one-time" tree topology network.

FIGS. 4F~4J show a joining process, which is how a new node joins the one-time tree topology of FIG. 4E in accordance with one embodiment of the invention. Before the joining process, the initiating node 410 may receive a trigger invitation message input by a user, wherein the trigger invitation message is used to trigger the joining process.

Figure 4F:
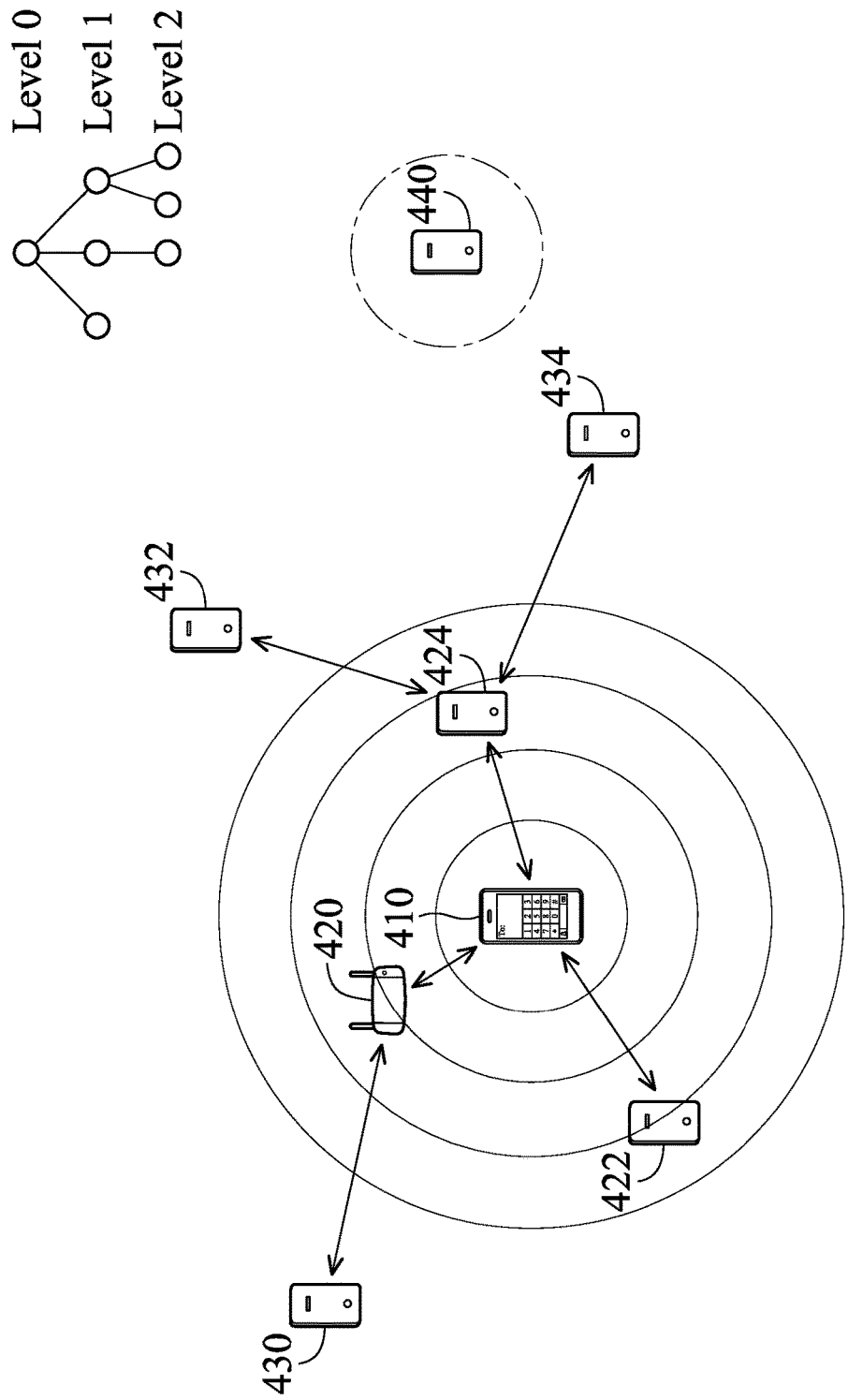
FIGS. 4F~4J show a joining process, which is how a new node joins the one-time tree topology of FIG. 4E in accordance with one embodiment of the invention.
Figure 4G:
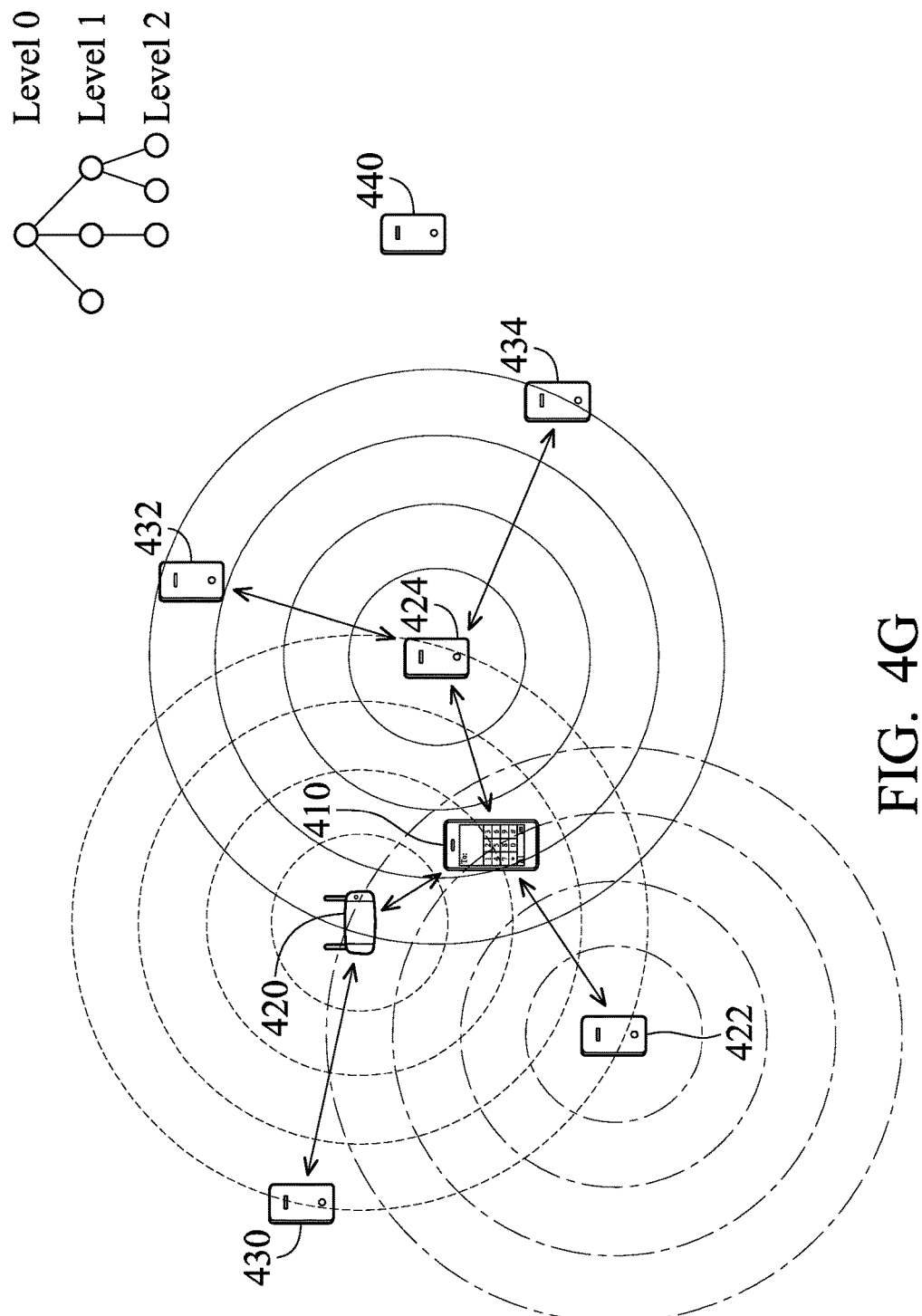
Figure 4H:
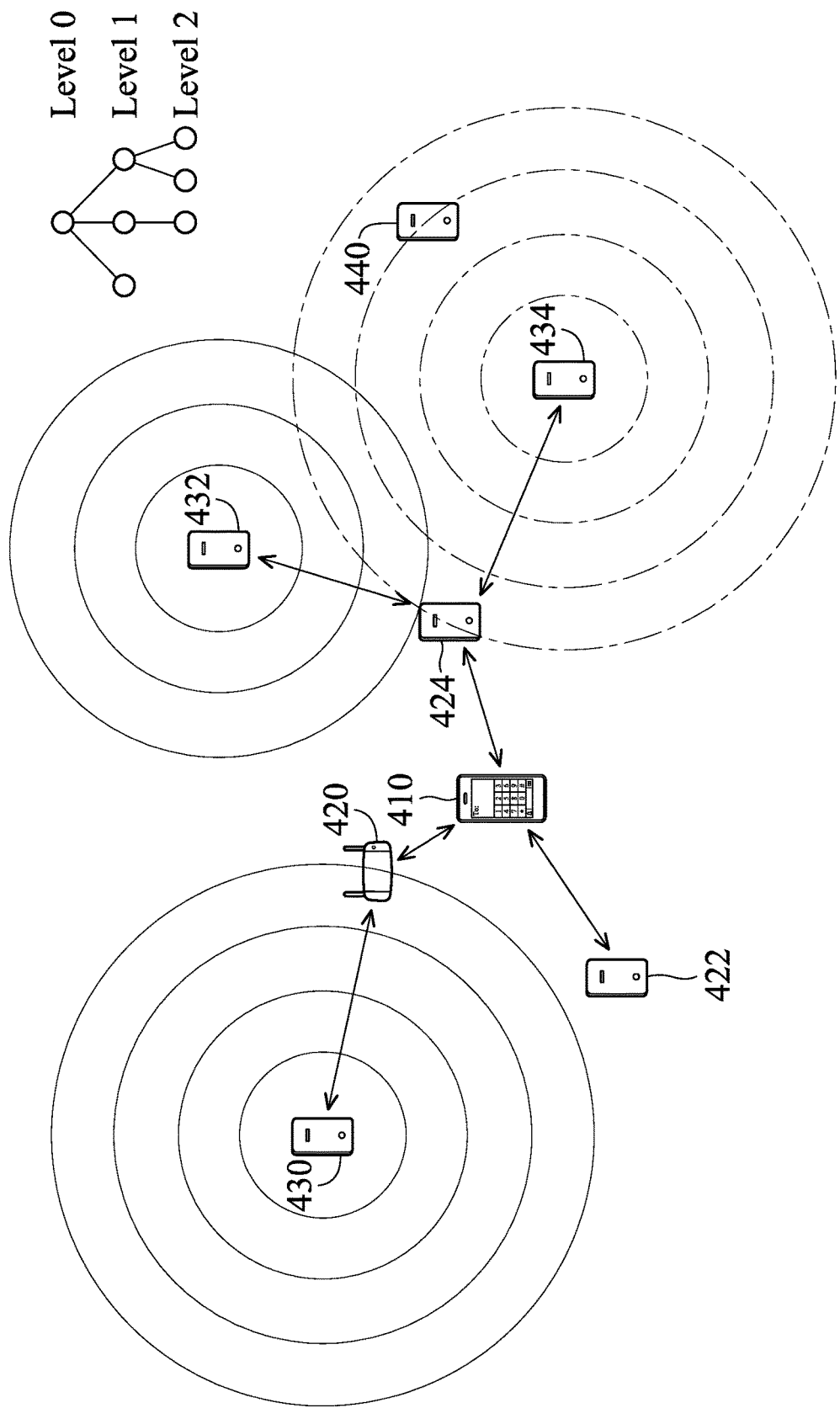

In FIG. 4F, the initiating node 410 broadcasts a first invitation message and starts a fourth timer using a fourth timeout value, wherein the fourth timeout value specifies an amount of time to broadcast the first invitation message. In FIG. 4G, the inner nodes 420, 422 and 424 broadcast a respective second invitation message and start a fifth timer using a fifth timeout value after receiving the first invitation messages from the initiating node 410, wherein the fifth timeout value specifies an amount of time to broadcast the fifth invitation message. In FIG. 4H, the outer nodes 430, 432 and 434 broadcast a respective third invitation message and start a sixth timer using a sixth timeout value after receiving the respective second invitation messages from the inner nodes 420, 422 and 424, wherein the sixth timeout value specifies an amount of time to broadcast the sixth invitation message.

Figure 4I:
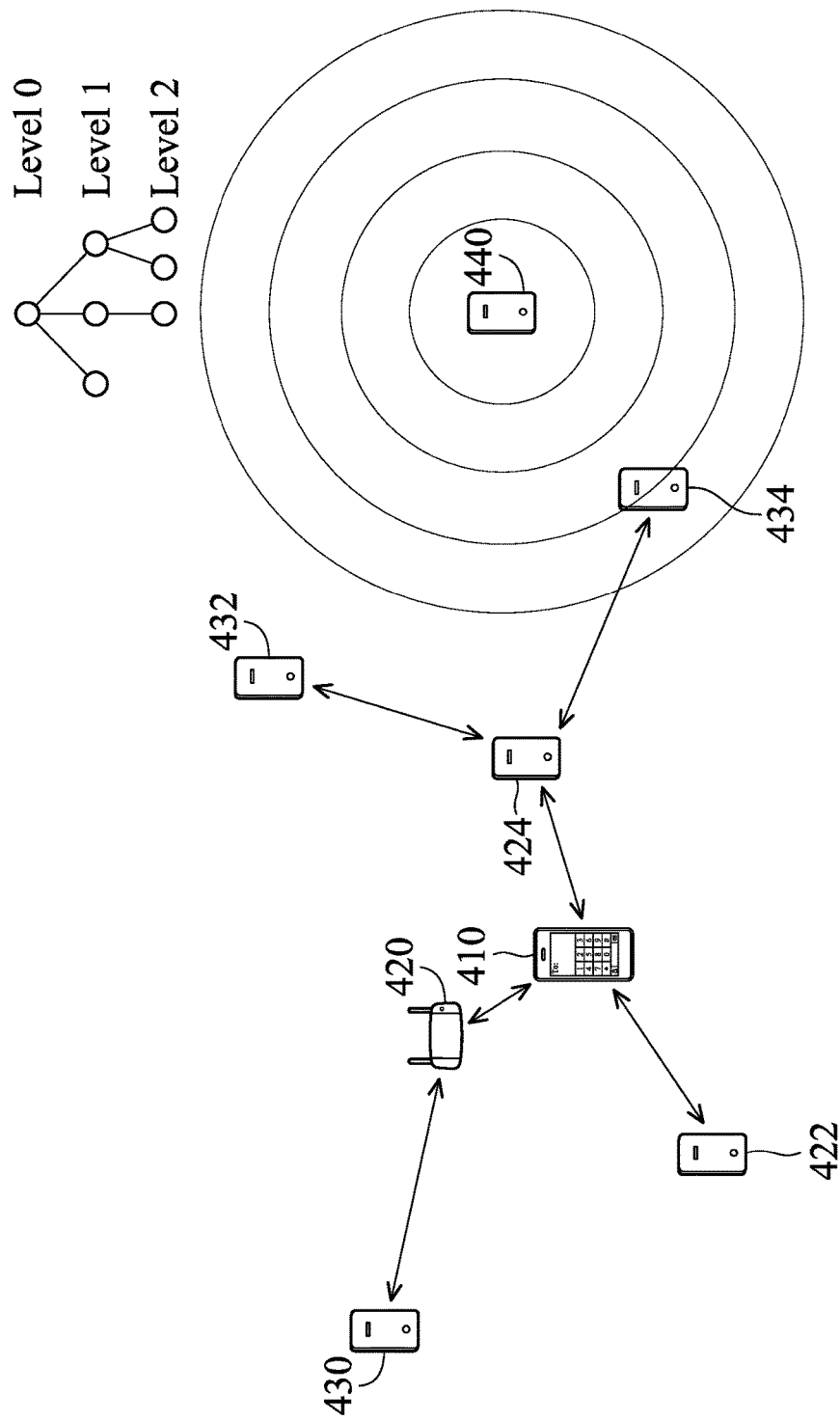
Figure 4J:
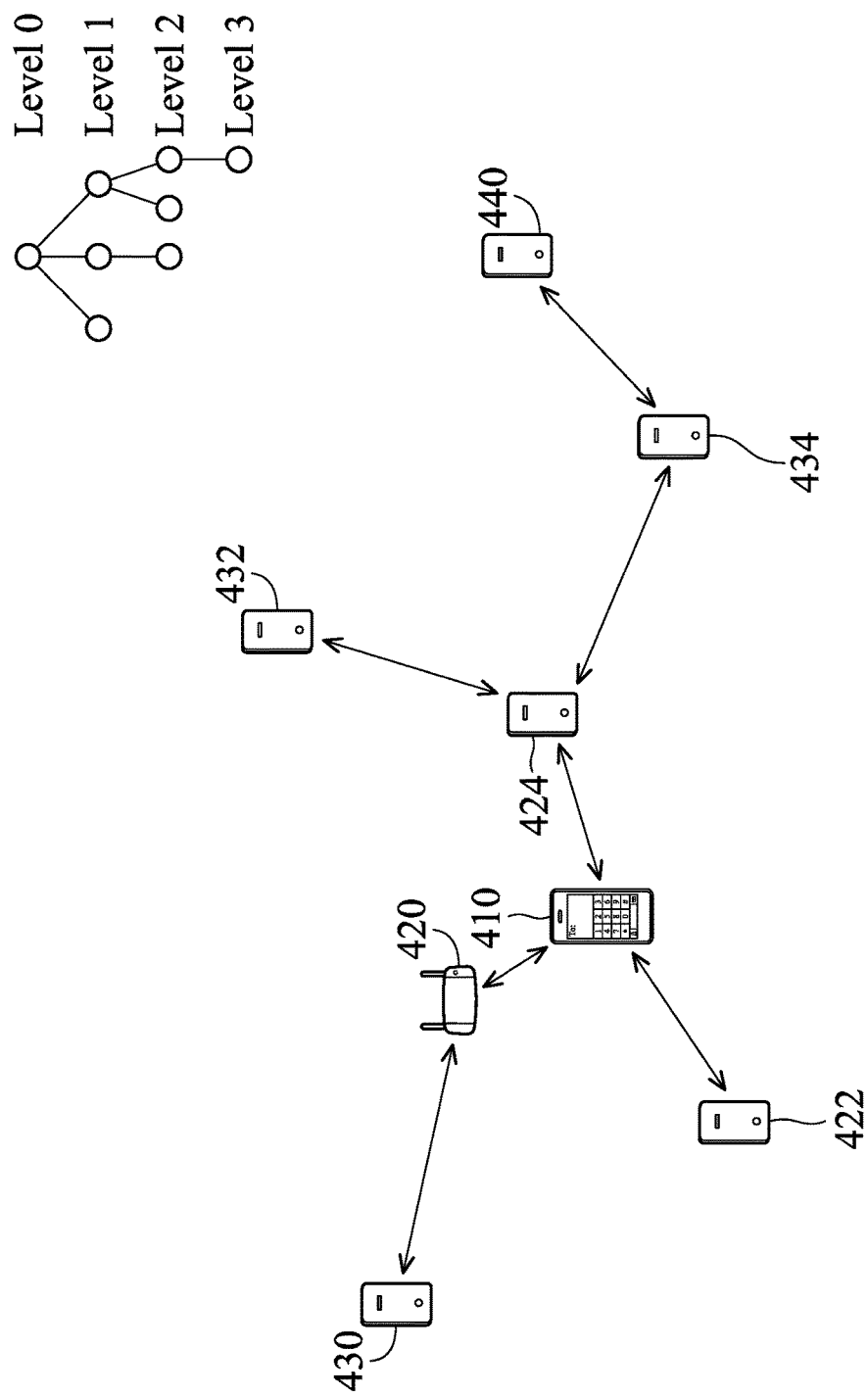

In FIG. 4I, the new node 440 broadcasts a new invitation message and starts a new timer using a new timeout value after receiving the third invitation message from the outer node 434, wherein the new timeout value specifies an amount of time to broadcast the new invitation message. In FIG. 4J, after the new timeout value of the new node 440 elapses, the new node 440 may establish a link with the outer node 434 according to the third invitation message, and the joining process is completed. The new one-time tree topology is shown at the right side of FIG. 4J. In the new one-time tree topology, since the new node 440 is connected to the outer node 434 of level 2, the new node 440 is at "level 3" in the new one-time tree topology which is lower than level 2.

In the embodiment, the fourth timeout value is set at a longer time than the fifth timeout value, and the fifth timeout value is set at a longer time than the sixth timeout value, and so on. In addition, it should be noted that every node does not receive another invitation message after receiving one invitation message.

Figure 5:
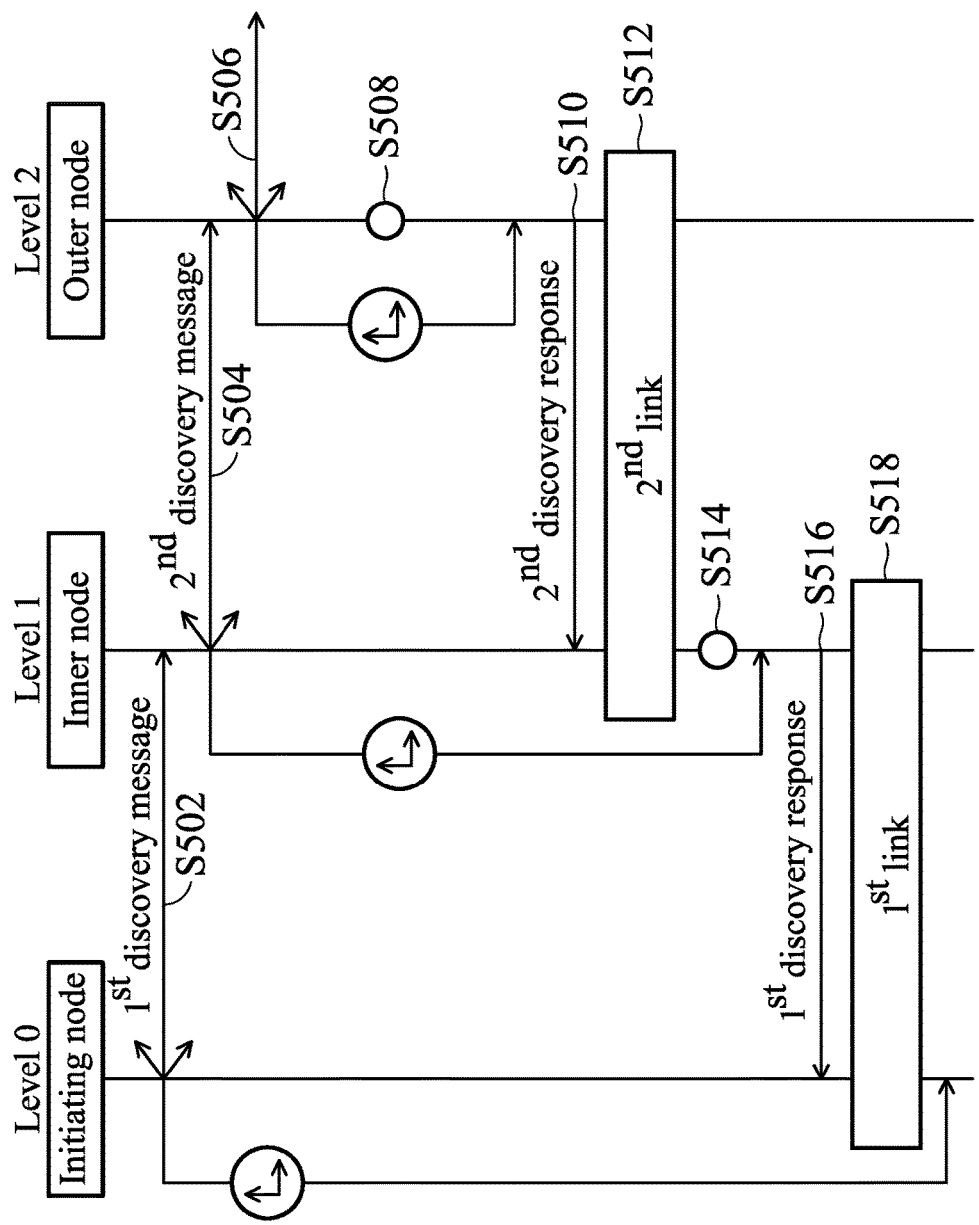
FIG. 5 is a communication flow diagram illustrating a process for self-forming a tree topology network through a one-time and outside-in fashion in accordance with one embodiment of the invention.

FIG. 5 is a communication flow diagram 500 illustrating a process for self-forming a tree topology network through a one-time and outside-in fashion in accordance with one embodiment of the invention with reference to FIGS. 4A~4E.

In step S502, the initiating node at level 0 broadcasts a first discovery message and then starts a first timer using a first timeout value, wherein the first timeout value specifies an amount of time to broadcast the first discovery message. In step S504, an inner node at level 1 broadcasts a second discovery message and then starts a second timer using a second timeout value after receiving the first discovery message from the initiating node, wherein the second timeout value specifies an amount of time to broadcast the second discovery message. In step S506, an outer node at level 2 broadcasts a third discovery message and then starts a third timer using a third timeout value after receiving the second discovery message from the inner node at level 1, wherein the third timeout value specifies an amount of time to broadcast the third discovery message. In step S508, the outer node at level 2 determines whether the outer node receives one or more third discovery responses from one or more nodes at a lower level which is lower than level 2. After determining that the outer node has not received any third discovery responses from the nodes at the lower level which is lower than level 2 and the third timeout value elapses, in step S510, the outer node at level 2 transmits the second discovery response to the inner node at level 1 according to the second discovery message to establish a second link with the inner node at level 1. In step S512, the outer node at level 2 establishes the second link with the inner node at level 1.

Next, in step S514, the inner node at level 1 determines whether the inner node receives one or more second discovery responses from one or more nodes at level 2. After determining that the inner node receives the second discovery response from the outer node at level 2 and the second timeout value elapses, in step S516, the inner node transmits the first discovery response to the initiating node at level 0 according to the first discovery message to establish a first link with the initiating node at level 0. In step S518, the initiating node at level 0 establishes the first link with the inner node at level 1. When the first timeout value elapses, the process for self-forming the one-time tree topology network is complete.

Figure 6:
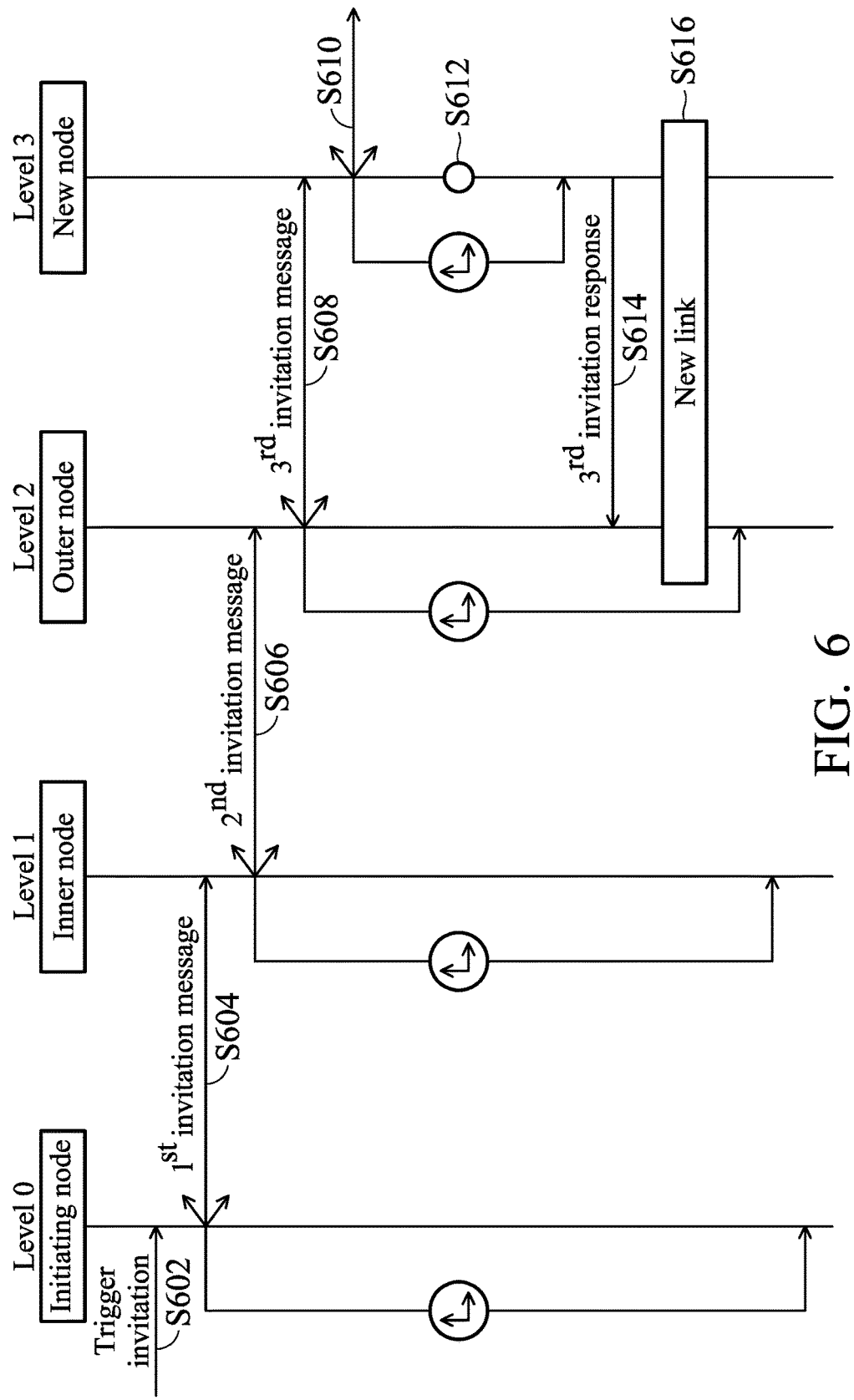
FIG. 6 is a communication flow diagram illustrating a joining process of a new node in the one-time tree topology network shown in FIG. 5 in accordance with one embodiment of the invention.

FIG. 6 is a communication flow diagram 600 illustrating that a joining process of a new node in the one-time tree topology network shown in FIG. 5 in accordance with one embodiment of the invention with reference to FIGS. 4F~4J.

After the one-time tree topology network is complete, the initiating node can be triggered to perform the joining process of a new node. In step S602, the initiating node at level 0 may receive a trigger invitation message from a user. In step S604, the initiating node broadcasts a first invitation message, and then starts a fourth timer using a fourth timeout value after receiving the trigger invitation message, wherein the fourth timeout value specifies an amount of time to broadcast the first invitation message. In step S606, the inner node at level 1 can broadcast a second invitation message and then starts a fifth timer using a fifth timeout value after receiving the fifth invitation message, wherein the fifth timeout value specifies an amount of time to broadcast the second invitation message. In step S608, the outer node at level 2 can broadcast a third invitation message and then starts a sixth timer using a sixth timeout value after receiving the second invitation message, wherein the sixth timeout value specifies an amount of time to broadcast the third invitation message. In step S610, a new node can broadcast a new invitation message and then starts a new timer using a new timeout value after receiving the third invitation message, wherein the new timeout value specifies an amount of time to broadcast the new invitation message.

Next, in step S610, the new node determines whether the new node receives one or more new invitation responses from another new node. If the new node does not receive any new invitation responses and the new timeout value elapses, in step S612, the new node transmits a third invitation response to the outer node according to the third invitation message to establish a new link with the outer node. In step S614, the new node establishes the new link with the outer node. When the first, second, and third timeout value elapse, the joining process of the new node is complete. Since the new node establishes the new link with the outer node at level 2, the new node becomes a leaf node at level 3 in the tree topology network.

Persistent and Outside-In Fashion

FIGS. 7A~7H show a process for self-forming a tree topology network by using a persistent and outside-in fashion in accordance with one embodiment of the invention. In the embodiment, the initiating node 710 may instruct a node as a root node to form a persistent tree topology network from outside to inside.

Figure 7A:
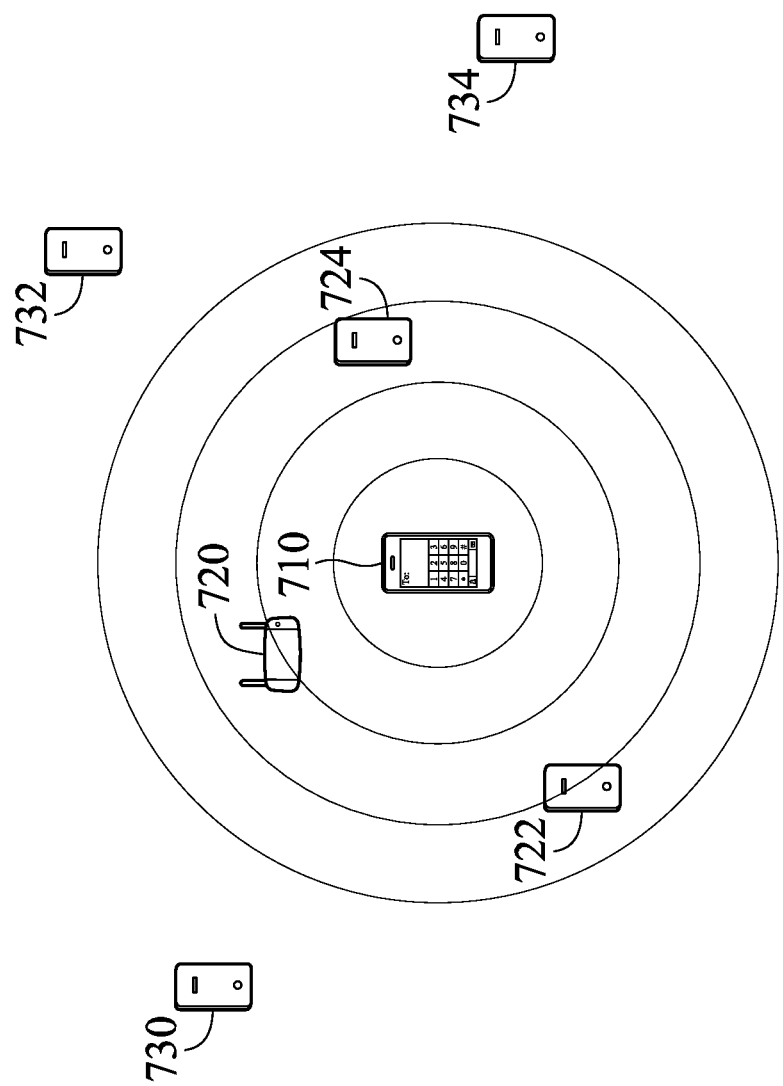
Figure 7B:
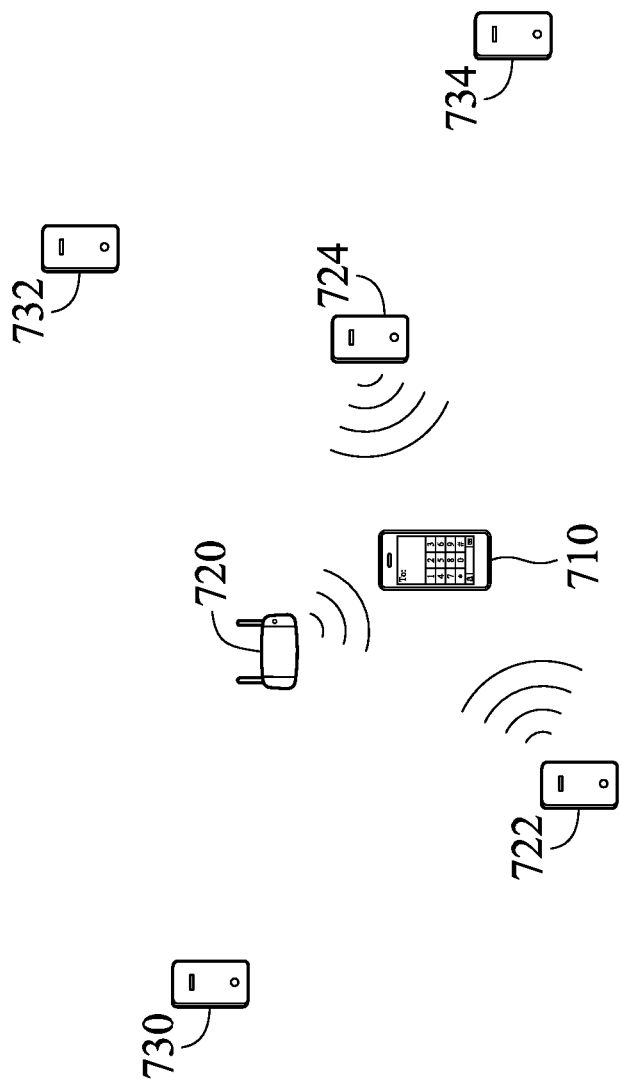
Figure 7C:
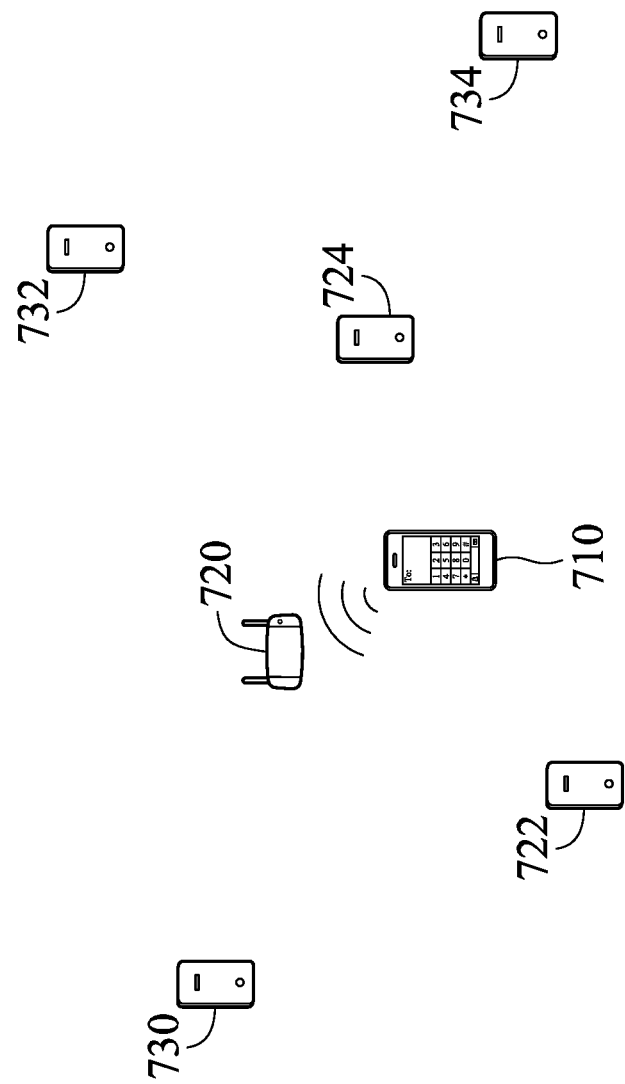

In FIG. 7A, an initiating node 710 broadcasts a root discovery message and starts a first timer using a first timeout value, wherein the first timeout value specifies an amount of time to broadcast the root discovery message. In FIG. 7B, the nodes 720, 722 and 724 transmit a respective root discovery response to the initiating node 710 after receiving the root discovery message from the initiating node 710, wherein the nodes 720, 722 and 724 receiving the root discovery message can be called as root candidates. Next, the initiating node 710 can select one of the root candidates as a root node according to the root discovery responses after the first timeout value elapses. In order to provide a clear way of illustrating the concept of the invention, it is assumed that the initiating node 710 selects the node 720 as the root node. In FIG. 7C, the initiating node 710 transmits a first command message to the root node 720 for instructing the root node 720 to broadcast a first discovery message.

Figure 7D:
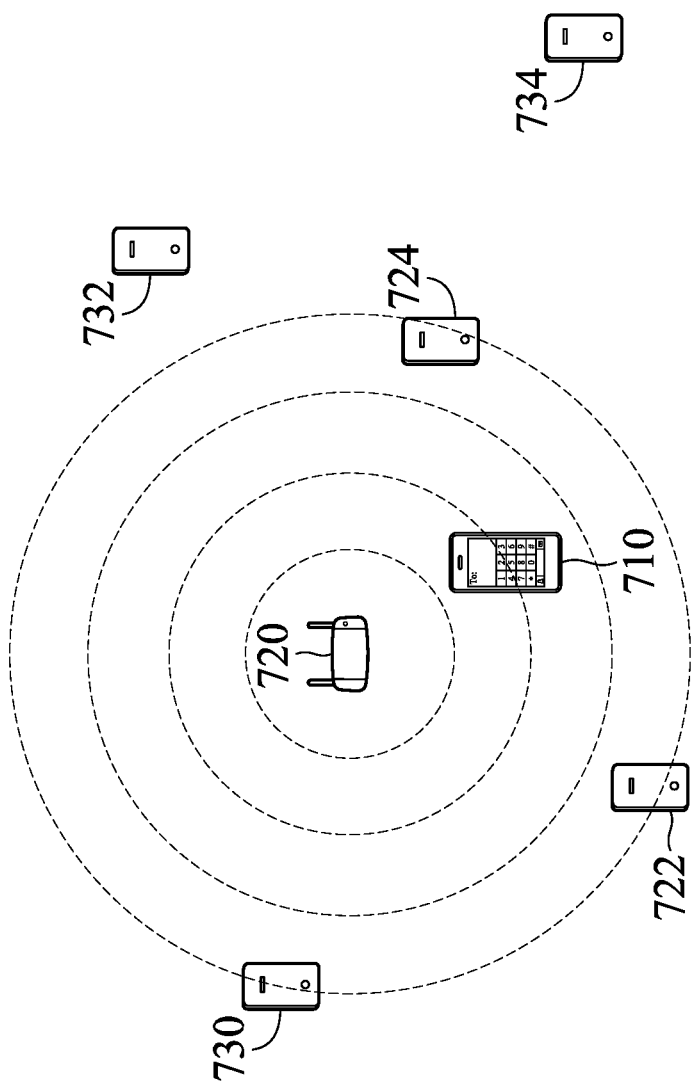
Figure 7E:
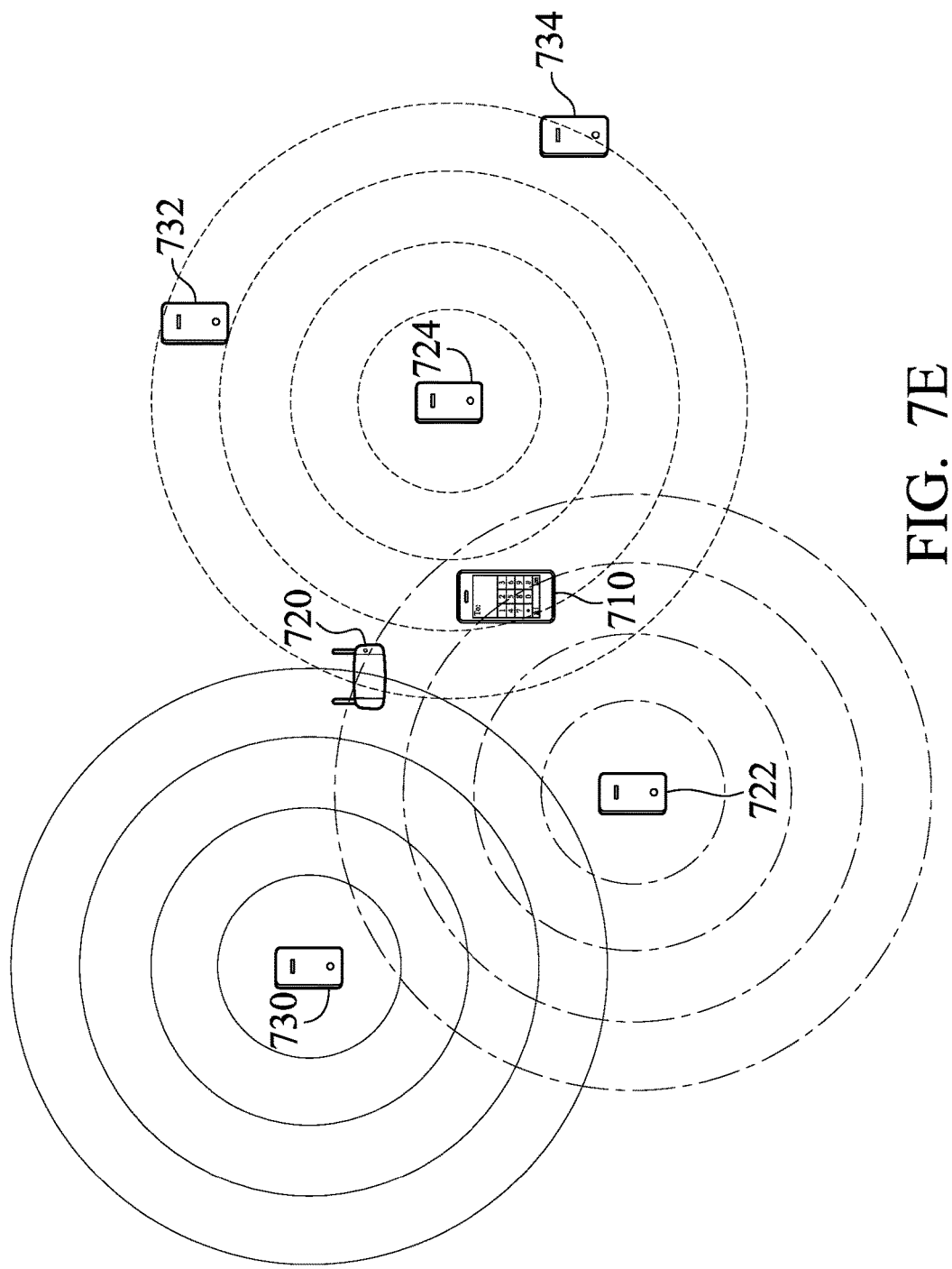
Figure 7F:
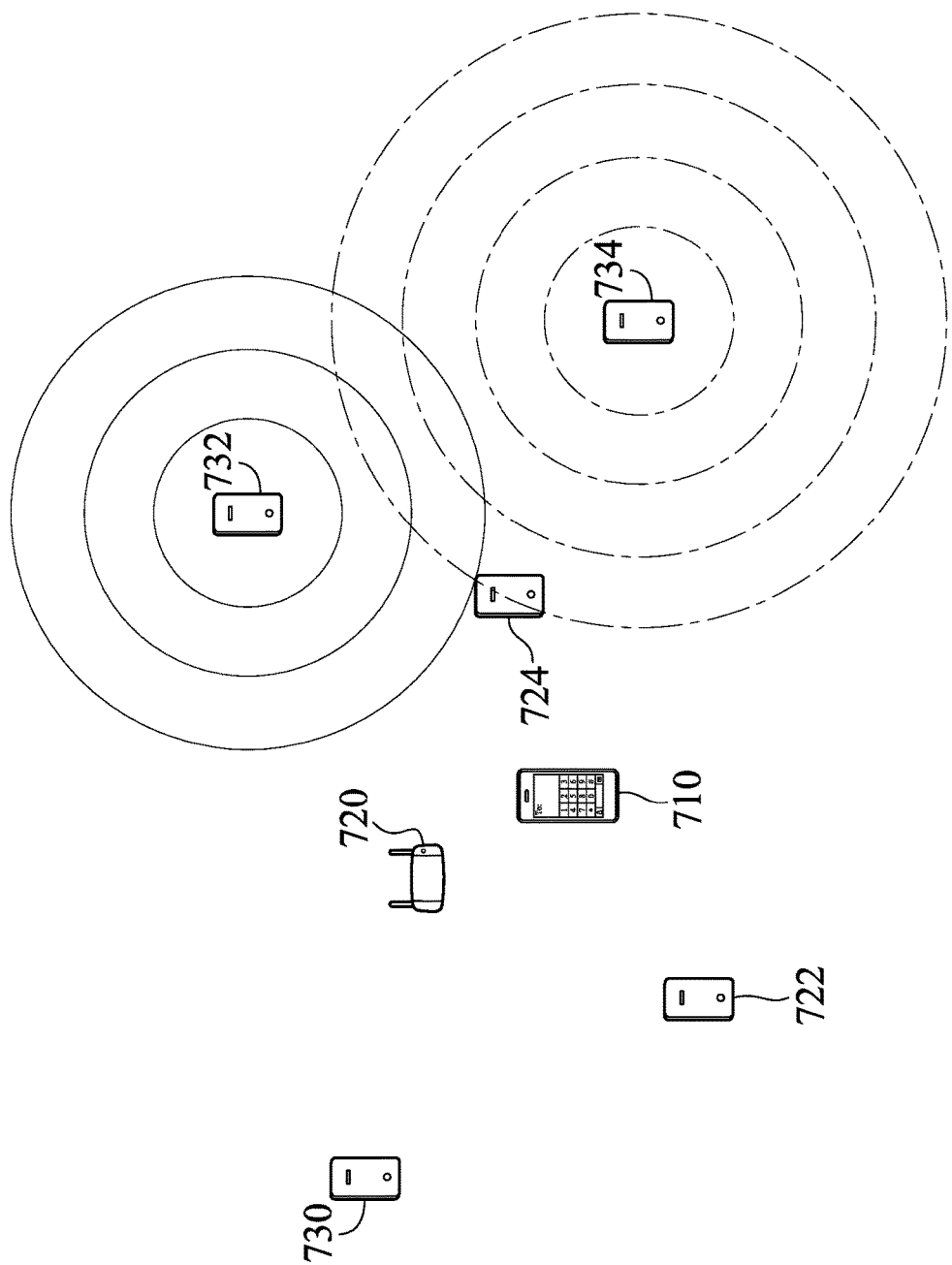

In FIG. 7D, the root node 720 broadcasts the first discovery message and starts a second timer using a second timeout value after receiving the first command message, wherein the second timeout value specifies an amount of time to broadcast the first discovery message. In FIG. 7E, the inner node 722, 724 and 730 broadcast the respective second discovery message and starts a third timer using a third timeout value after receiving the first discovery message, wherein the third timeout value specifies an amount of time to broadcast the second discovery message. In FIG. 7F, the outer nodes 732 and 734 broadcast the respective third discovery message and starts a fourth timer using a fourth timeout value after receiving the second discovery messages from the inner nodes 722, 724 and 730, wherein the fourth timeout value specifies an amount of time to broadcast the third discovery message.

Figure 7G:
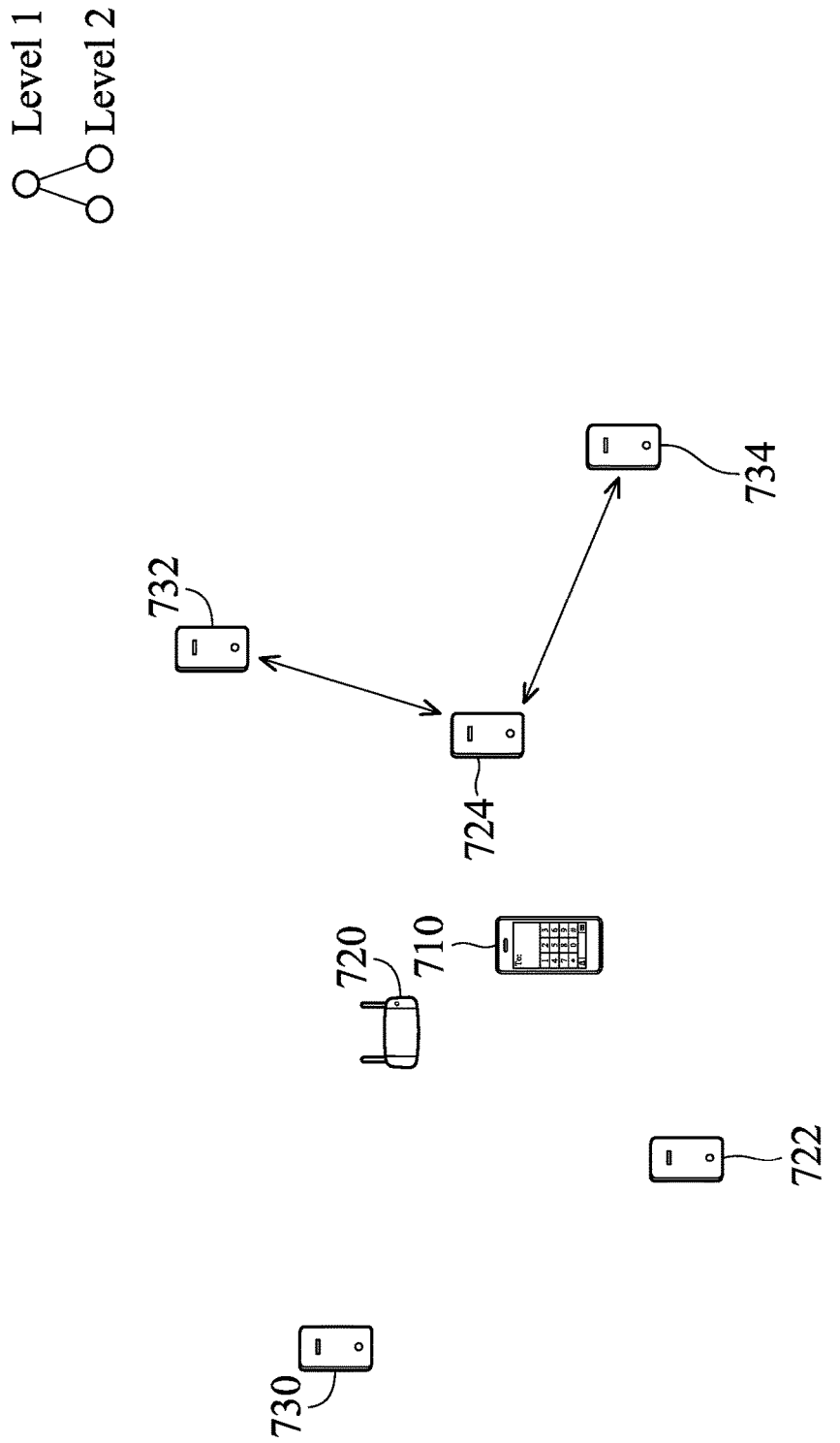

In FIG. 7G, after the respective fourth timeout value of the outer nodes 732 and 734 elapses, the outer nodes 732 and 734 may establish links with the inner nodes 722, 724 and 730 according to the second discovery messages. The corresponding tree topology for the outer nodes and the inner nodes is shown at the right side of FIG. 7G.

In FIG. 7H, after the respective third timeout value of the inner nodes 722, 724 and 730 elapses, the inner nodes 722, 724 and 730 may establish the links with the root node 720 according to the first discovery messages. The tree topology is completed after all links are established and is shown at the right side of FIG. 7H. In the tree topology, the root node 720 is referred to as "level 0." The child nodes are at "level 1" and so on. "Level 1" as used herein is a lower level in the tree topology than "level 0." Likewise, "Level 1" is a higher level in the tree topology than "level 2." Since the initiating node 710 does not be included in the tree topology network and the tree topology network does not vary with the initiating node 710, the tree topology network can be considered as a "persistent" tree topology network.

In the embodiment, it is not limited to the first timeout value used by the first timer since the initiating node does not belong to the nodes in tree topology network. Except for the first timeout value, the second timeout value is set at a longer time than the third timeout value, and the third timeout value is set at a longer time than the fourth timeout value, and so on. In other words, the timeout value used by the timer corresponding to the node at the higher level is longer than that at the lower level. Therefore, the persistent tree topology is formed from outside to inside. In addition, it should be noted that every node does not receive another discovery message after receiving one discovery message.

FIGS. 7I~7N show a joining process, which is how a new node joins the tree topology of FIG. 7H in accordance with one embodiment of the invention. Before the joining process, the initiating node 710 may receive a trigger invitation message input by a user, wherein the trigger invitation message is used to trigger the joining process.

Figure 7I:
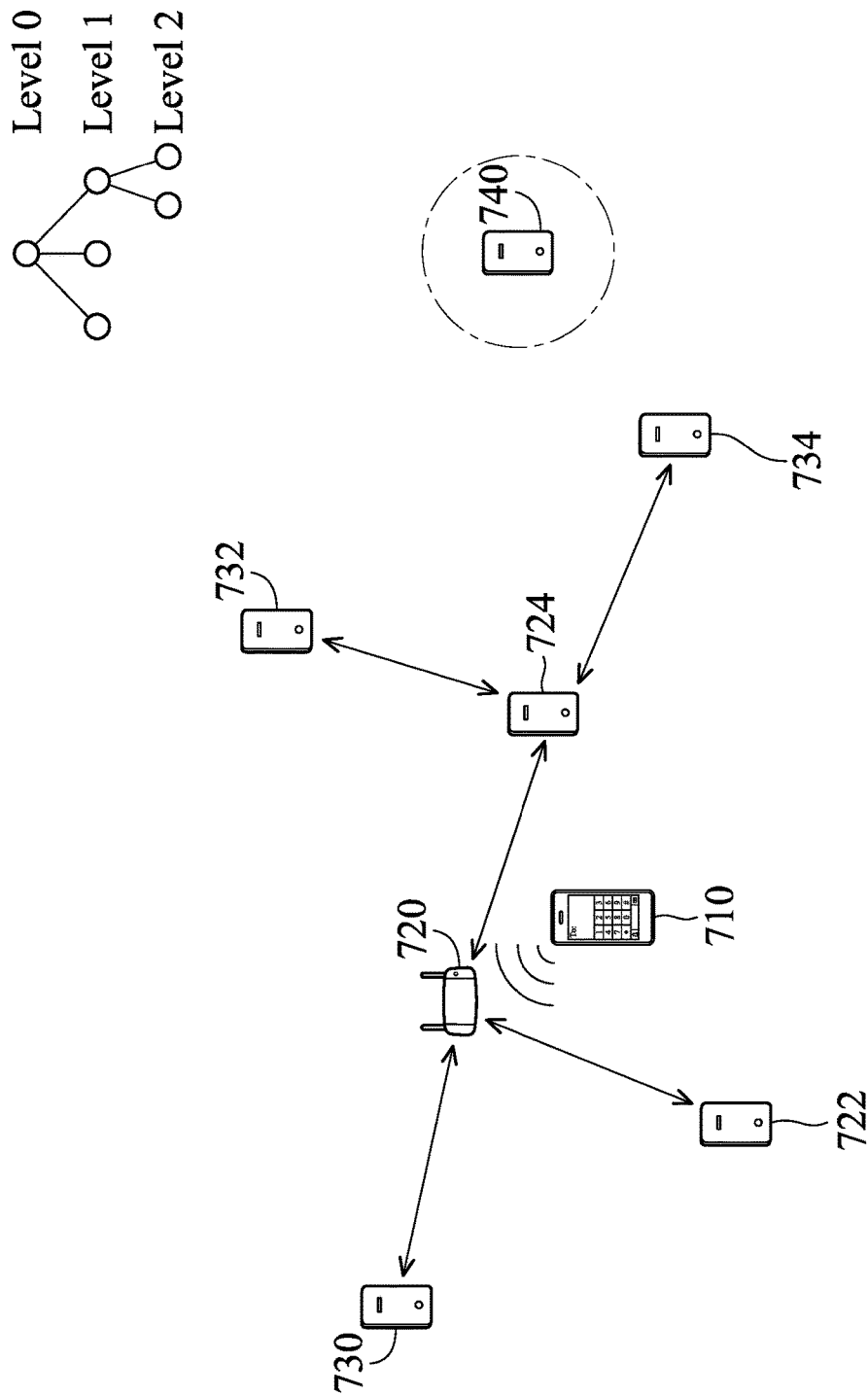
FIGS. 7I~7N show a joining process, which is how a new node joins the tree topology of FIG. 4H in accordance with one embodiment of the invention.

In FIG. 7I, the initiating node 710 transmits a second command to the root node 720 to instruct the root node 720 to broadcast a first invitation message. In another embodiment, the initiating node 710 can transmit the second command to any child node in the persistent tree topology network for instructing the specific child node to broadcast the first invitation message.

Figure 7J:
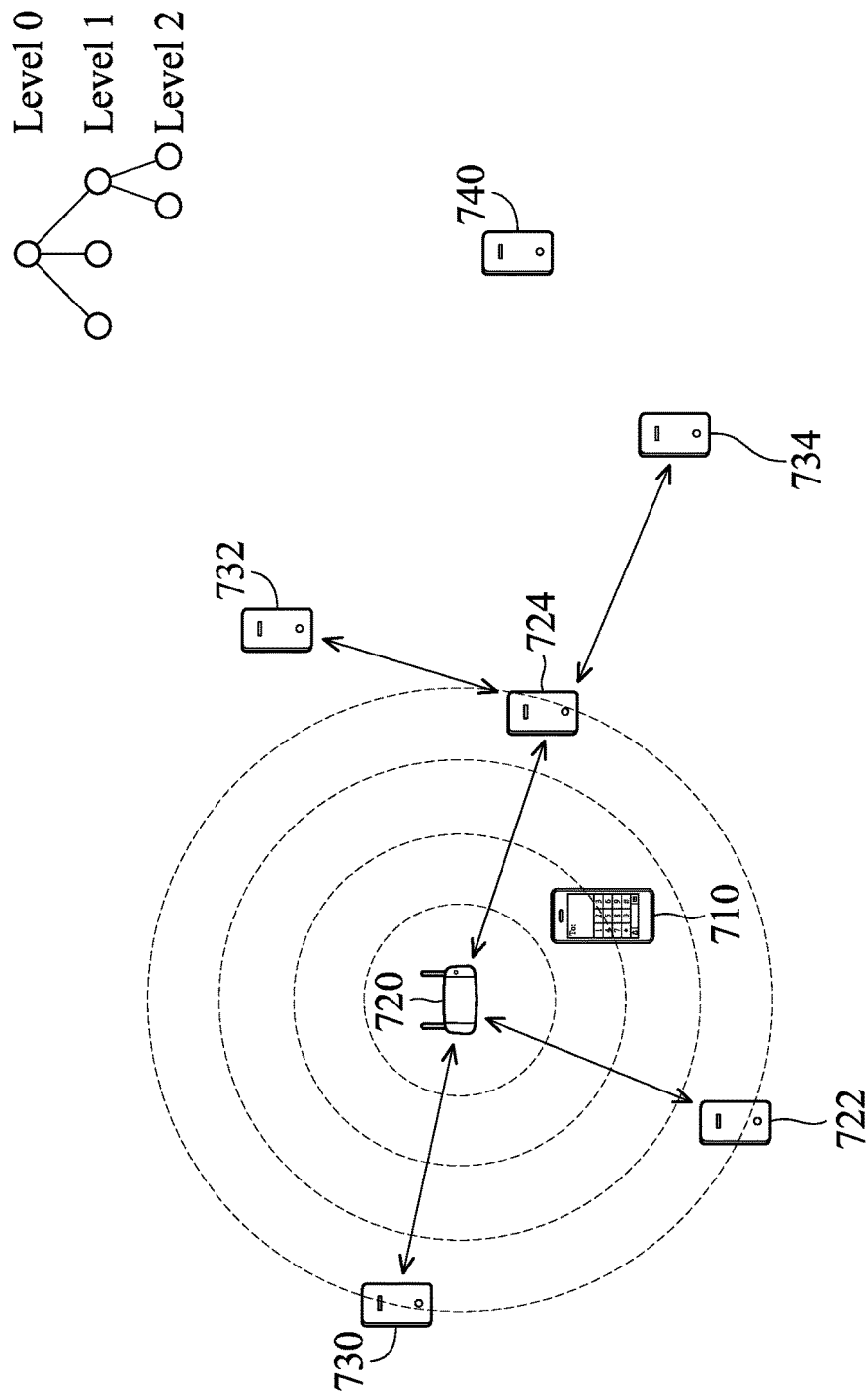
Figure 7K:
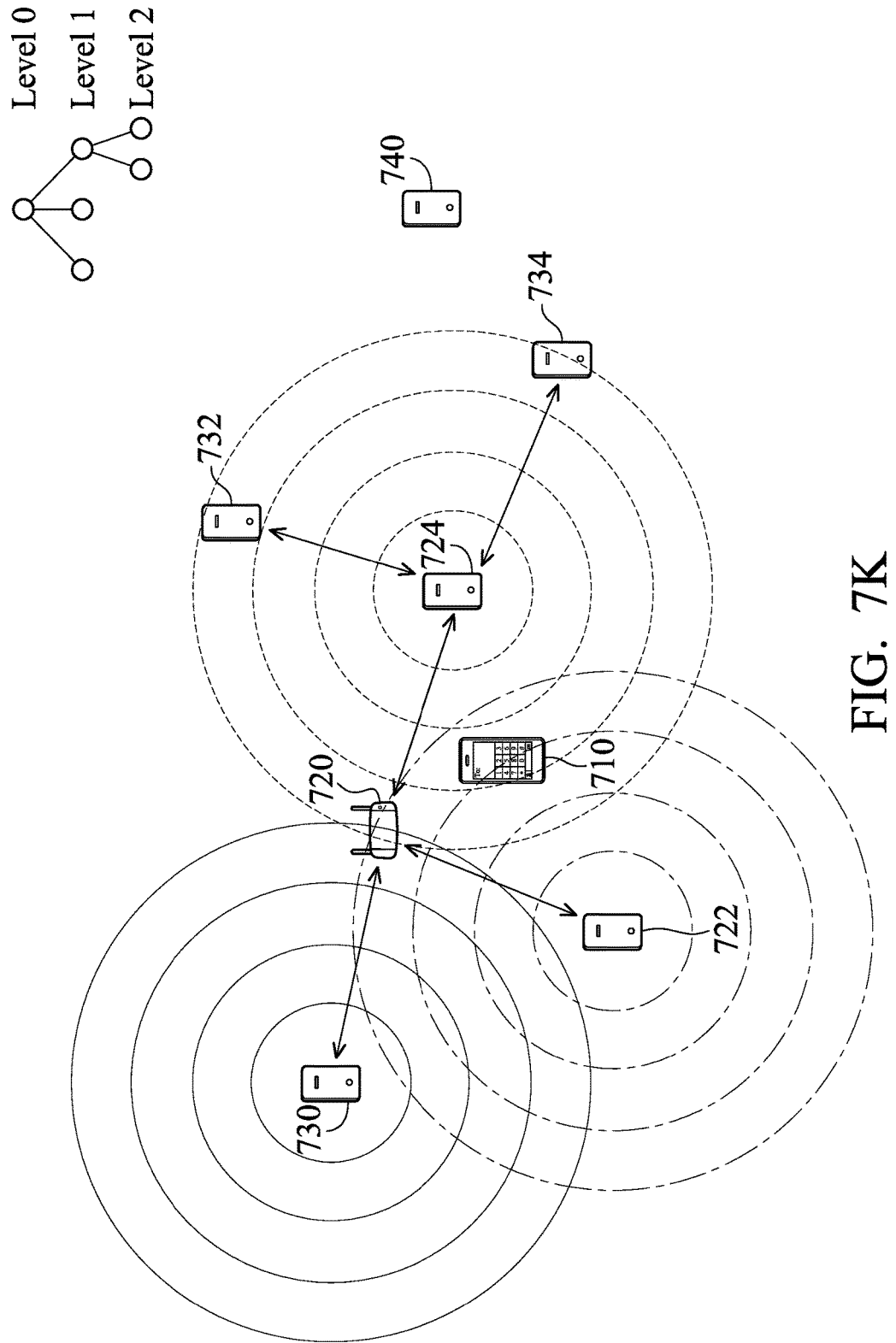
Figure 7L:
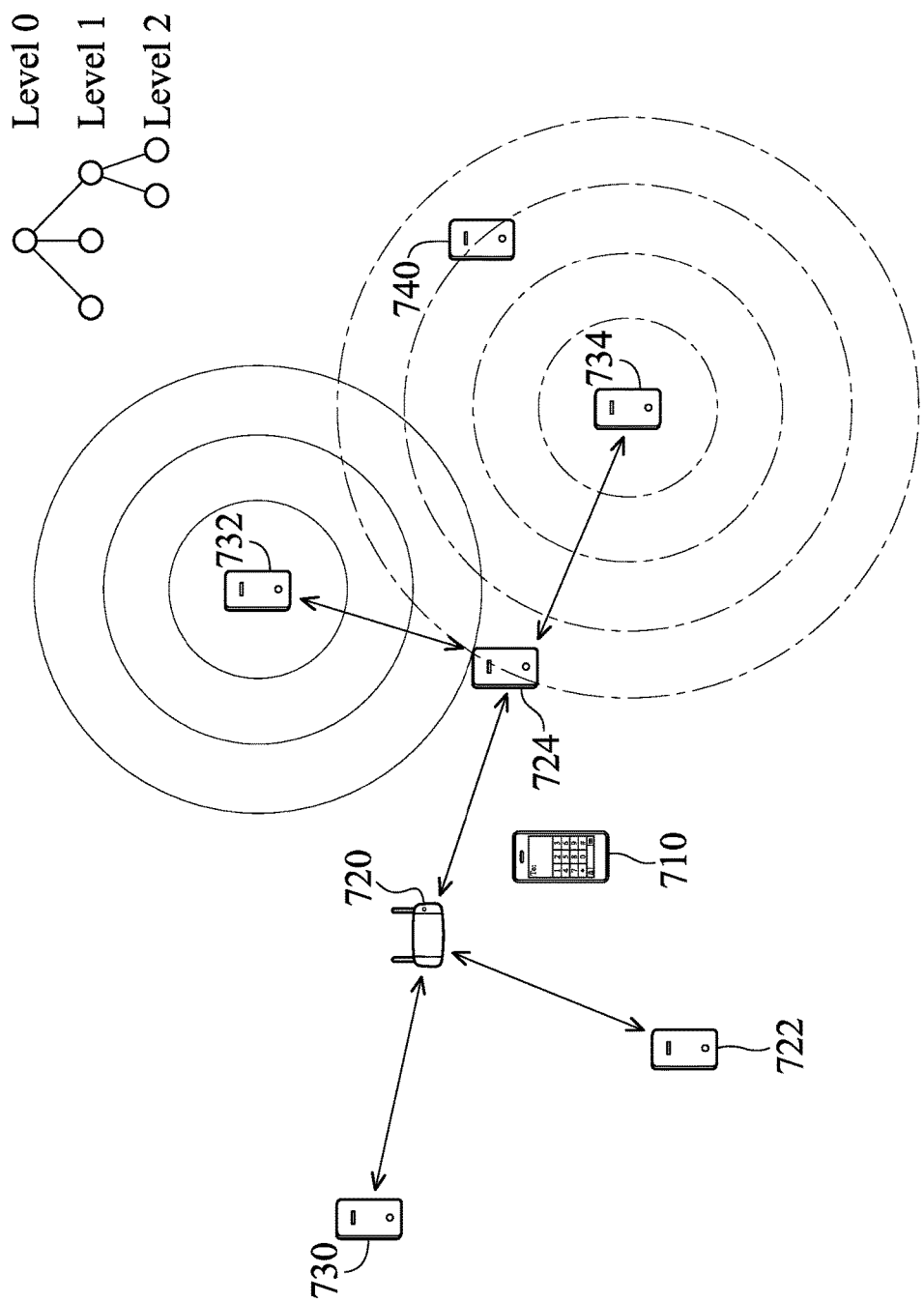

In FIG. 7J, the root node 720 broadcasts the first invitation message and starts a fifth timer using a fifth timeout value after receiving the second command from the initiating node 710, wherein the fifth timeout value specifies an amount of time to broadcast the first invitation message. In FIG. 7K, the inner nodes 722, 724 and 730 broadcast a respective second invitation message and starts a sixth timer using a sixth timeout value after receiving the first invitation message from the root node 720, wherein the sixth timeout value specifies an amount of time to broadcast the second invitation message. In FIG. 7L, the outer nodes 732 and 734 broadcast a respective third invitation message and starts a seventh timer using a seventh timeout value after receiving the second invitation messages from the inner nodes 722, 724 and 730, wherein the seventh timeout value specifies an amount of time to broadcast the seventh invitation message.

Figure 7M:
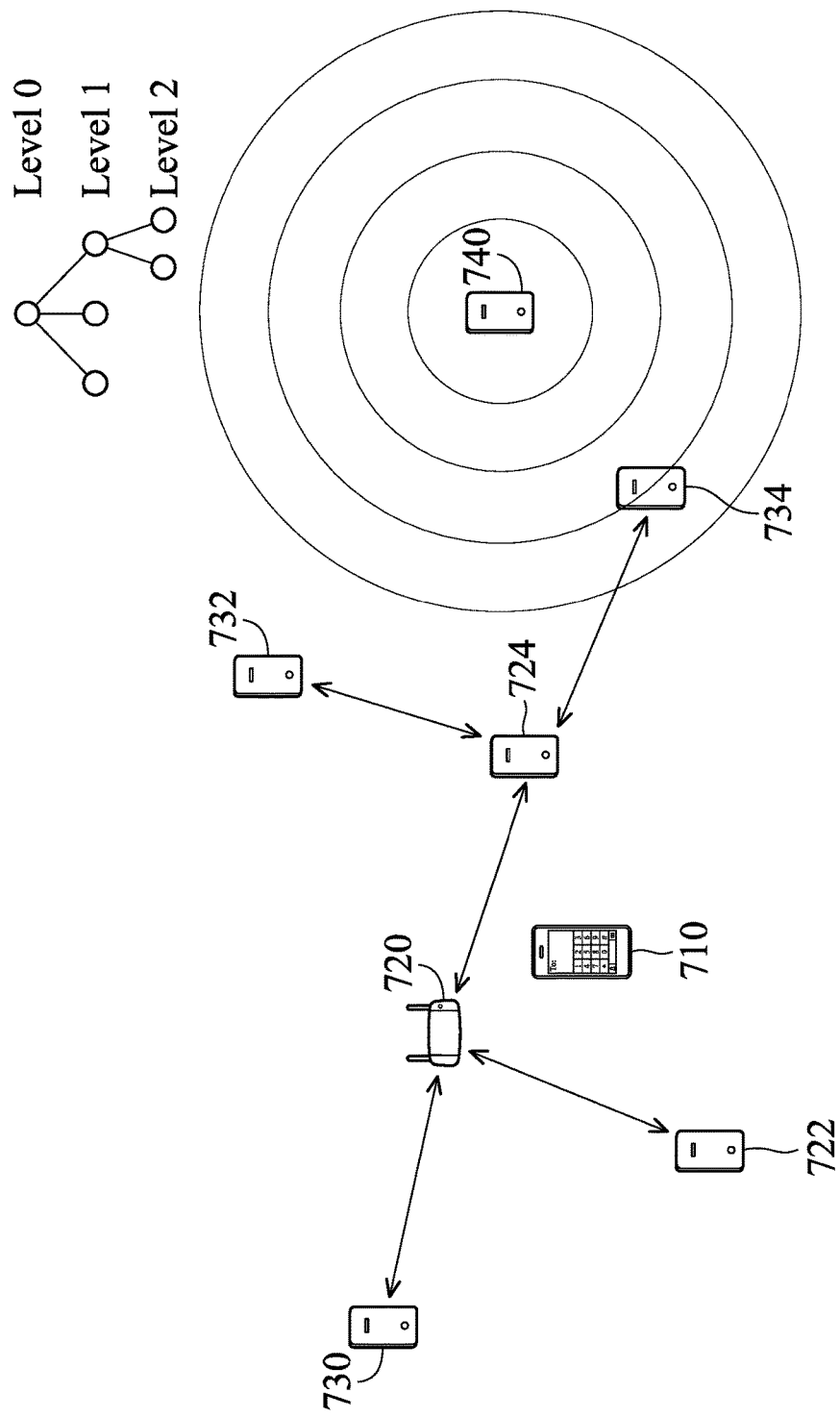
Figure 7N:
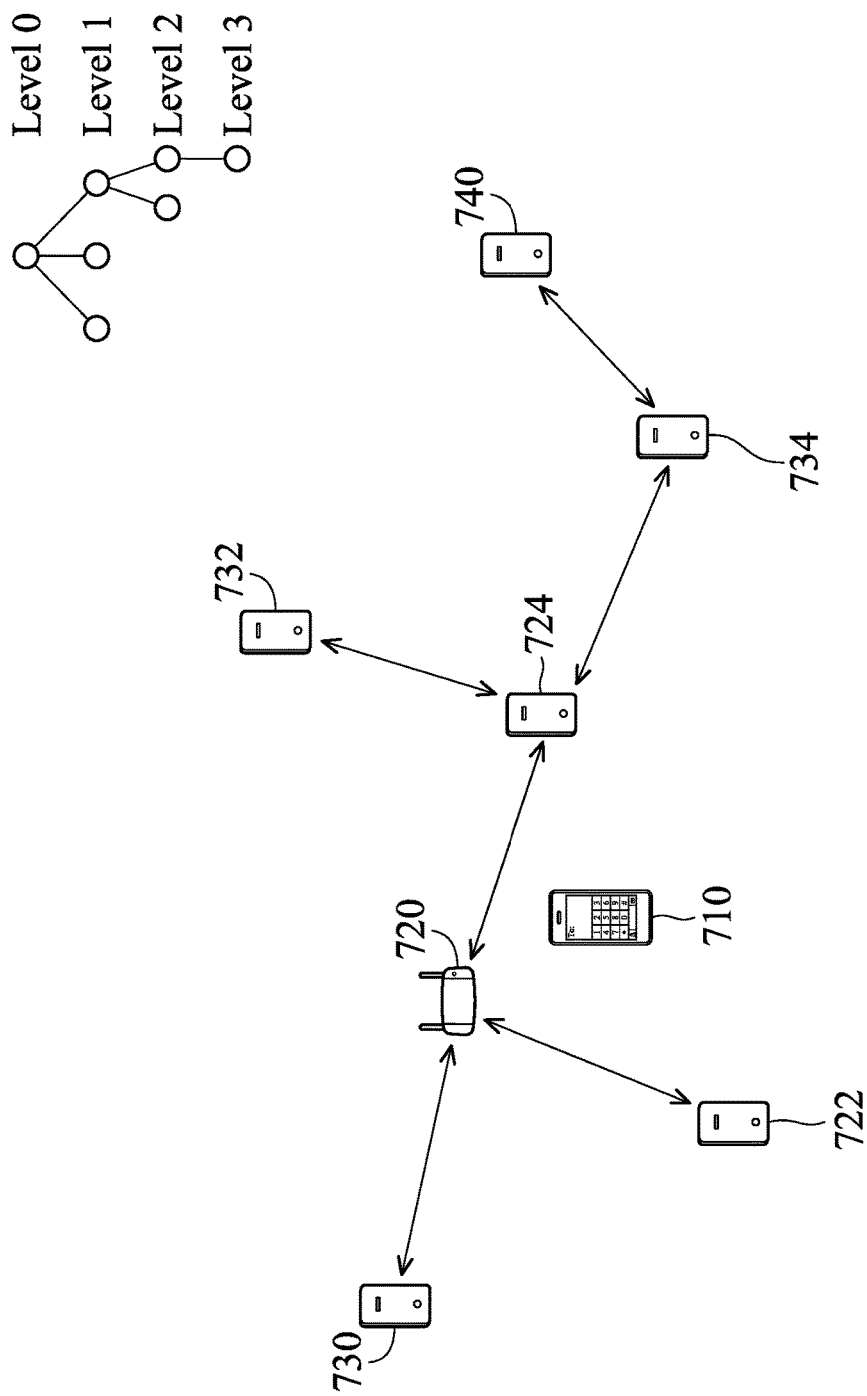

In FIG. 7M, the new node 740 broadcasts a new invitation message and starts a new timer using a new timeout value after receiving the third invitation message from the outer node 734, wherein the new timeout value specifies an amount of time to broadcast the new invitation message. In FIG. 7N, after the new timeout value of the new node 740 elapses, the new node 740 may establish a link with the outer node 734 according to the third invitation response from the outer node 734, and the joining process is completed. The new tree topology is shown at the right side of FIG. 7N. In the new tree topology, since the new node 740 is connected to the outer node 734 of level 2, the new node 440 is at "level 3" in the new tree topology which is lower than level 2.

Figure 8:
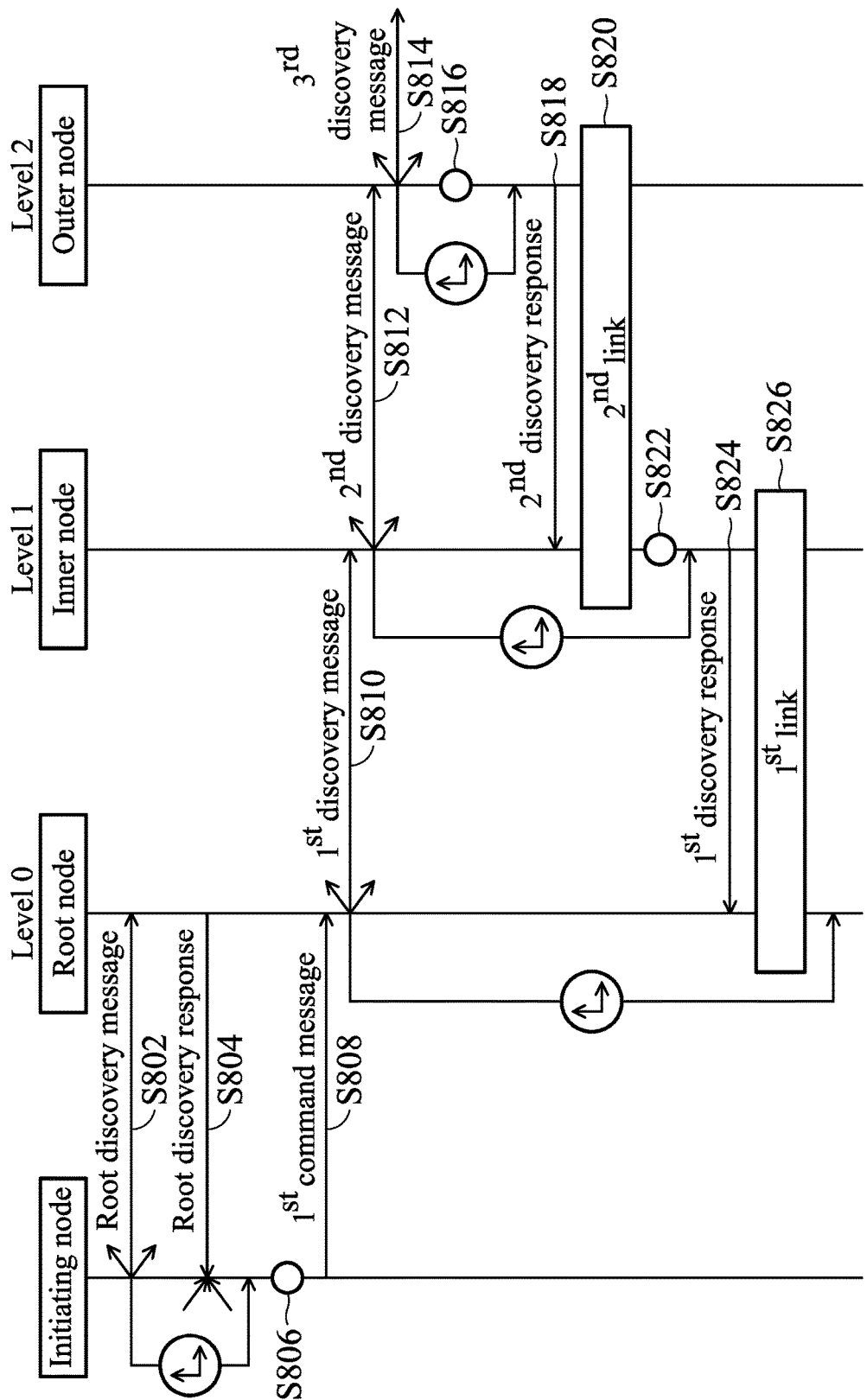
FIG. 8 is a communication flow diagram illustrating a process for self-forming a tree topology network through a persistent and outside-in fashion in accordance with one embodiment of the invention.

FIG. 8 is a communication flow diagram 800 illustrating a process for self-forming a tree topology network through a persistent and outside-in fashion in accordance with one embodiment of the invention with reference to FIGS. 7A~7H.

In step S802, the initiating node at level 0 broadcasts a root discovery message, and then starts a first timer using a first timeout value, wherein the first timeout value specifies an amount of time to broadcast the root discovery message. In step S804, the initiating node at level 0 receives one or more root discovery responses from one or more root candidates. After the first timeout value elapses, in step S806, the initiating node selects one of the root candidates as a root node according to the root discovery responses. In step S808, the initiating node transmits a first command message to the root node for instructing the root node to broadcast a first discovery message.

Next, in step S810, the root node broadcasts the first discovery message, and then starts a second timer using a second timeout value, wherein the second timeout value specifies an amount of time to broadcast the first discovery message. In step S812, an inner node at level 1 broadcasts a second discovery message and then starts a third timer using a third timeout value after receiving the first discovery message from the root node, wherein the third timeout value specifies an amount of time to broadcast the second discovery message. In step S814, an outer node at level 2 broadcasts a third discovery message and then starts a fourth timer using a fourth timeout value after receiving the second discovery message from the inner node at level 1, wherein the fourth timeout value specifies an amount of time to broadcast the third discovery message. In step S816, the outer node at level 2 determines whether the outer node receives one or more third discovery responses from one or more nodes at a lower level which is lower than level 2. After determining that the outer node has not received any third discovery response from the nodes at the lower level which is lower than level 2 and the fourth timeout value elapses, in step S818, the outer node at level 2 transmits the second discovery response to the inner node at level 1 according to the second discovery message to establish a second link with the inner node at level 1. In step S820, the outer node at level 2 establishes the second link with the inner node at level 1.

Next, in step S822, the inner node at level 1 determines whether the inner node receives one or more second discovery responses from one or more nodes at level 2. After determining that the inner node receives the second discovery response from the outer node at level 2 and the second timeout value elapses, in step S824, the inner node transmits the first discovery response to the root node at level 0 according to the first discovery message to establish a first link with the root node at level 0. In step S826, the root node at level 0 establishes the first link with the inner node at level 1. When all timeout values elapse, the process for self-forming the tree topology network is complete.

Figure 9:
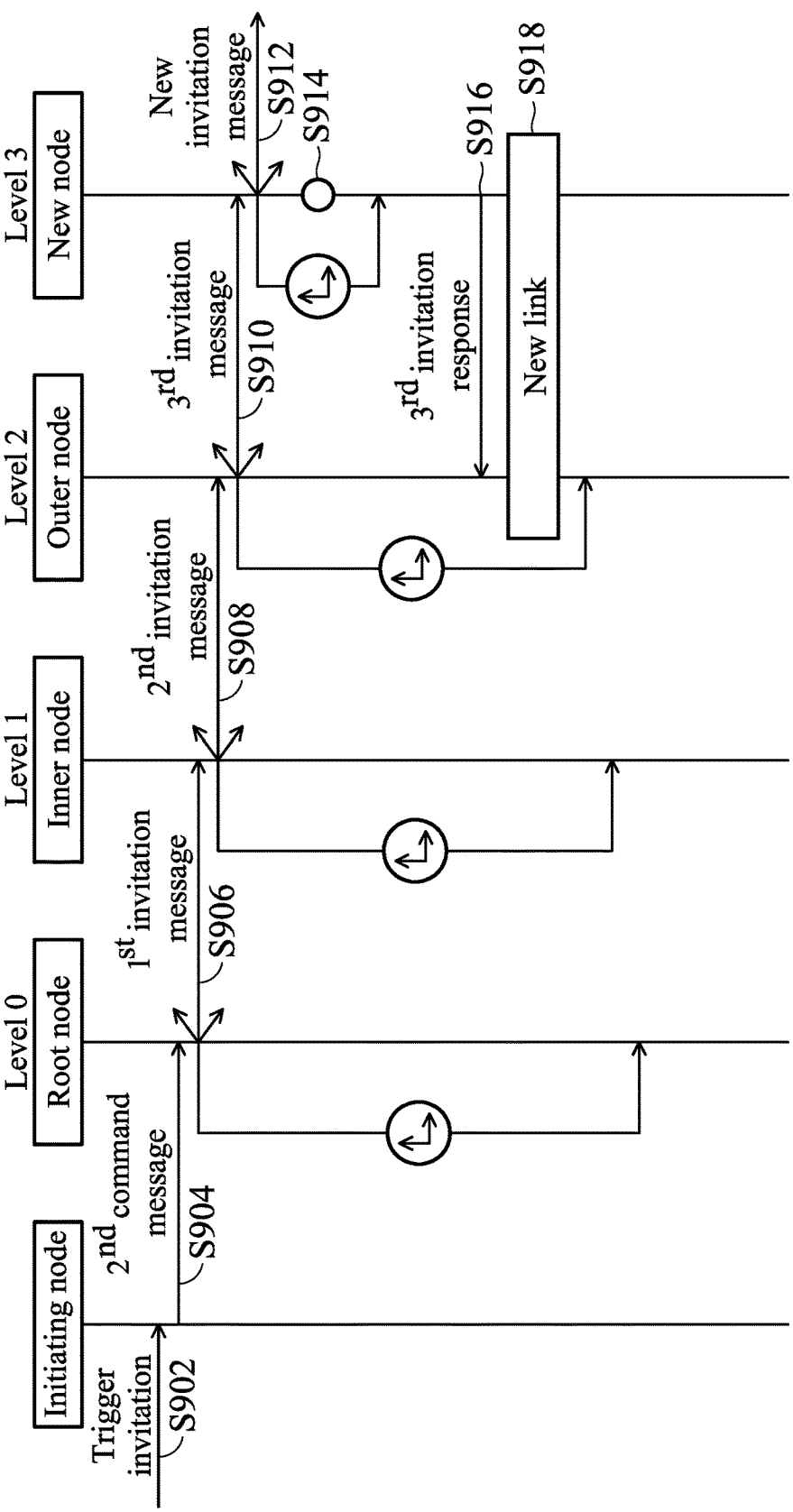
FIG. 9 is a communication flow diagram illustrating a joining process of a new node in the persistent tree topology network shown in FIG. 8 in accordance with one embodiment of the invention.

FIG. 9 is a communication flow diagram 900 illustrating a joining process of a new node in the persistent tree topology network shown in FIG. 8 in accordance with one embodiment of the invention with reference to FIGS. 7I~7N.

After the persistent tree topology network is complete, the initiating node can be triggered to perform the joining process of a new node. In step S902, the initiating node may receive a trigger invitation message from a user. In step S904, the initiating node transmits a second command message to the root node for instructing the root node to broadcast a first invitation message.

In step S906, the root node broadcasts the first invitation message and starts a first timer using a fifth timeout value after receiving the second command message, wherein the fifth timeout value specifies an amount of time to broadcast the first invitation message. In step S908, the inner node at level 1 can broadcast a second invitation message and then starts a sixth timer using a sixth timeout value after receiving the first invitation message, wherein the sixth timeout value specifies an amount of time to broadcast the second invitation message. In step S910, the outer node at level 2 can broadcast a third invitation message and then starts a seventh timer using a seventh timeout value after receiving the second invitation message, wherein the seventh timeout value specifies an amount of time to broadcast the third invitation message. In step S912, a new node can broadcast a new invitation message and then starts a new timer using a new timeout value after receiving the third invitation message, wherein the new timeout value specifies an amount of time to broadcast the new invitation message.

Next, in step S914, the new node determines whether the new node receives one or more new invitation responses from another new node. If the new node does not receive any new invitation responses and the new timeout value elapses, in step S916, the new node transmits a third invitation response to the outer node according to the third invitation message to establish a new link with the outer node. In step S918, the new node establishes the new link with the outer node. When all the timeout value elapse, the joining process of the new node process is complete. Since the new node establishes the new link with the outer node at level 2, the new node becomes a leaf node at level 3 in the persistent tree topology network.

One-Time and Inside-Out Fashion

FIGS. 10A~10F show a process for self-forming a tree topology network by using a one-time and inside-out fashion in accordance with one embodiment of the invention. In the embodiment, the initiating node 1010 is an initiator, or root, and the one-time tree topology network is formed from inside to outside.

Figure 10A:
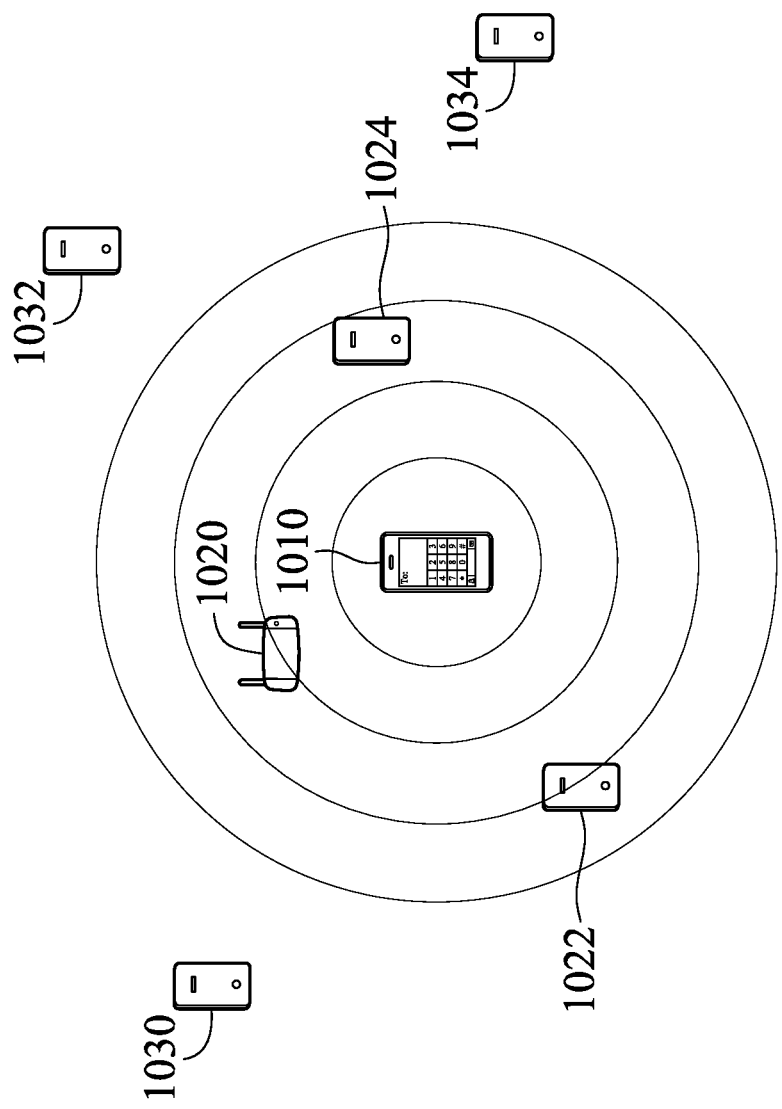
FIGS. 10A~10F show a process for self-forming a tree topology network by using a one-time and inside-out fashion in accordance with one embodiment of the invention.
Figure 10B:
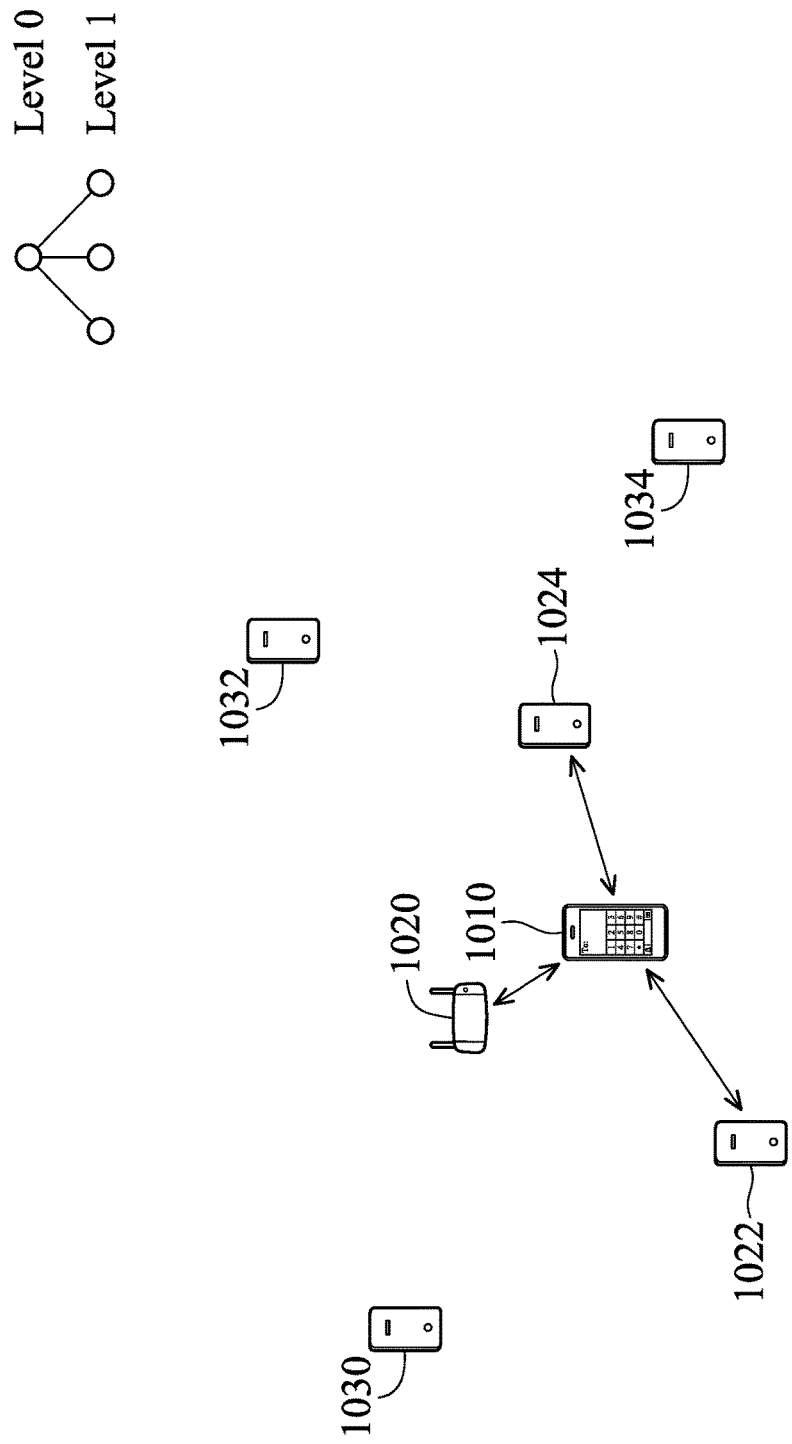

In FIG. 10A, an initiating node 1010 broadcasts a first discovery message and starts a first timer using a first timeout value, wherein the first timeout value specifies an amount of time to broadcast the first discovery message. In FIG. 10B, the inner nodes 1020, 1022, and 1024 transmit a respective first discovery response to the initiating node 1010 and establish a respective link with the initiating node 1010 after receiving the first discovery message. The corresponding tree topology for the initiating node and the inner nodes is shown at the right side of FIG. 10B.

Figure 10C:
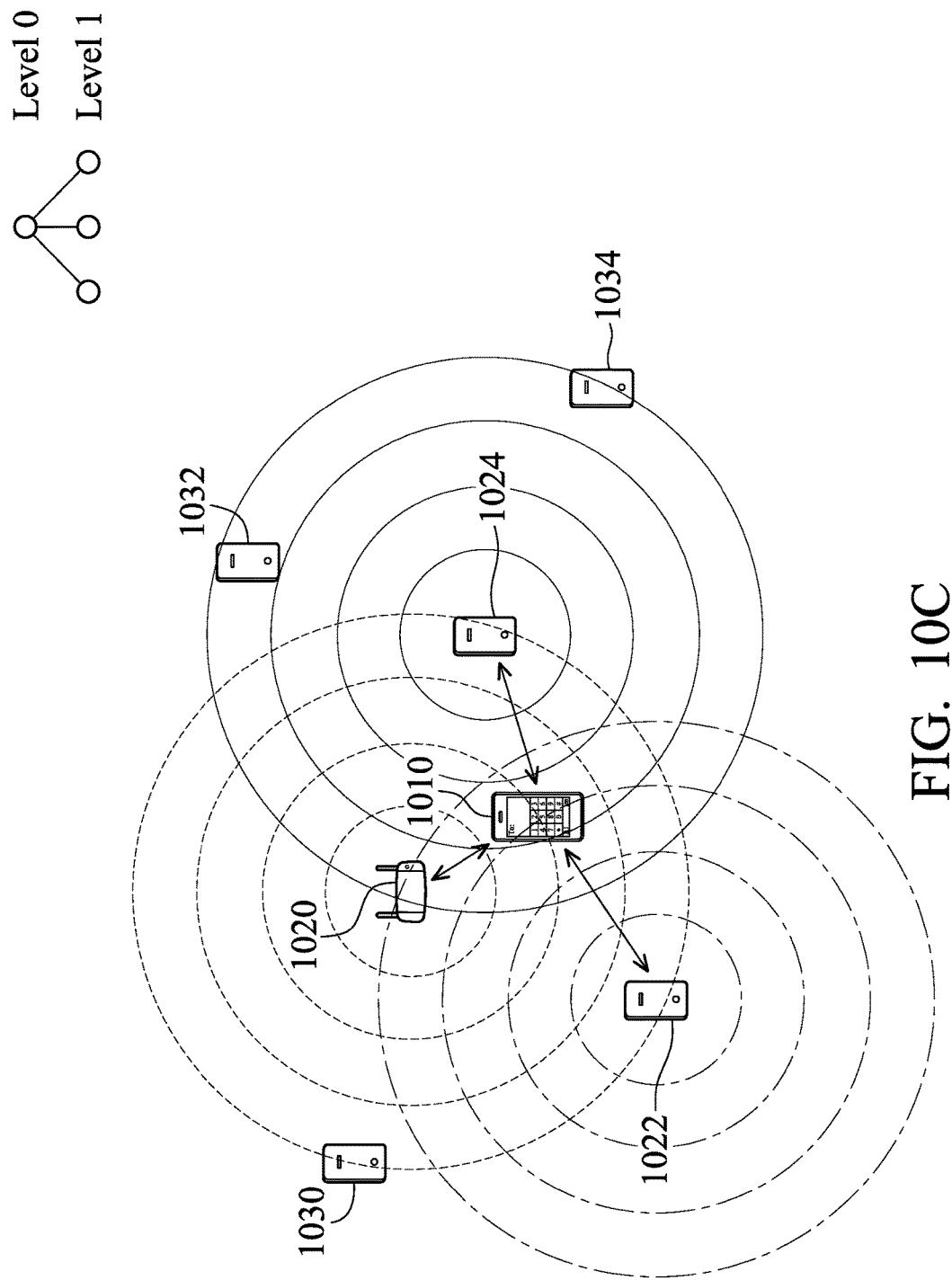
Figure 10D:
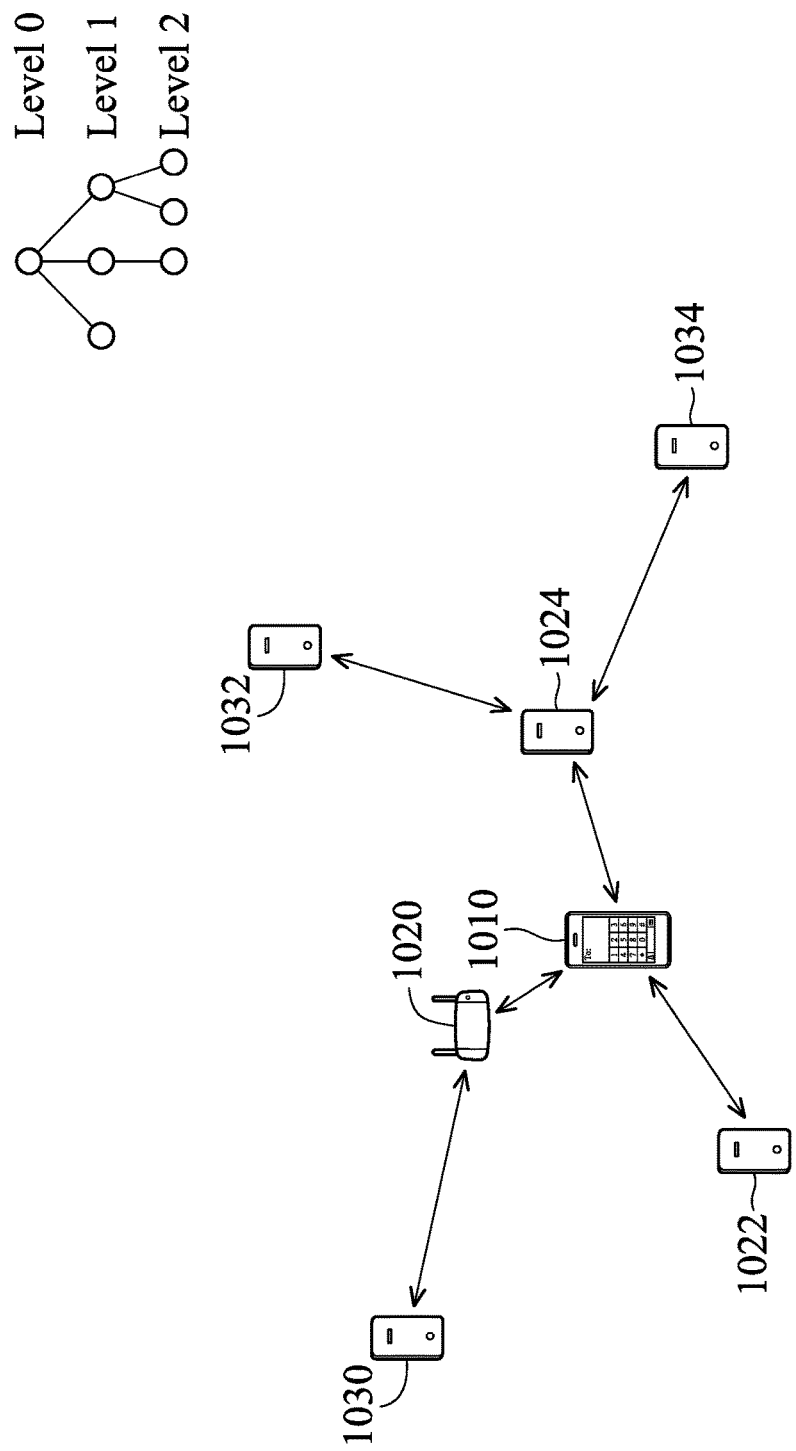

In FIG. 10C, the inner nodes 1020, 1022 and 1024 broadcast a respective second discovery message and start a respective second timer using a respective second timeout value after establishing the respective link with the initiating node 1010, wherein the second timeout value specifies an amount of time to broadcast the second discovery message. In FIG. 10D, the outer nodes 1030, 1032 and 1034 transmit a respective second discovery response to the inner nodes 1020, 1022 and 1024 and establish a respective link with the inner nodes 1020, 1022 and 1024 after receiving the second discovery message. The corresponding tree topology for the inner nodes and the outer nodes is shown at the right side of FIG. 10D.

Figure 10E:
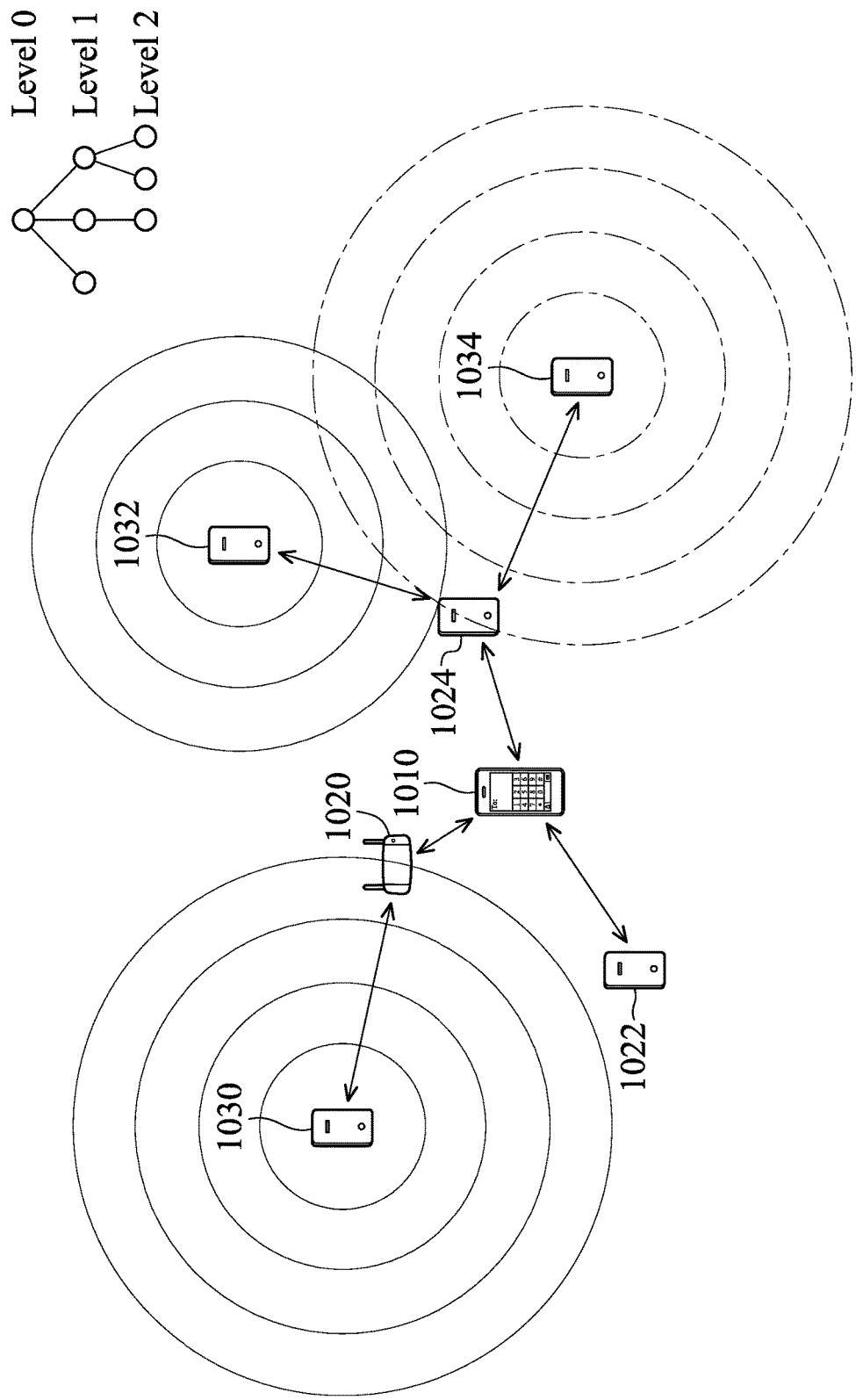

In FIG. 10E, the outer nodes 1030, 1032 and 1034 broadcast a respective third discovery message and start a respective third timer using a respective third timeout value after establishing the respective link with the inner nodes 1020, 1022 and 1024, wherein the third timeout value specifies an amount of time to broadcast the third discovery message.

Figure 10F:
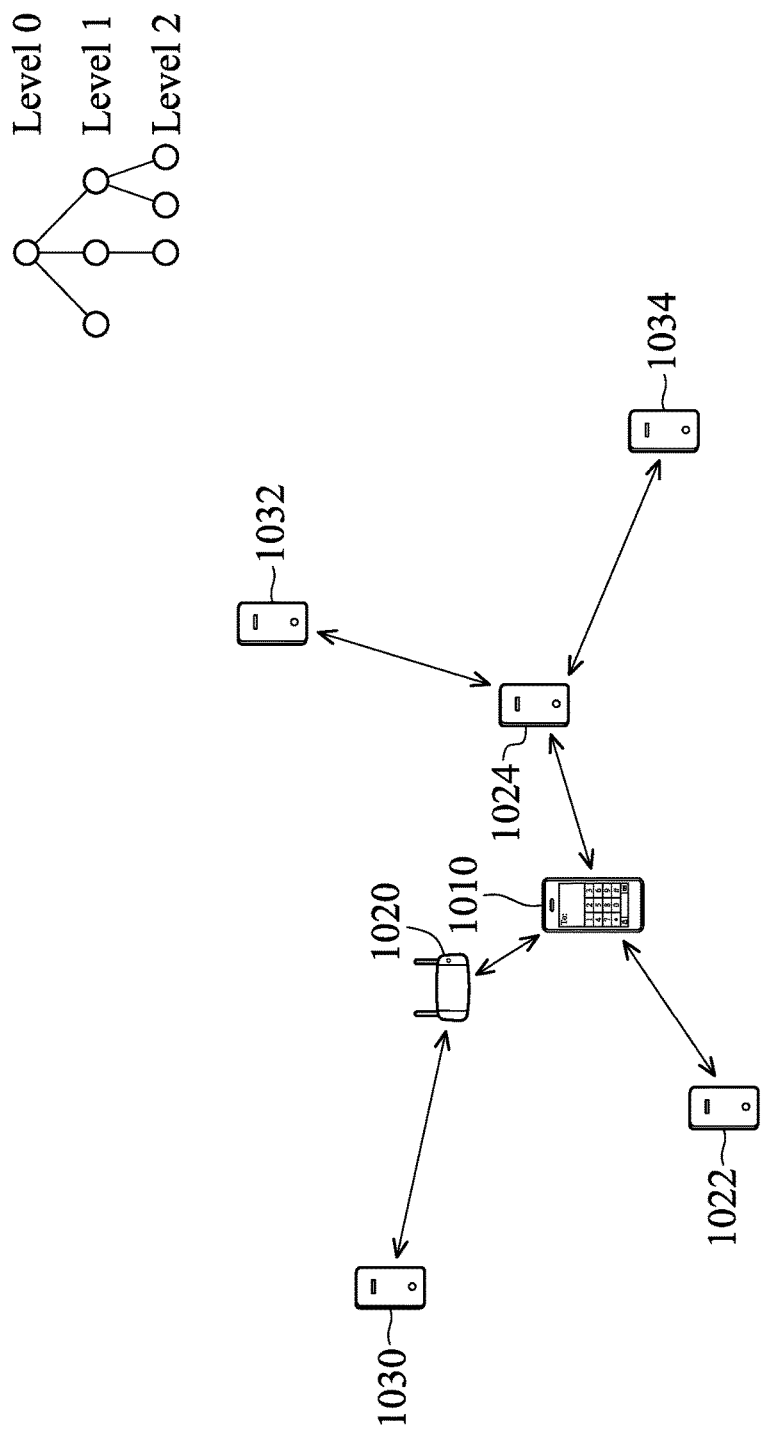

In FIG. 10F, after the respective third timeout value of the outer nodes 1030, 1032 and 1034 elapses, the one-time tree topology is completed and is shown at the right side of FIG. 10F. In the one-time tree topology, the initiating node 410 (or the root node) is referred to as "level 0." The child nodes are at "level 1" and so on. "Level 1" as used herein is a lower level in the tree topology than "level 0." Likewise, "Level 1" is a higher level in the tree topology than "level 2." Since the initiating node 1010 which is the root node can be moved from one location to another, the tree topology network can vary with the initiating node 1010. Therefore, the tree topology network can be considered as a "one-time" tree topology network.

In the embodiment, the first timeout value should be shorter than other timeout value, and it is not limited to the second timeout value or the third timeout value used by the second timer and the third timer. Therefore, the one-time tree topology is formed from inside to outside. In addition, it should be noted that every node does not receive another discovery message after receiving one discovery message.

FIGS. 10G~10L show a joining process, which is how a new node joins the one-time tree topology of FIG. 10F in accordance with one embodiment of the invention. Before the joining process, the initiating node 1010 may receive a trigger invitation message input by a user, wherein the trigger invitation message is used to trigger the joining process.

Figure 10G:
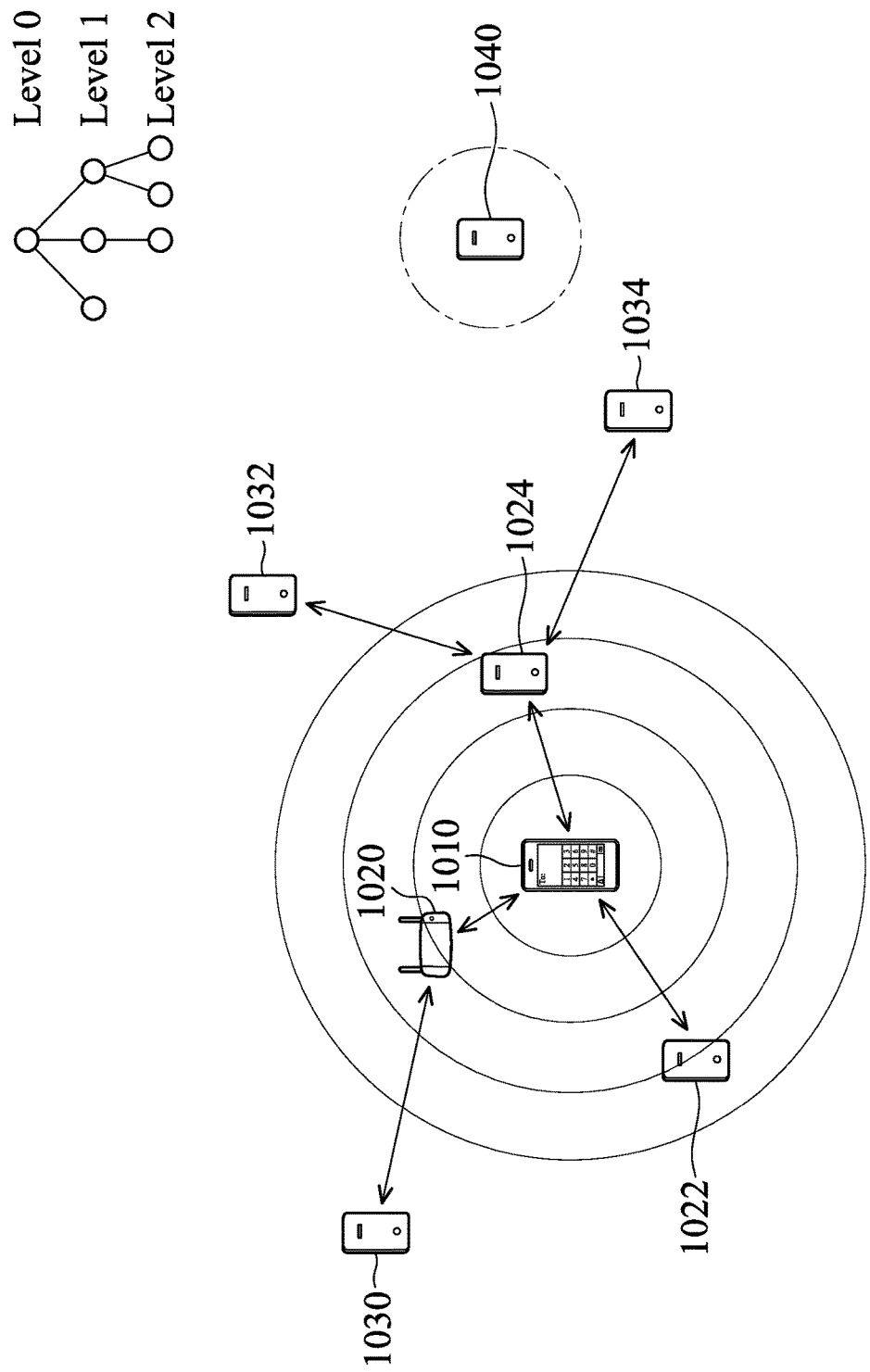
FIGS. 10G~10L show a joining process, which is how a new node joins the one-time tree topology of FIG. 10F in accordance with one embodiment of the invention.
Figure 10H:
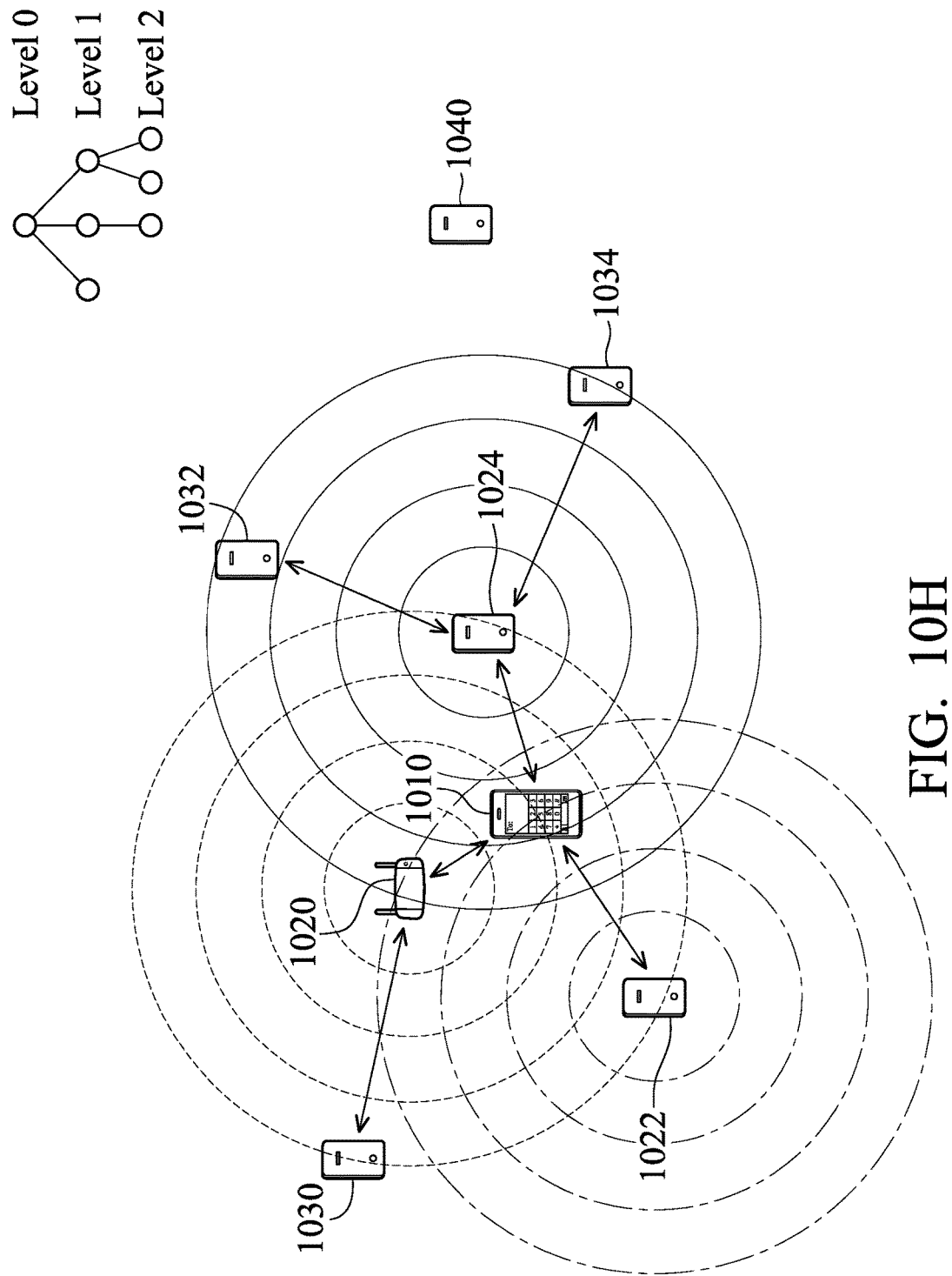
Figure 10I:
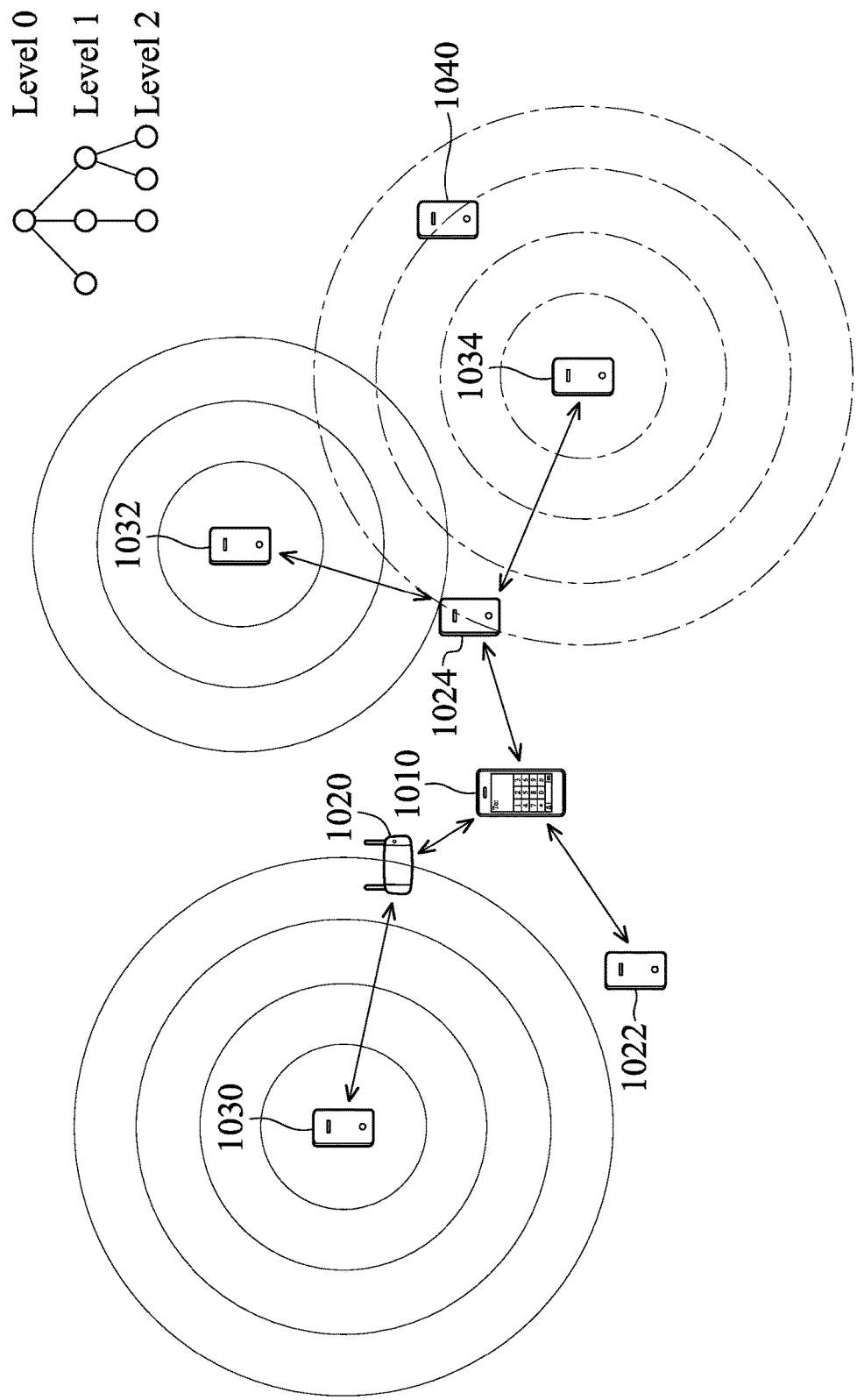

In FIG. 10G, the initiating node 1010 broadcasts a first invitation message and starts a fourth timer using a fourth timeout value, wherein the fourth timeout value specifies an amount of time to broadcast the first invitation message. In FIG. 10H, the inner nodes 1020, 1022 and 1024 broadcast a respective second invitation message and start a respective fifth timer using a respective fifth timeout value after receiving the first invitation message, wherein the fifth timeout value specifies an amount of time to broadcast the respective second invitation message. In FIG. 10I, the outer nodes 1030, 1032 and 1034 broadcast a respective third invitation message and start a respective sixth timer using a respective sixth timeout value after receiving the respective second invitation message from the inner nodes 1020, 1022 and 1024, wherein the sixth timeout value specifies an amount of time to broadcast the respective third invitation message.

Figure 10J:
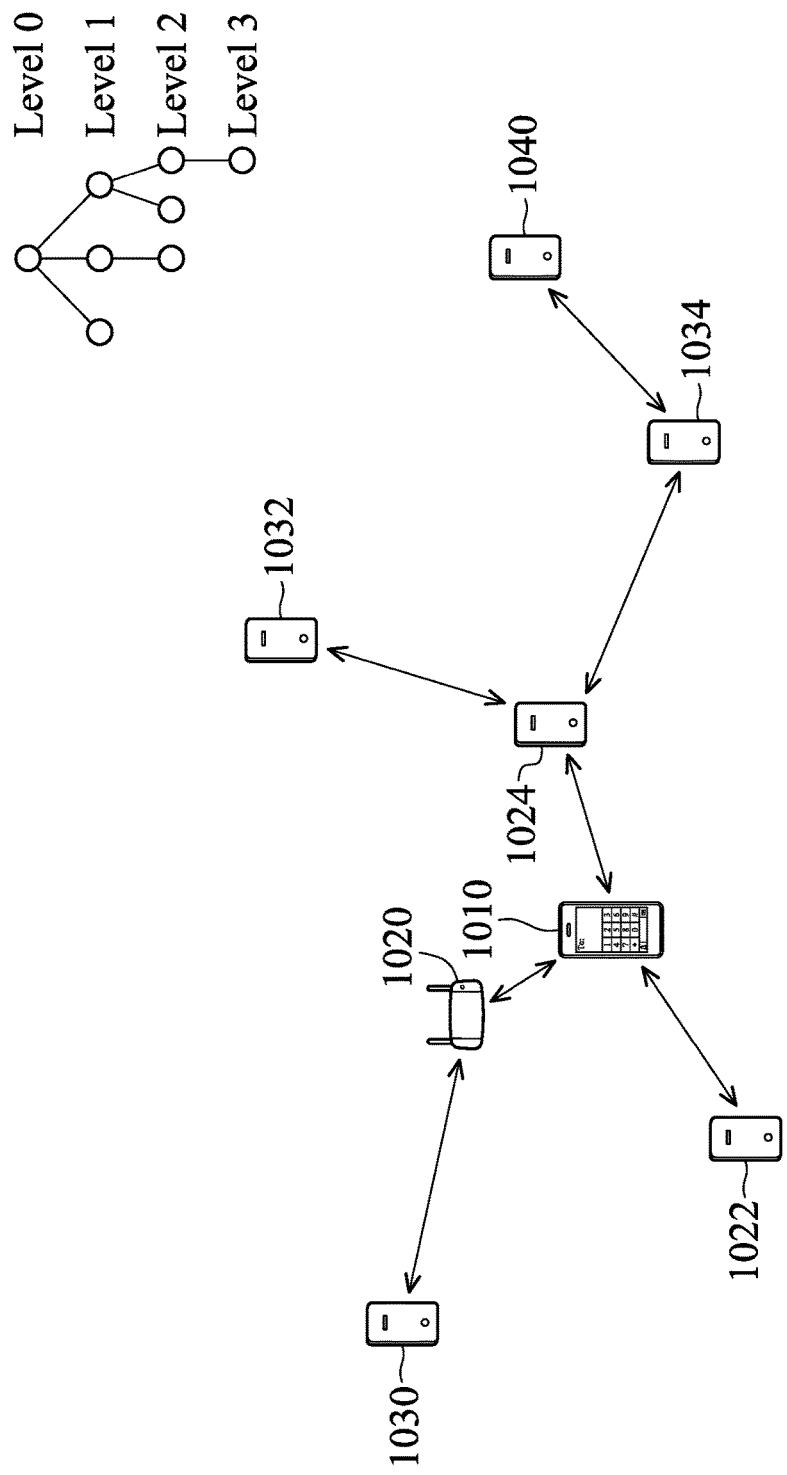
Figure 10K:
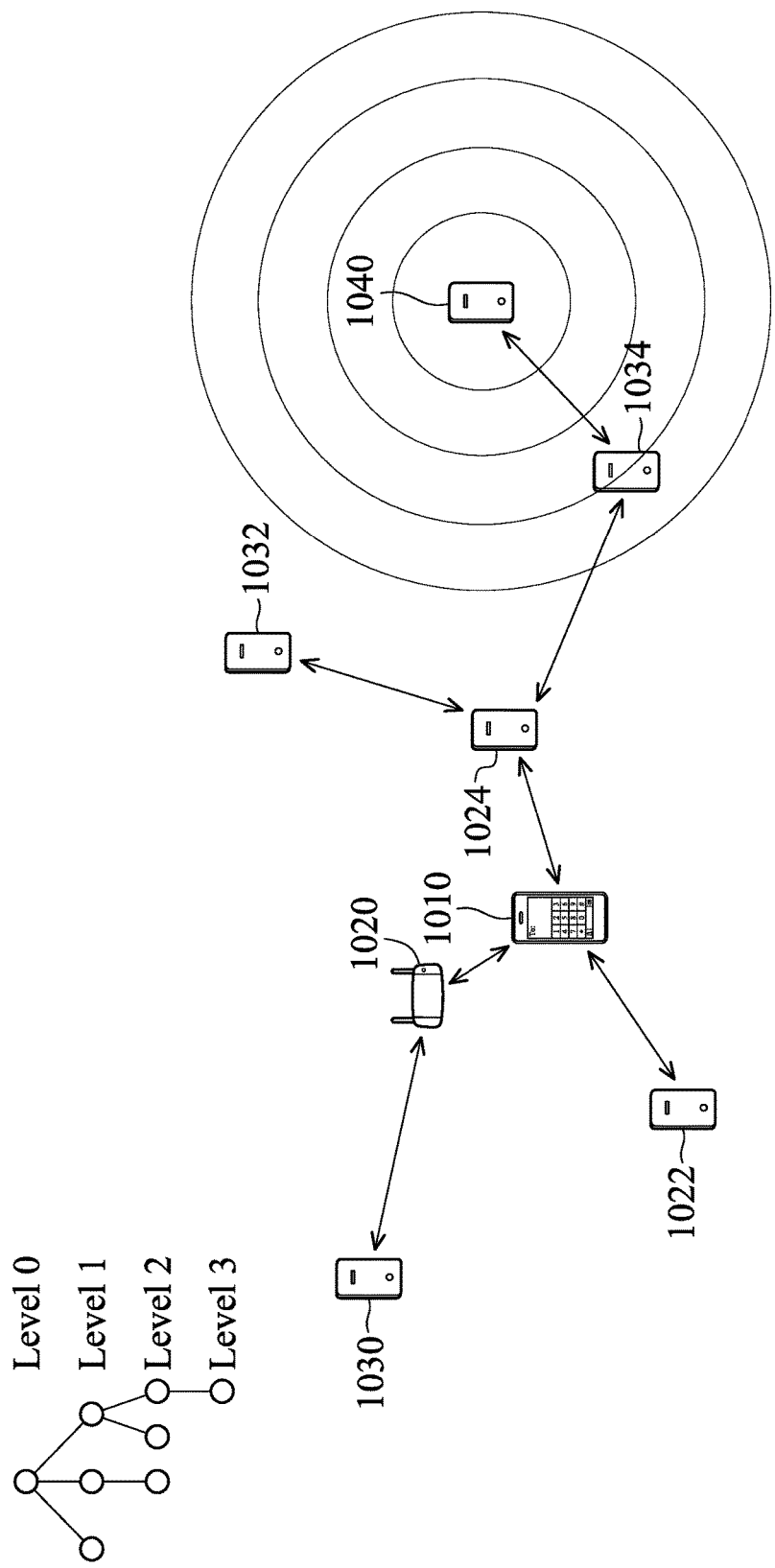
Figure 10L:
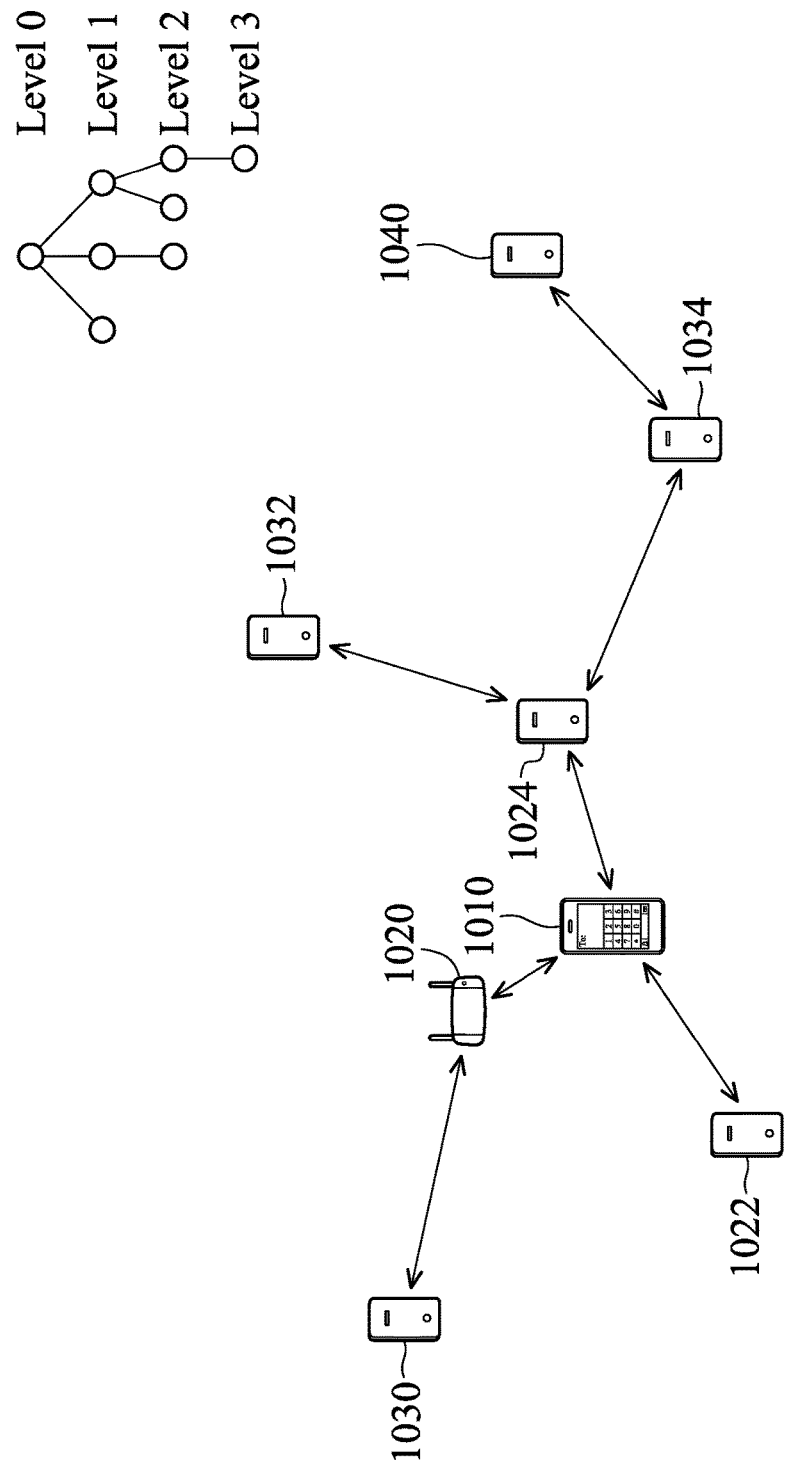

In FIG. 10J, the new node 1040 establish a link with the outer node 1034 according to the third invitation message from the outer node 1034. In FIG. 10K, the new node 1040 broadcasts a new invitation message and starts a new timer using a new timeout value after establishing the link with the outer node 1034, wherein the new timeout value specifies an amount of time to broadcast the new invitation message. In FIG. 10L, after the new timeout value of the new node 1040 elapses, the joining process is completed. The new one-time tree topology is shown at the right side of FIG. 10L. In the new one-time tree topology, since the new node 1040 is connected to the outer node 1034 of level 2, the new node 1040 is at "level 3" in the new one-time tree topology which is lower than level 2.

In the embodiment, it is not limited to each timeout value used by each timer. Therefore, the one-time tree topology is formed from inside to outside. In addition, it should be noted that every node does not receive another invitation message after receiving one invitation message.

Figure 11:
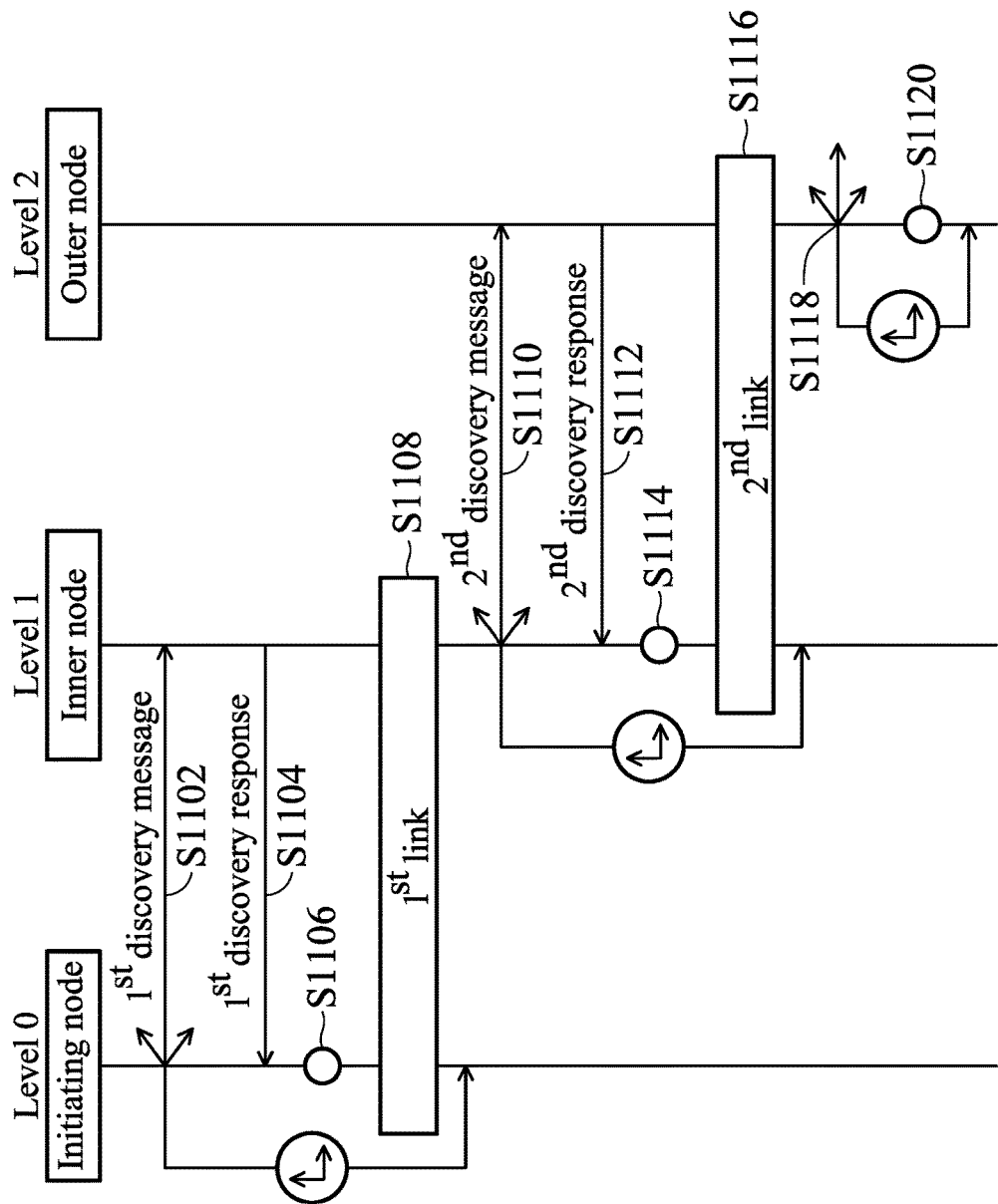
FIG. 11 is a communication flow diagram illustrating a process for self-forming a tree topology network through a one-time and inside-out fashion in accordance with one embodiment of the invention.

FIG. 11 is a communication flow diagram 1100 illustrating a process for self-forming a tree topology network through a one-time and inside-out fashion in accordance with one embodiment of the invention with reference to FIGS. 10A~10F.

In step S1102, the initiating node at level 0 broadcasts a first discovery message, and then starts a first timer using a first timeout value, wherein the first timeout value specifies an amount of time to broadcast the first discovery message. In step S1104, an inner node at level 1 transmits a first discovery response to the initiating node according to the first discovery message. In step S1106, the initiating node may determine whether the initiating node receives one or more first discovery responses from one or more inner nodes at level 1. In step S1108, the initiating node establishes a first link with the inner node after determining the initiating node receives the first discovery response from the inner node at level 1.

In step S1110, the inner node at level 1 broadcasts a second discovery message and then starts a second timer using a second timeout value after establishing the first link with the initiating node, wherein the second timeout value specifies an amount of time to broadcast the second discovery message. In step S1112, an outer node at level 2 transmits a second discovery response to the inner node at level 1 according to the second discovery message. In step S1114, the inner node at level 1 may determine whether the inner node receives one or more second discovery responses from one or more outer nodes at level 2. In step S1116, the outer node establishes a second link with the inner node after determining the initiating node receives the second discovery response from the outer node at level 2.

In step S1118, the outer node at level 2 broadcasts a third discovery message and then starts a third timer using a third timeout value after establishing the second link with the inner node, wherein the third timeout value specifies an amount of time to broadcast the third discovery message. In step S1120, the outer node at level 2 determines whether the outer node receives one or more third discovery responses from one or more nodes at a lower level which is lower than level 2. When the outer node at level 2 determines that the outer node does not receive any third discovery responses from the nodes at the lower level which is lower than level 2 and the third timeout value elapses, the process for self-forming the one-time tree topology network is complete.

Figure 12:
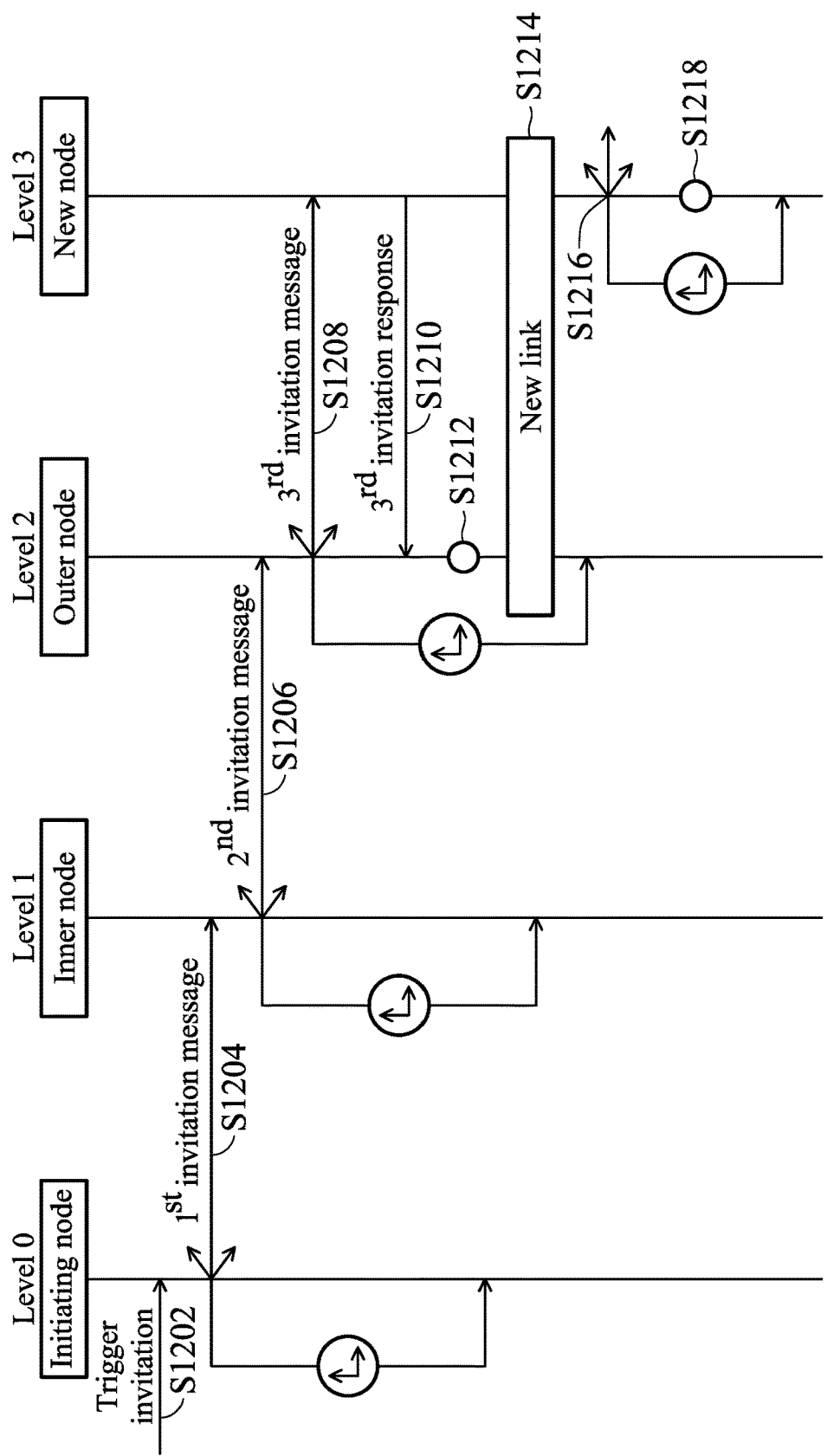
FIG. 12 is a communication flow diagram illustrating a joining process of a new node in the one-time tree topology network shown in FIG. 11 in accordance with one embodiment of the invention.

FIG. 12 is a communication flow diagram 1200 illustrating a joining process of a new node in the one-time tree topology network shown in FIG. 11 in accordance with one embodiment of the invention with reference to FIGS. 10G~10L.

After the one-time tree topology network is complete, the initiating node can be triggered to perform the joining process of a new node. In step S1202, the initiating node at level 0 may receive a trigger invitation message from a user. In step S1204, the initiating node broadcasts a first invitation message, and then starts a fourth timer using a fourth timeout value after receiving the trigger invitation message, wherein the fourth timeout value specifies an amount of time to broadcast the first invitation message. In step S1206, the inner node at level 1 can broadcast a second invitation message and then starts a fifth timer using a fifth timeout value after receiving the first invitation message, wherein the fifth timeout value specifies an amount of time to broadcast the second invitation message. In step S1208, the outer node at level 2 can broadcast a third invitation message and then starts a sixth timer using a sixth timeout value after receiving the second invitation message, wherein the sixth timeout value specifies an amount of time to broadcast the third invitation message. In step S1210, a new node can transmit a third invitation response to the outer node according to the third invitation message to establish a new link with the outer node. In step S1212, the outer node may determine whether the outer node receives the third invitation response from the new node. In step S1214, the outer node establishes a new link with the new node according to the third discovery response after determining that the outer node receives the third invitation response from the new node.

In step S1216, the new node broadcasts a new invitation message and then starts a new timer using a new timeout value after establishing the new link with the outer node, wherein the new timeout value specifies an amount of time to broadcast the new invitation message. In step S1218, the new node determines whether the new node receives one or more new invitation responses from another new node. If the new node does not receive any new invitation response and the new timeout value elapses, the joining process of the new node process is complete. Since the new node establishes the new link with the outer node at level 2, the new node becomes a leaf node at level 3 in the tree topology network.

Persistent and Inside-Out Fashion

FIGS. 13A~13I show a process for self-forming a tree topology network by using a persistent and inside-out fashion in accordance with one embodiment of the invention. In the embodiment, the initiating node 1310 may instruct a node as a root node to form a persistent tree topology network from inside to outside.

Figure 13A:
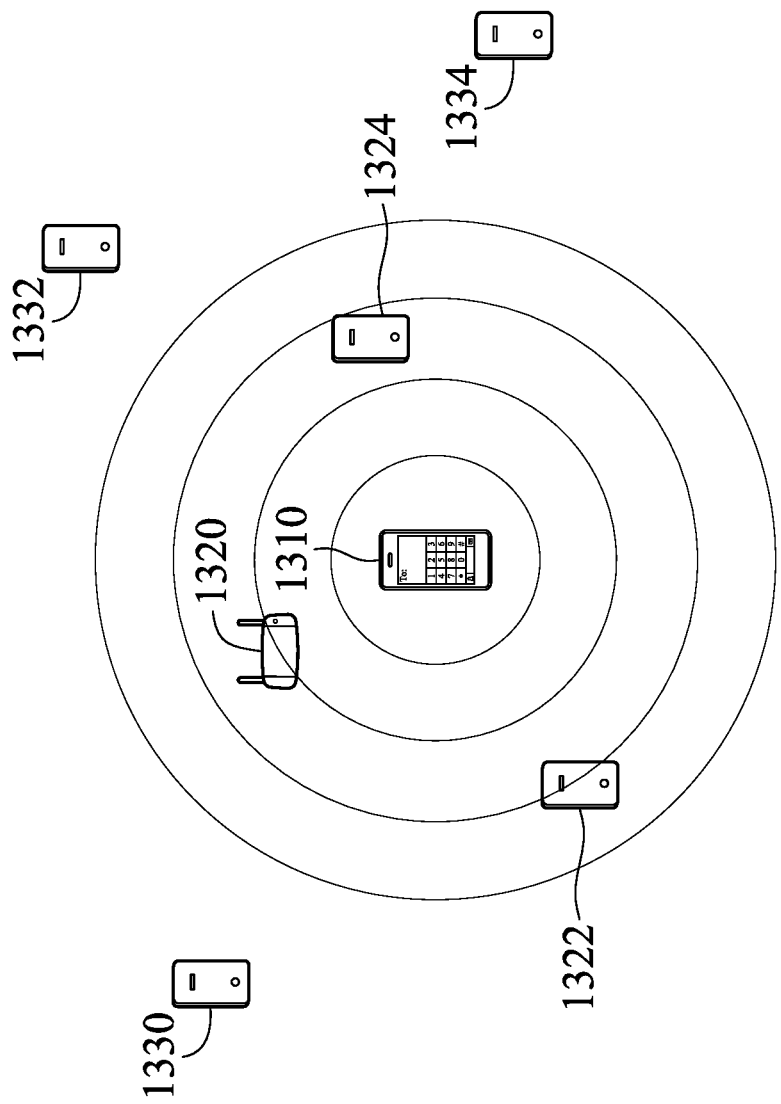
FIGS. 13A~13I show a process for self-forming a tree topology network by using a persistent and inside-out fashion in accordance with one embodiment of the invention.
Figure 13B:
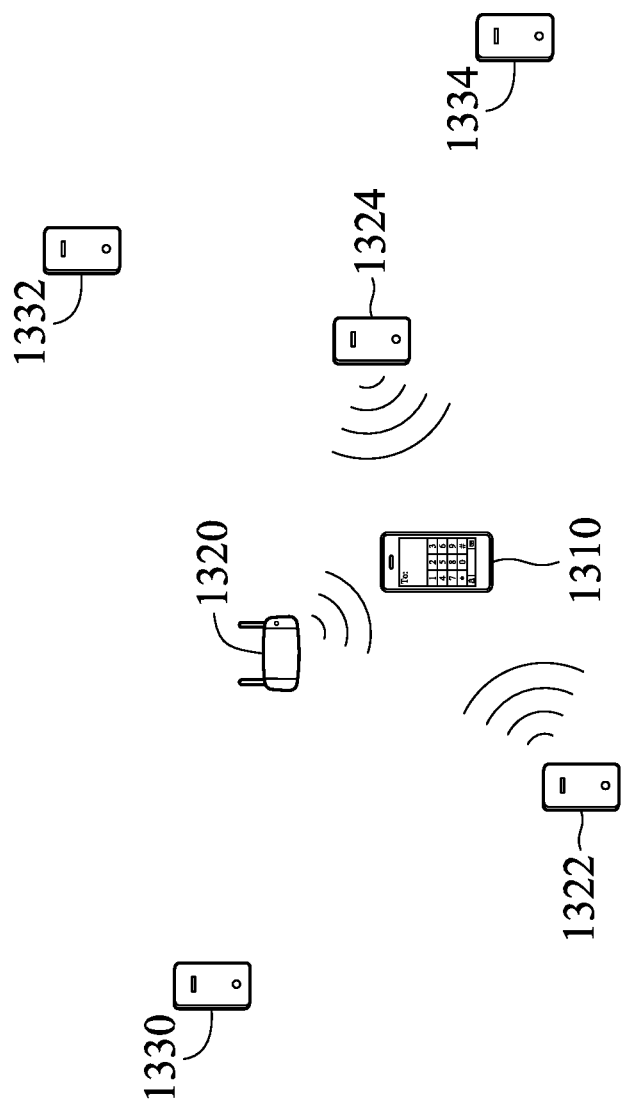
Figure 13C:
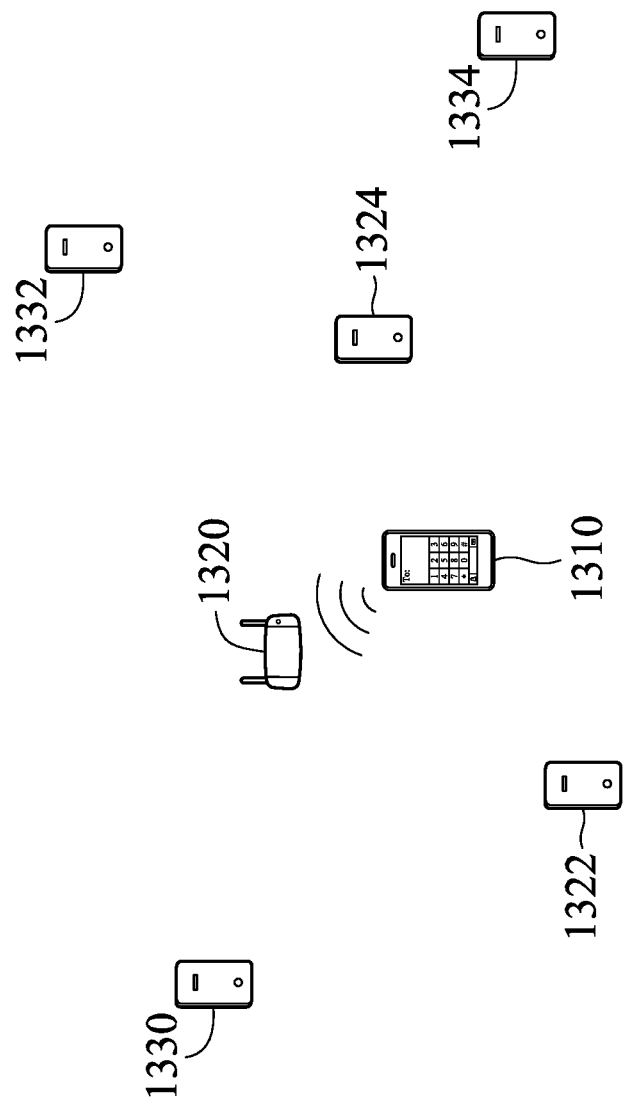

In FIG. 13A, an initiating node 1310 broadcasts a root discovery message and starts a first timer using a first timeout value, wherein the first timeout value specifies an amount of time to broadcast the root discovery message. In FIG. 13B, the nodes 1320, 1322 and 1324 transmit a respective root discovery message to the initiating node 1310 after receiving the root discovery message from the initiating node 1310, wherein the nodes 1320, 1322 and 1324 receiving the root discovery message can be called as root candidates. Next, the initiating node 1310 can select one of the root candidates as a root node according to the root discovery responses. In order to provide a clear way of illustrating the concept of the invention, it is assumed that the initiating node 1310 selects the node 1320 as the root node. In FIG. 13C, the initiating node 1310 transmits a first command message to the root node 1320 for instructing the root node 1320 to broadcast a first discovery message.

Figure 13D:
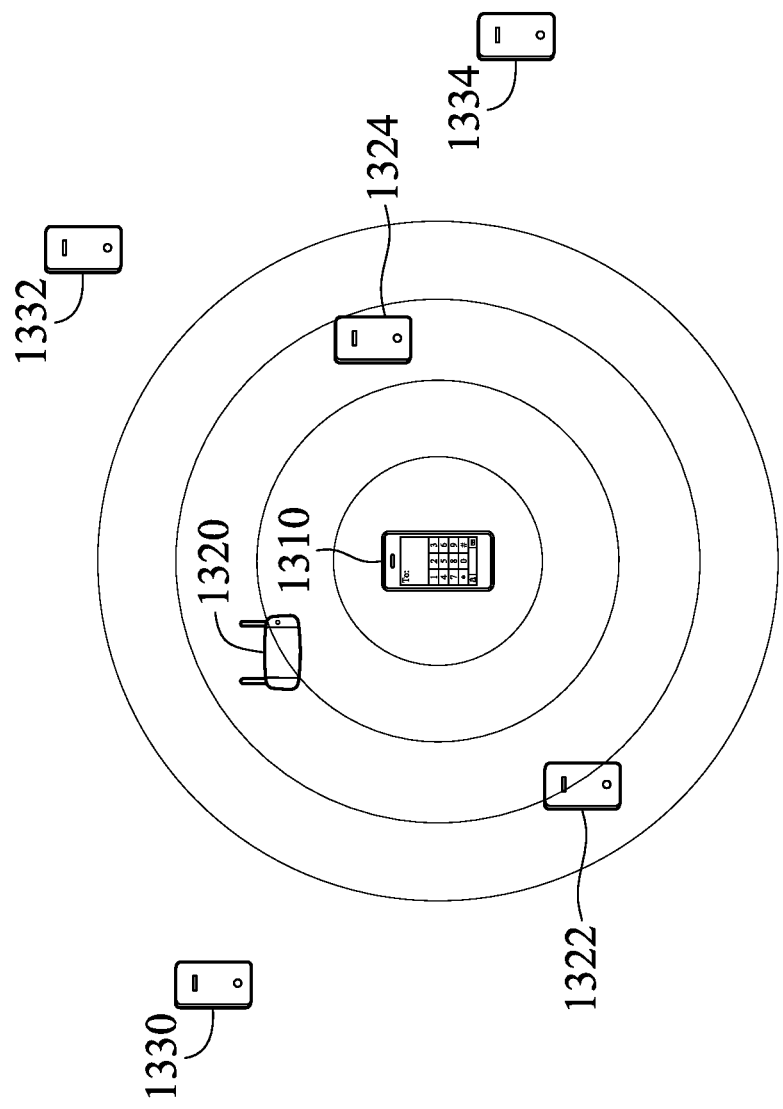
Figure 13E:
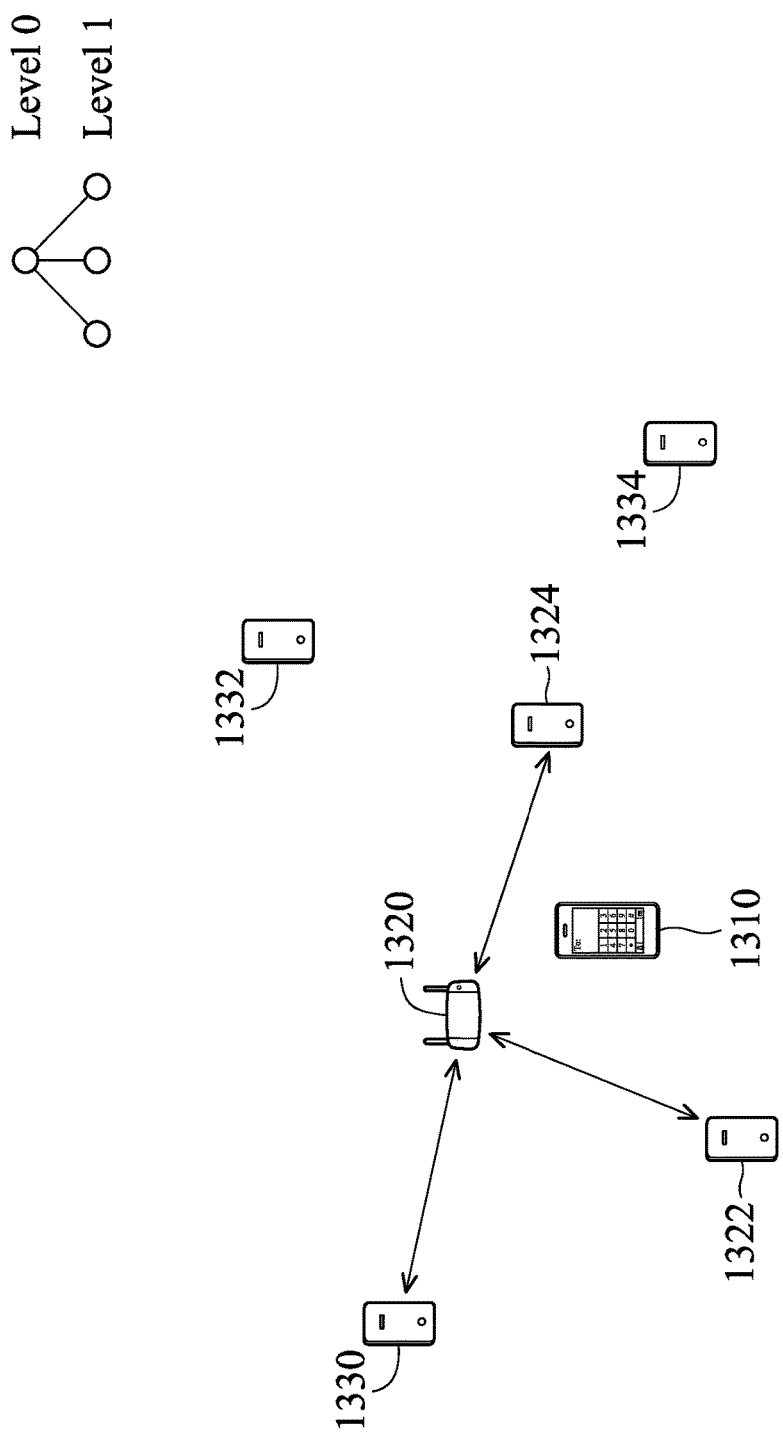
Figure 13F:
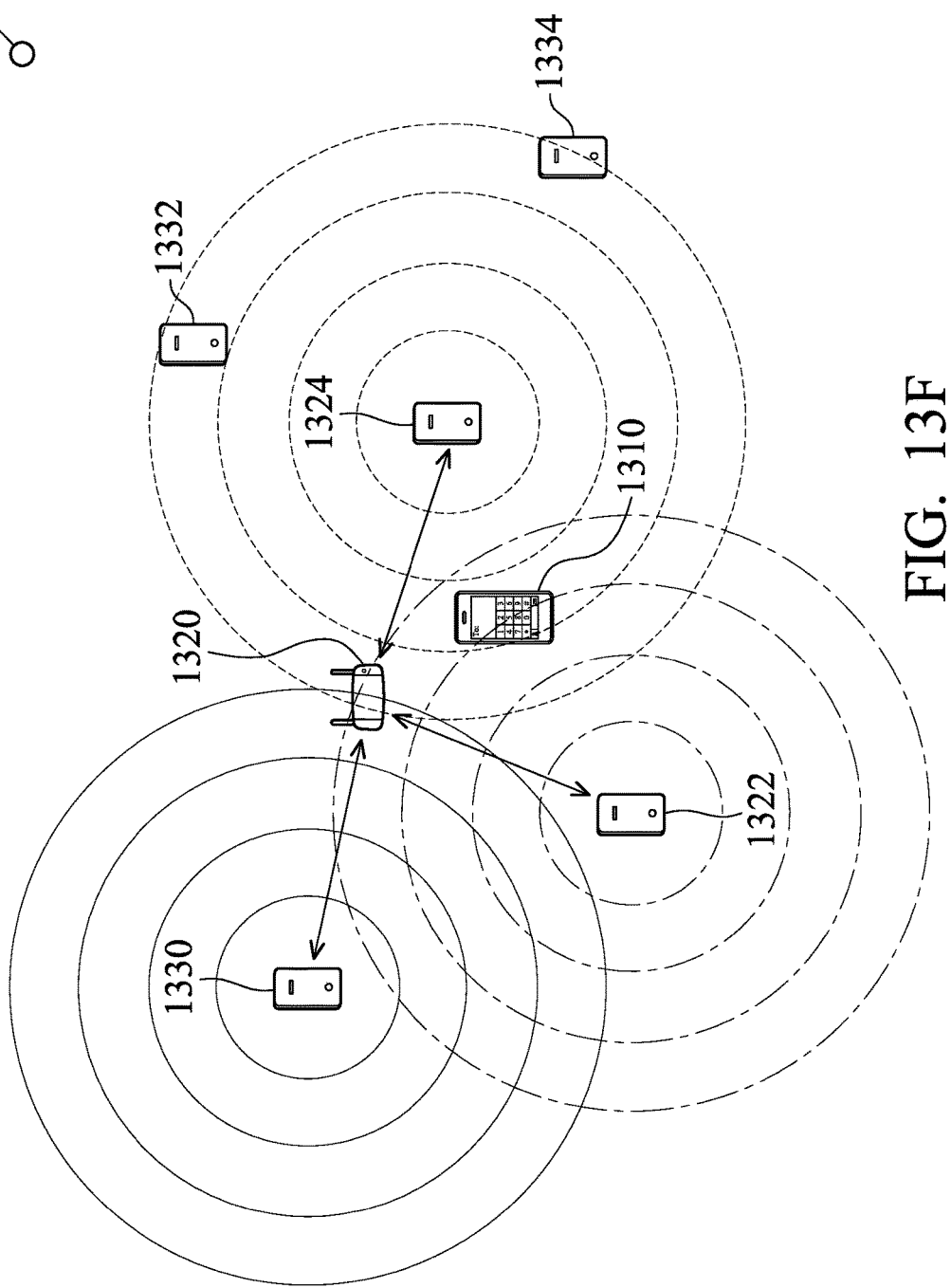
Figure 13G:
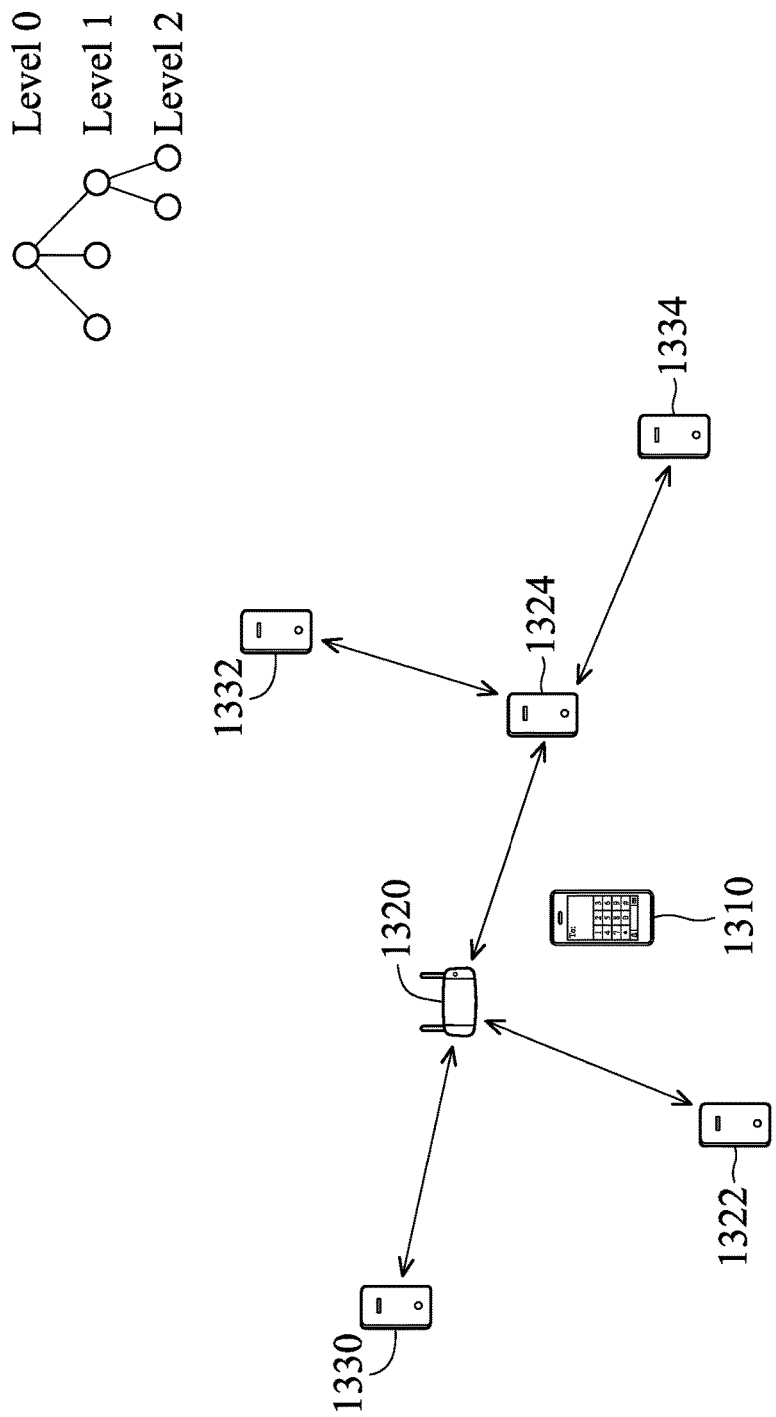

In FIG. 13D, the root node 1320 broadcasts the first discovery message according to the first command message from an initiating node 1310 and starts a second timer using a second timeout value, wherein the second timeout value specifies an amount of time to broadcast the first discovery message. In FIG. 13E, the inner node 1322, 1324 and 1330 transmit a respective first discovery response to the root node 1320 and establish a respective first link with the root node 1320. The corresponding tree topology for root node and the inner nodes is shown at the right side of FIG. 13E. In FIG. 13F, the inner nodes 1320, 1322 and 1324 broadcast a respective second discovery message and start a respective third timer using a respective third timeout value after establishing the respective first link with the root node 1320, wherein the third timeout value specifies an amount of time to broadcast the second discovery message. In FIG. 13G, the outer nodes 1330, 1332 and 1334 transmit a respective second discovery response to the inner nodes 1320, 1322, and 1324 and establish a respective second link with the inner nodes 1320, 1322 and 1324 after transmitting the second discovery response. The corresponding tree topology for the inner nodes and the outer nodes is shown at the right side of FIG. 13G.

Figure 13H:
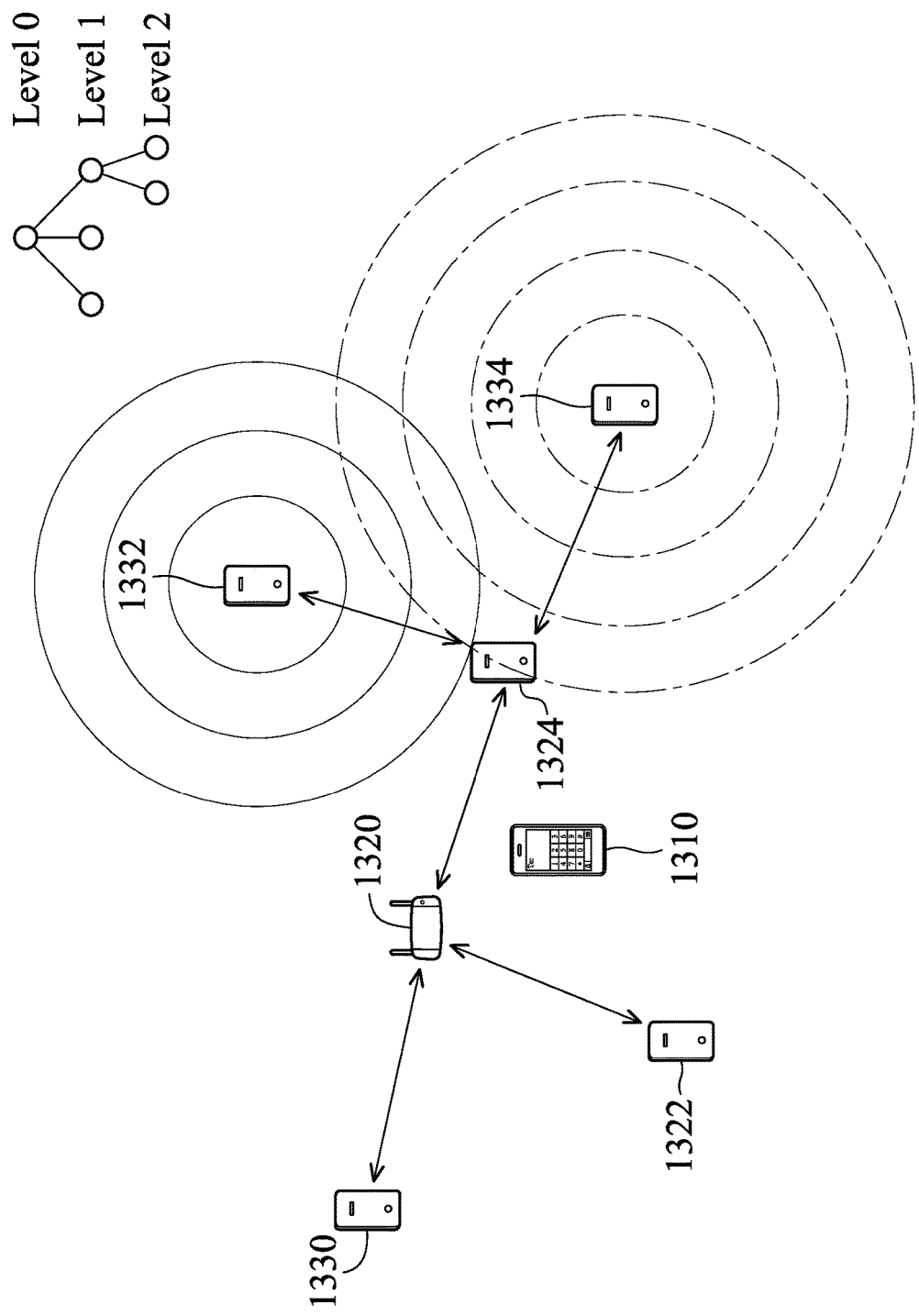

In FIG. 13H, the outer nodes 1330, 1332 and 1334 broadcast a respective fourth discovery message and start a respective fourth timer using a respective fourth timeout value after establishing the respective third link with the inner nodes 1320, 1322 and 1324, wherein the fourth timeout value specifies an amount of time to broadcast the third discovery message.

Figure 13I:
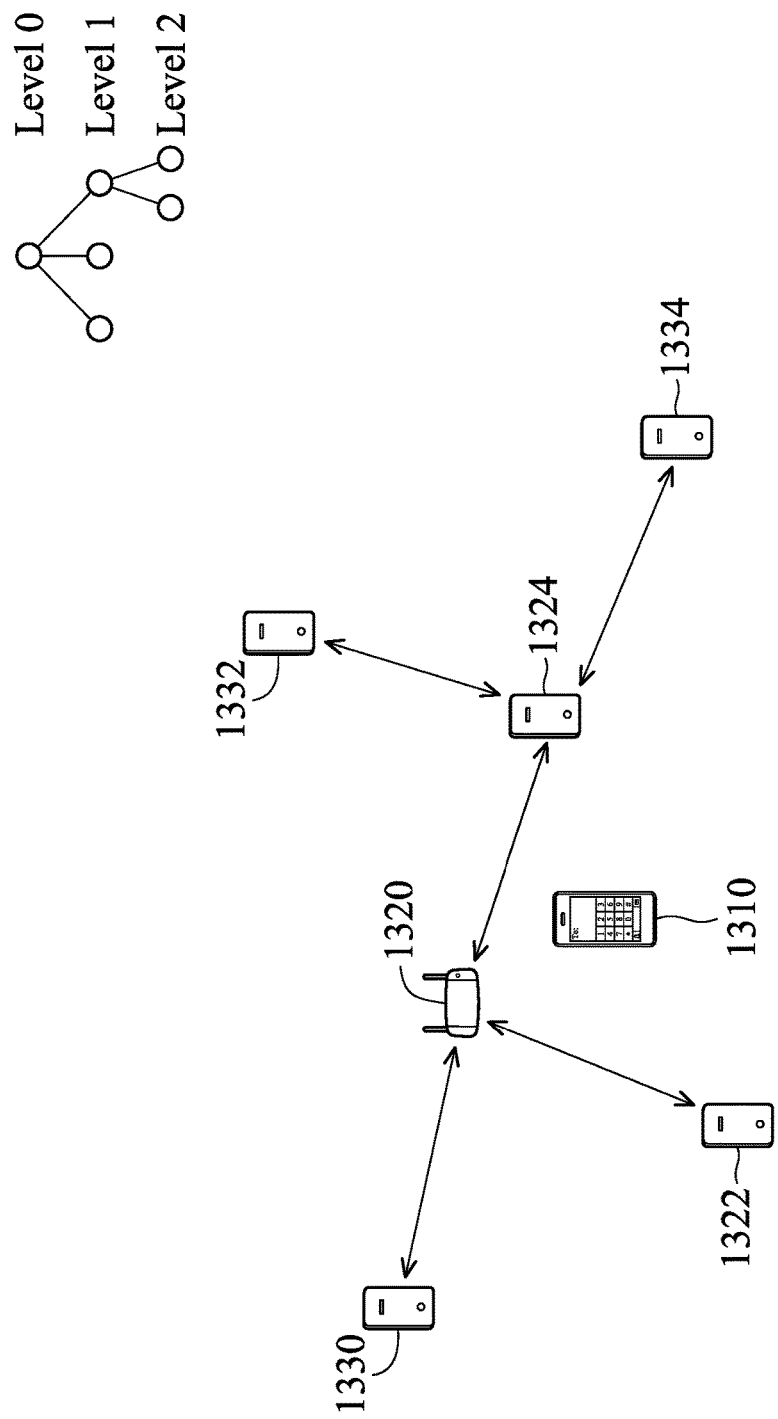

In FIG. 13I, after the respective fourth timeout value of the outer nodes 1330, 1332 and 1334 elapses, the tree topology is completed and is shown at the right side of FIG. 13I. In the tree topology, the root node 1320 is referred to as "level 0." The child nodes are at "level 1" and so on. "Level 1" as used herein is a lower level in the tree topology than "level 0." Likewise, "Level 1" is a higher level in the tree topology than "level 2." Since the initiating node 1310 does not be included in the persistent tree topology network and the persistent tree topology network does not vary with the initiating node 1310, the tree topology network can be considered as a "persistent" tree topology network.

In the embodiment, since the initiating node has to select the root node in advance. The first timeout value is set at a short time than other timeout value, the second timeout value is set at a longer time than the third timeout value, and the third timeout value is set at a longer time than the fourth timeout value, and so on. In other words, the timeout value used by the timer corresponding to the node at the higher level is longer than that at the lower level. Therefore, the persistent tree topology is formed from outside to inside. In addition, it should be noted that every node does not receive another discovery message after receiving one discovery message.

In the embodiment, it is not limited to each timeout value used by each timer. Therefore, the persistent tree topology is formed from inside to outside. In addition, it should be noted that every node does not receive another discovery message after receiving one discovery message.

FIGS. 13J~13P show a joining process, which is how a new node joins the persistent tree topology of FIG. 13I in accordance with one embodiment of the invention. Before the joining process, the initiating node 1310 may receive a trigger invitation message input by a user, wherein the trigger invitation message is used to trigger the joining process.

Figure 13J:
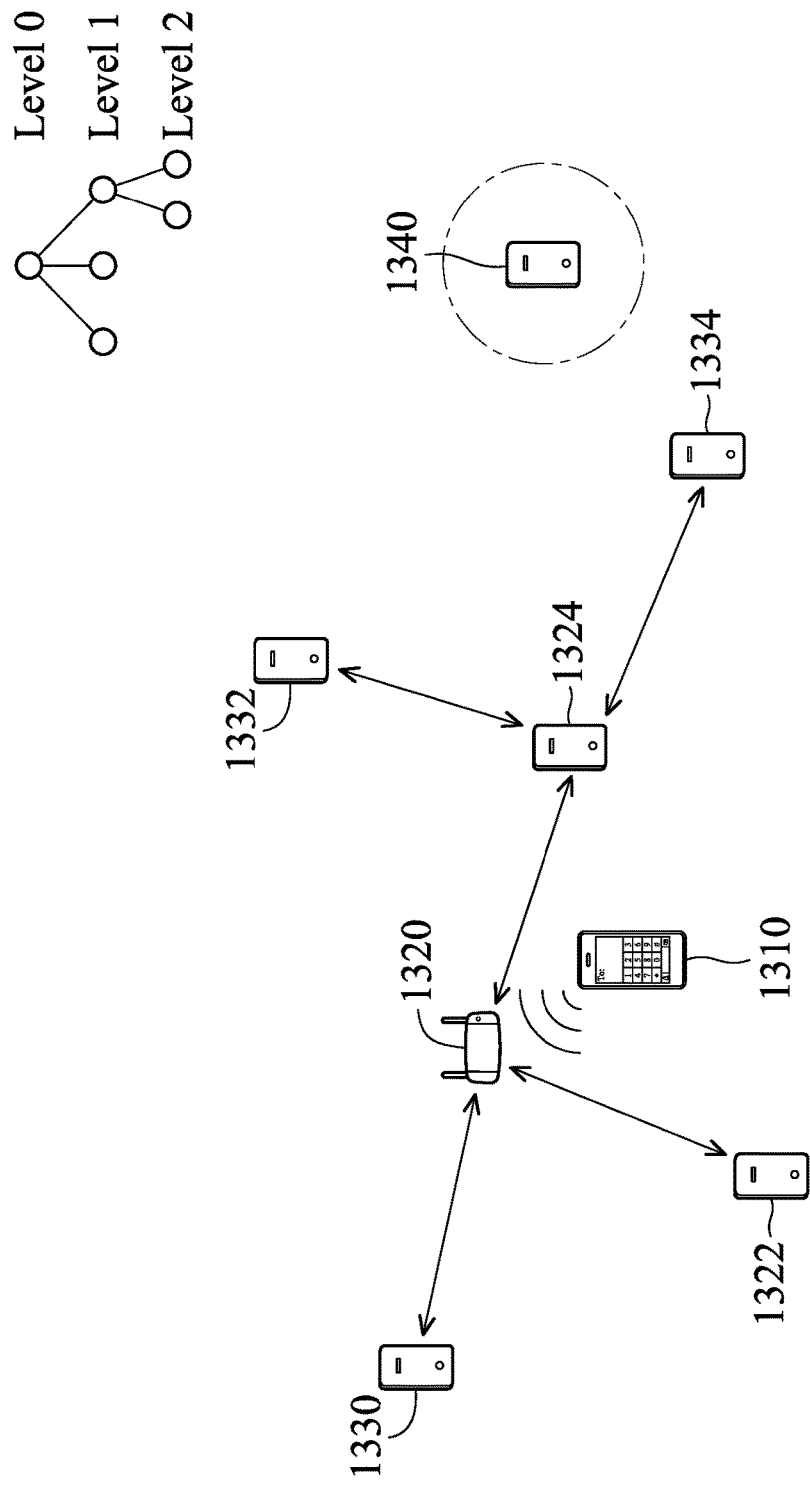
FIGS. 13J~13P show a joining process, which is how a new node joins the persistent tree topology of FIG. 13I in accordance with one embodiment of the invention.

In FIG. 13J, the initiating node 1310 transmits a second command to the root node 1320 to instruct the root node 1320 to broadcast a first invitation message. In another embodiment, the initiating node 1310 can transmit the second command to any node in the lower level in the persistent tree topology network for instructing the specific node in the lower level to broadcast the first invitation message.

Figure 13K:
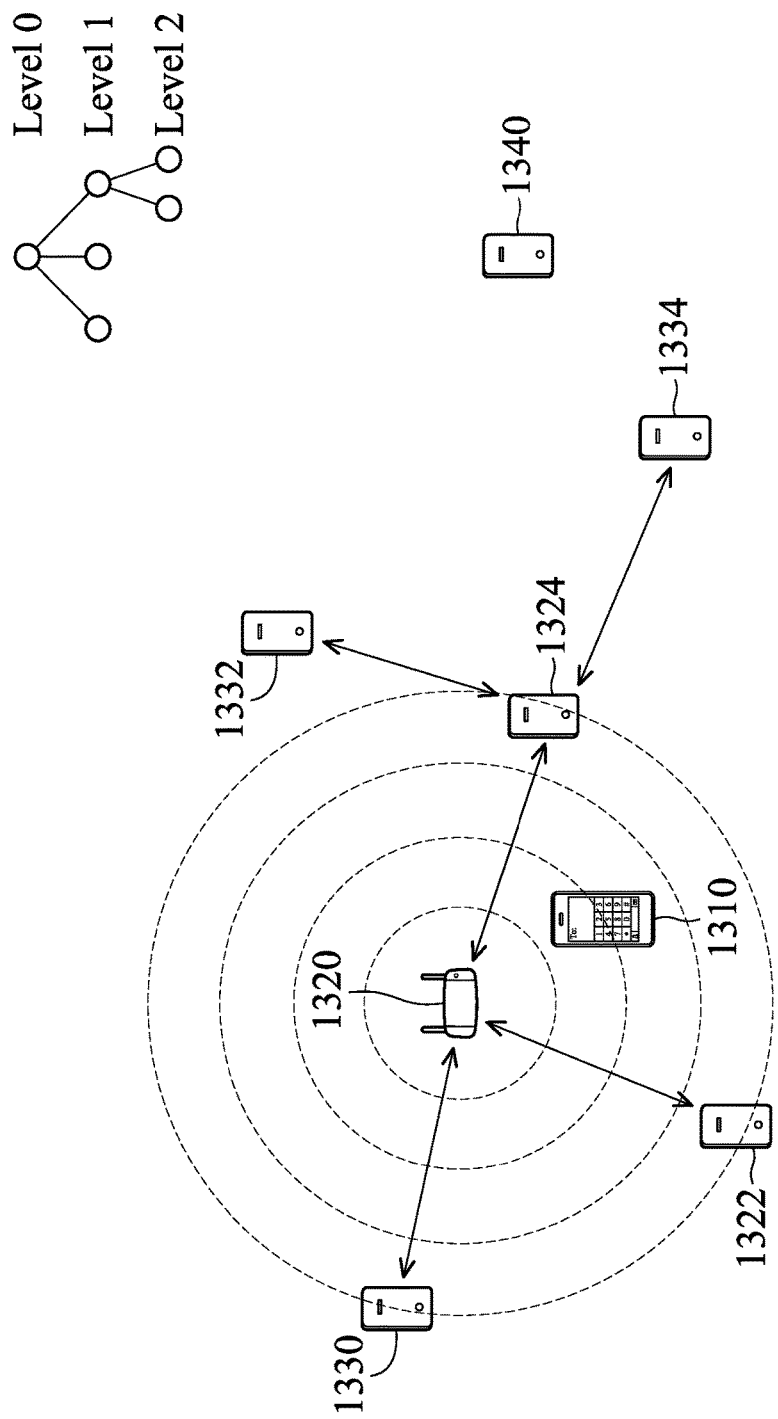
Figure 13L:
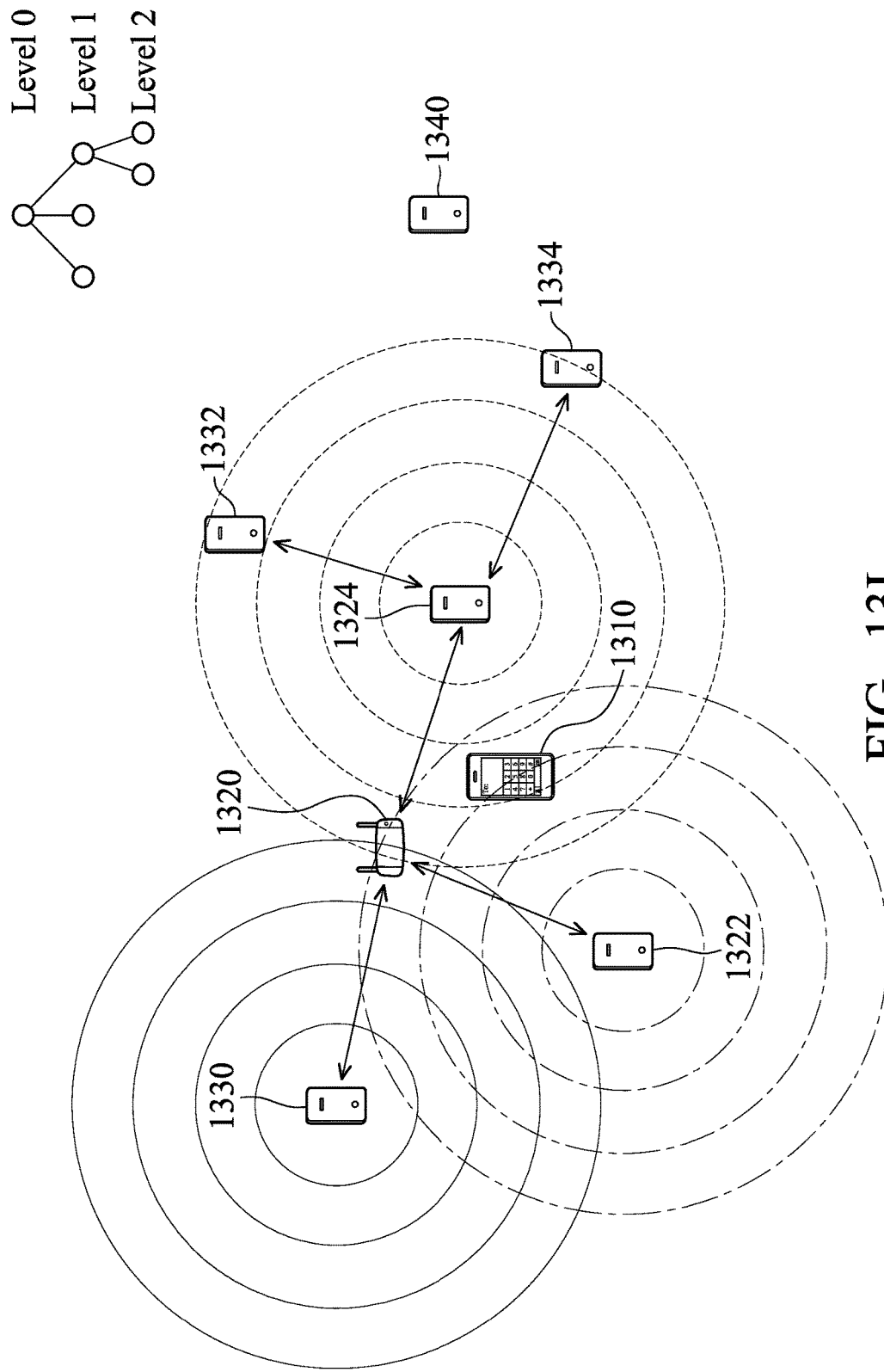
Figure 13M:
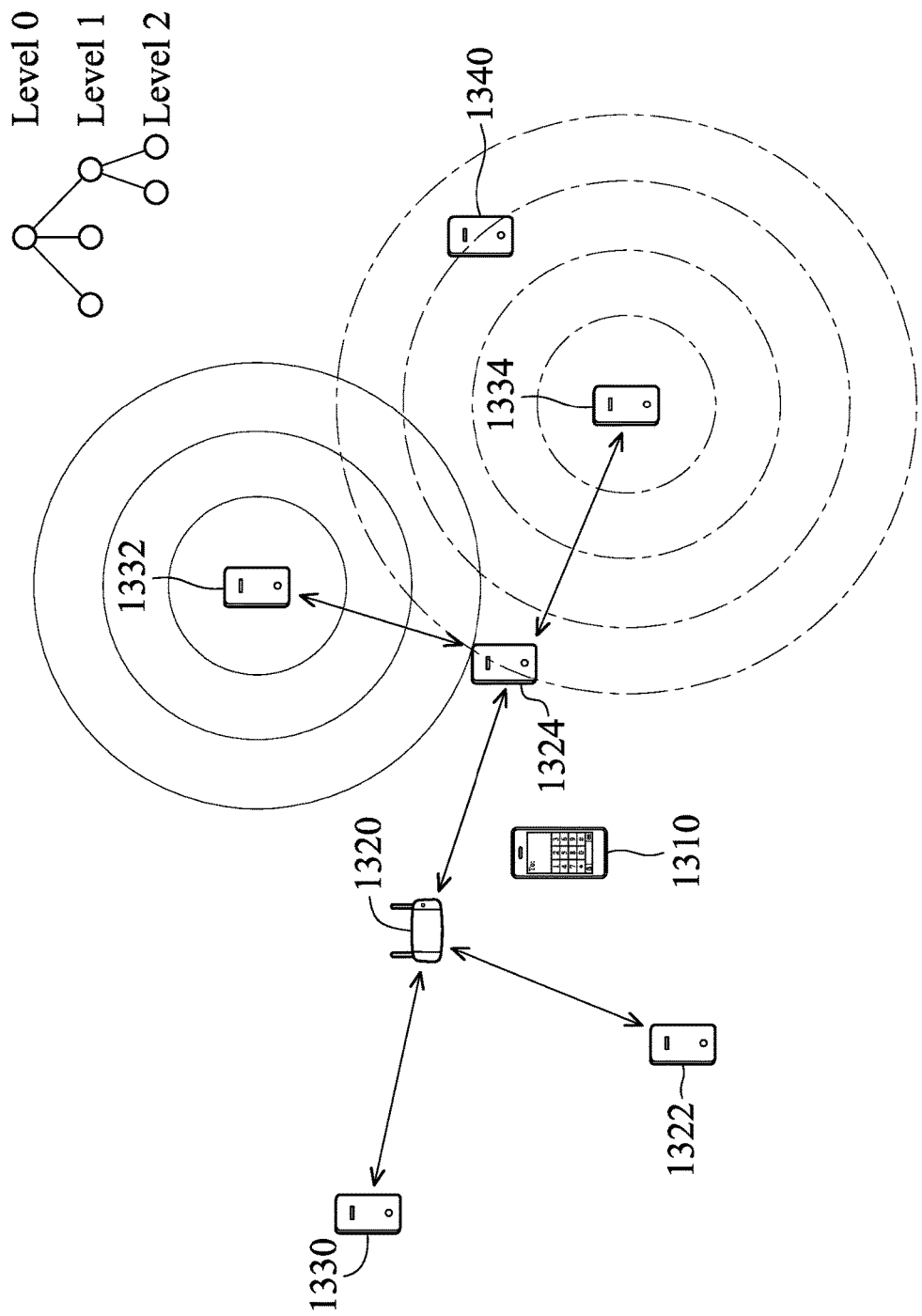

In FIG. 13K, the root node 1320 broadcasts the first invitation message and starts a fifth timer using a fifth timeout value after receiving the second command from the initiating node 1310, wherein the fifth timeout value specifies an amount of time to broadcast the first invitation message. In FIG. 13L, the inner nodes 1322, 1324 and 1330 broadcast a respective second invitation message and starts a sixth timer using a sixth timeout value after receiving the invitation message from the root node 1320, wherein the sixth timeout value specifies an amount of time to broadcast the second invitation message. In FIG. 13M, the outer nodes 1332 and 1334 broadcast a respective third invitation message and starts a seventh timer using a seventh timeout value after receiving the respective second invitation messages from the inner nodes inner nodes 1322, 1324, and 1330, wherein the seventh timeout value specifies an amount of time to broadcast the third invitation message.

Figure 13N:
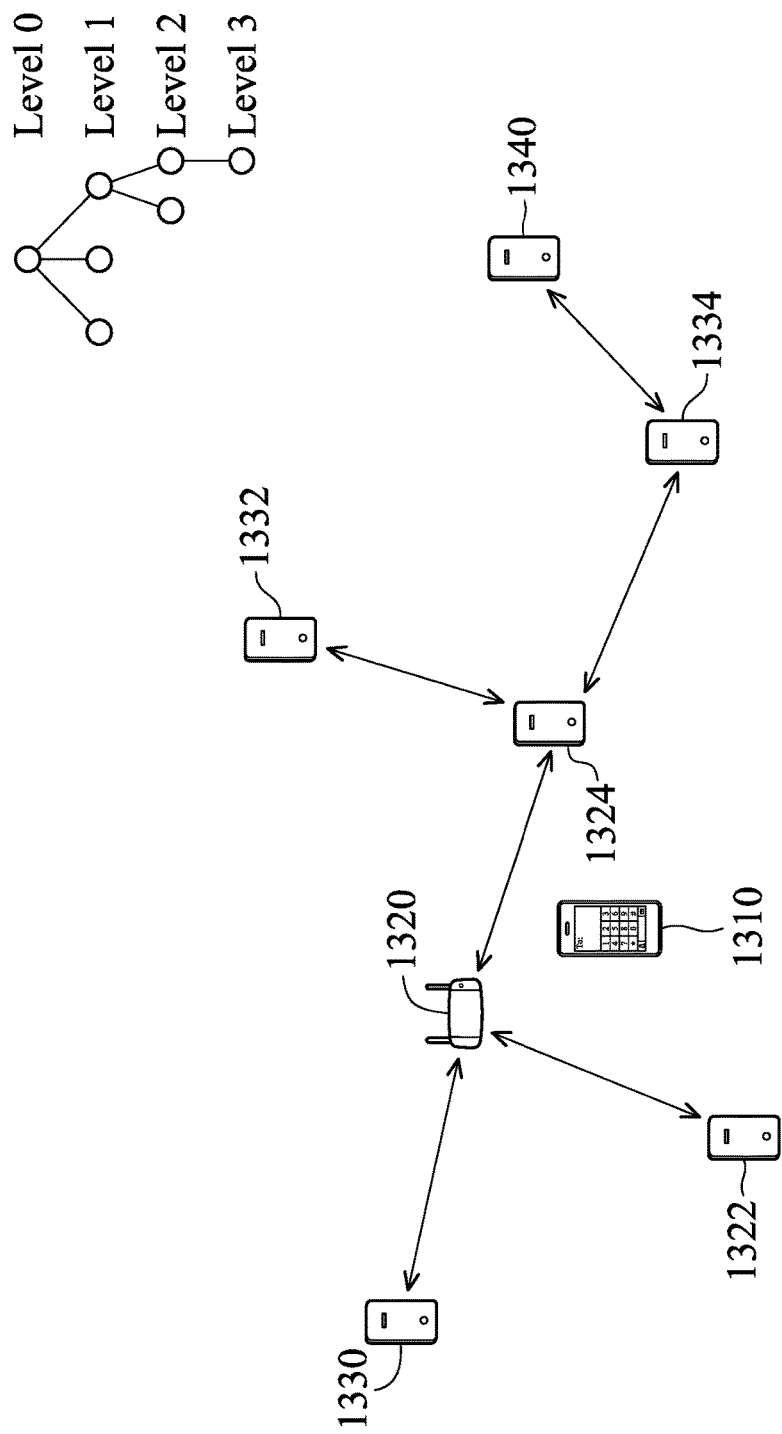
Figure 13O:
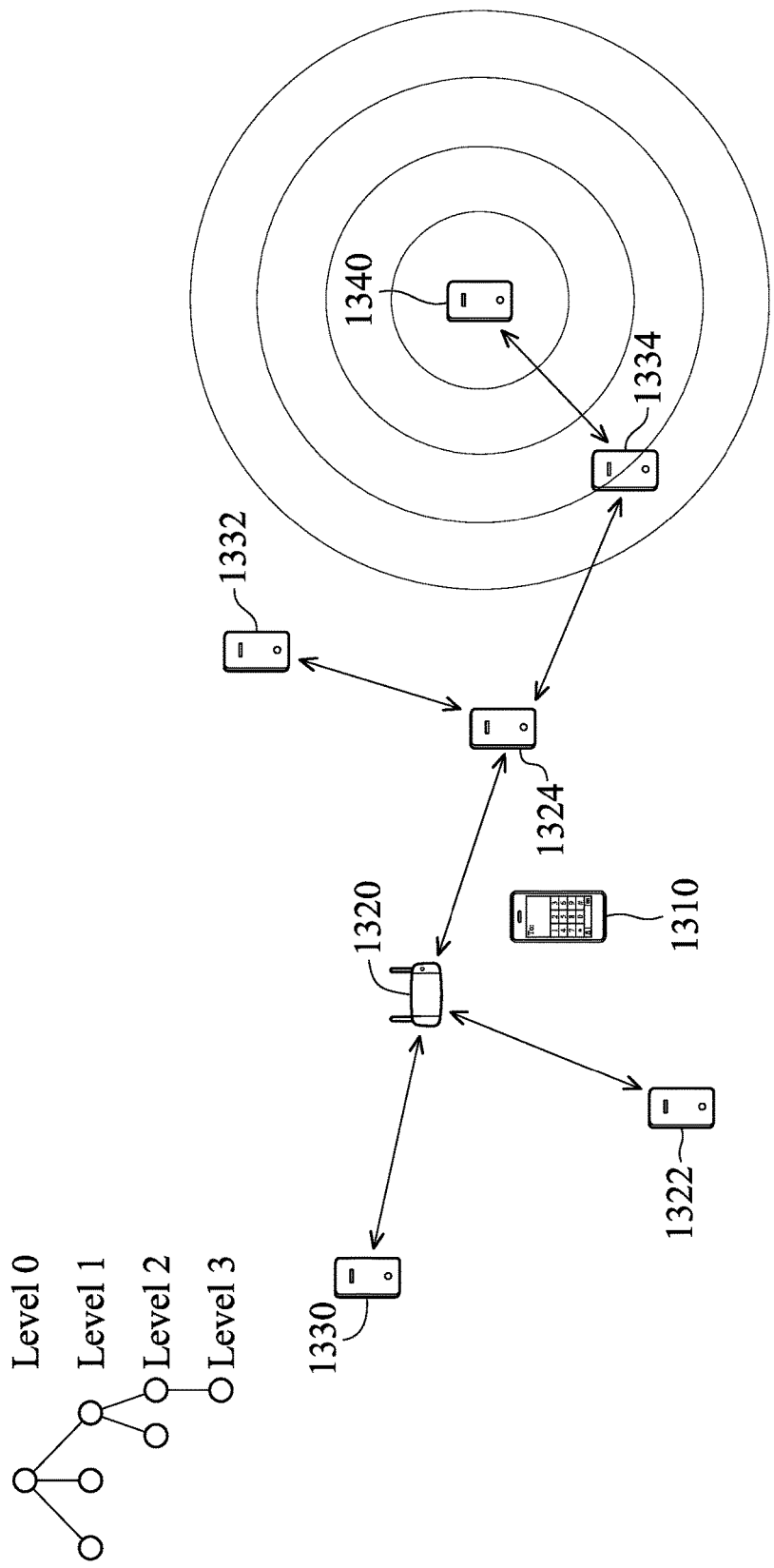
Figure 13P:
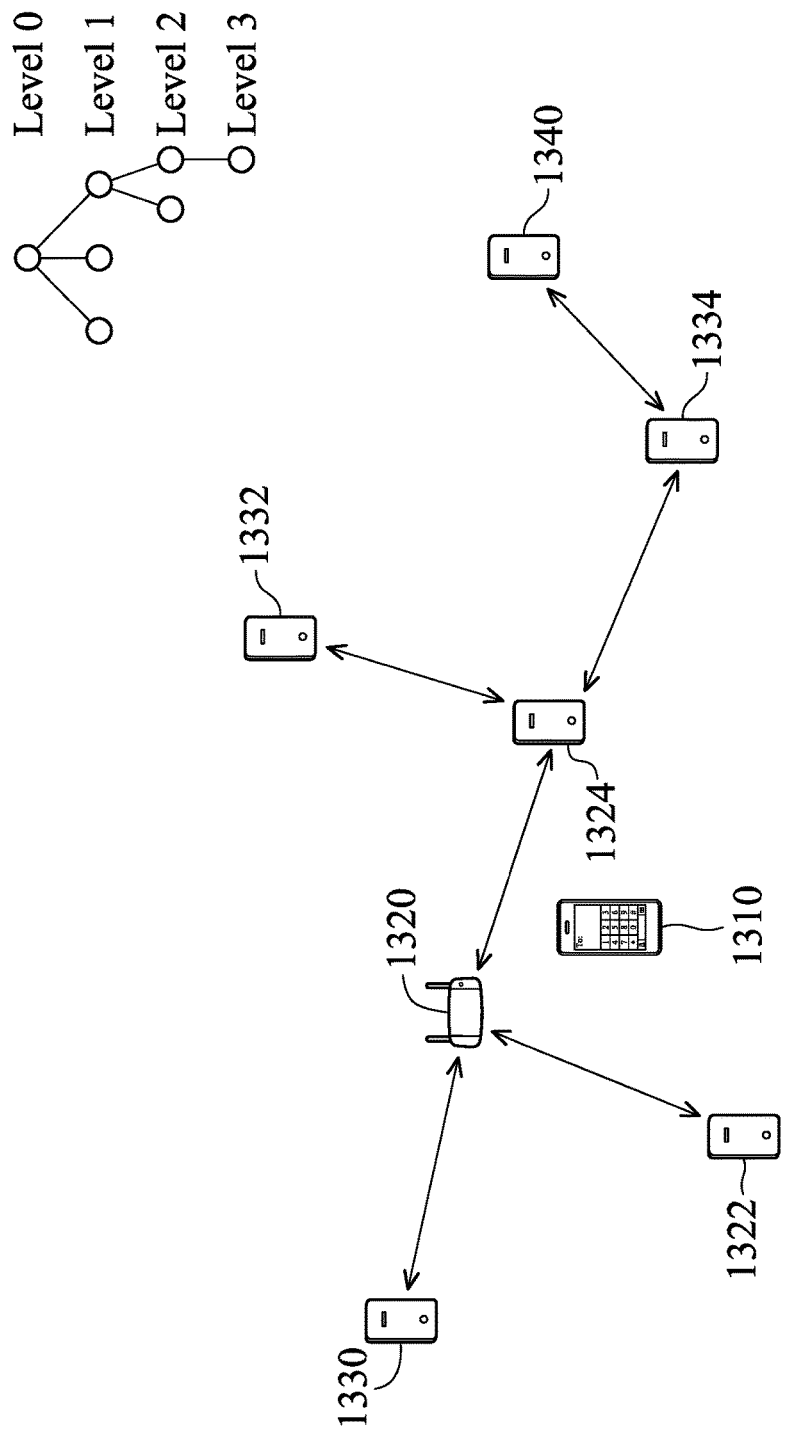

In FIG. 13N, the new node 1340 establishes a new link with the outer node 1334 according to the third invitation response from the outer node 1334. In FIG. 13O, the new node 1340 broadcasts a new invitation message after establishing the new link with the outer node 1334. In FIG. 13P, after all the timeout values elapses, the joining process is completed. The new tree topology is shown at the right side of FIG. 13P. In the new tree topology, since the new node 1340 is connected to the outer node 1334 of level 2, the new node 1340 is at "level 3" in the new tree topology which is lower than level 2.

Figure 14:
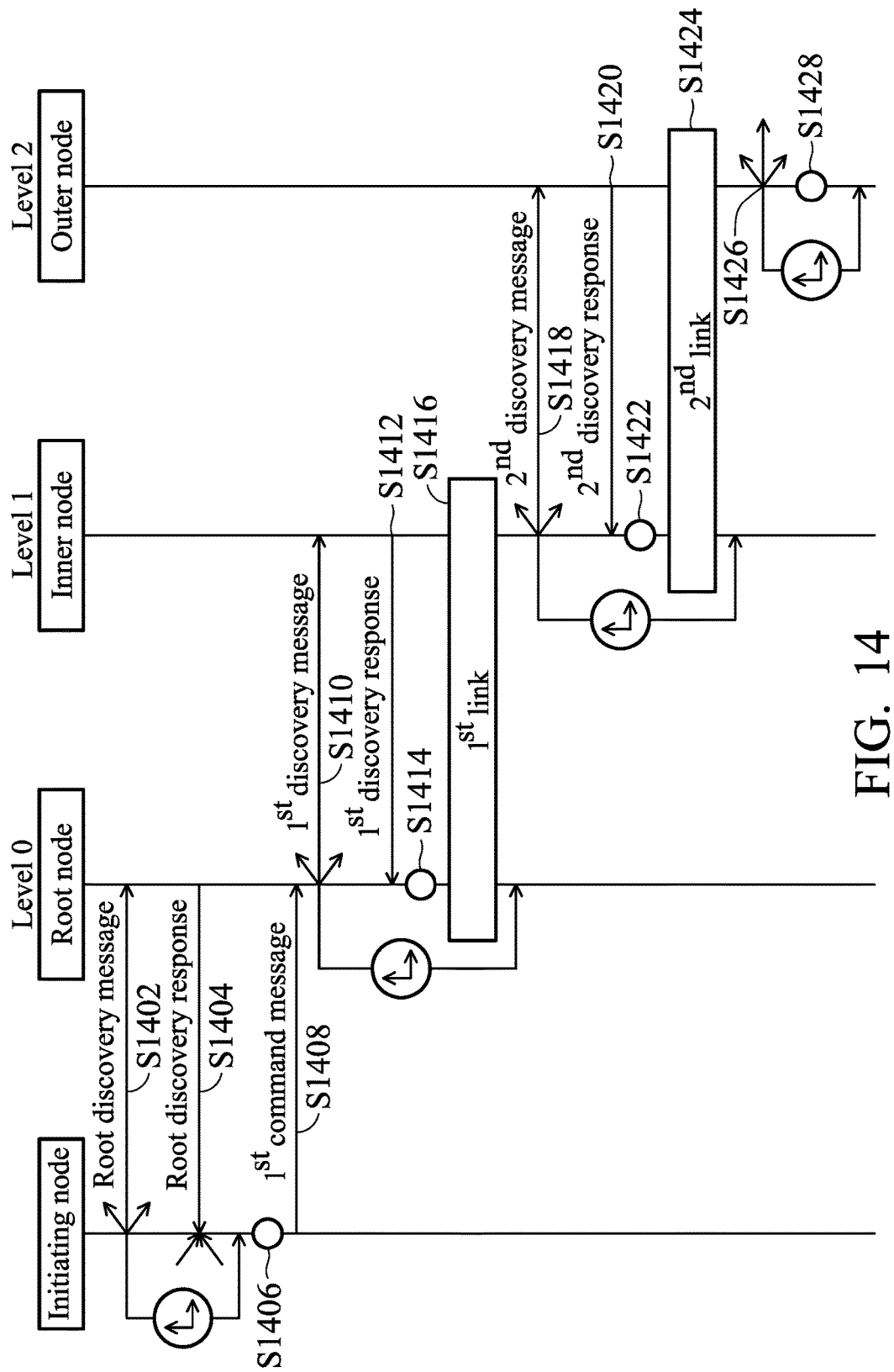
FIG. 14 is a communication flow diagram illustrating a process for self-forming a tree topology network through a persistent and inside-out fashion in accordance with one embodiment of the invention.

FIG. 14 is a communication flow diagram 1400 illustrating a process for self-forming a tree topology network through a persistent and inside-out fashion in accordance with one embodiment of the invention with reference to FIGS. 13A~13I.

In step S1402, the initiating node at level 0 broadcasts a root discovery message, and then starts a first timer using a first timeout value, wherein the first timeout value specifies an amount of time to broadcast the root discovery message. In step S1404, the initiating node at level 0 receives one or more root discovery responses from one or more root candidates. After the first timeout value elapses, in step S1406, the initiating node selects one of the root candidates as a root node according to the root discovery responses. In step S1408, the initiating node transmits a first command message to the root node for instructing the root node to broadcast a first discovery message.

Next, in step S1410, the root node broadcasts the first discovery message and starts a second timer using a second timeout value, wherein the second timeout value specifies an amount of time to broadcast the first discovery message. In step S1412, an inner node at level 1 transmits a first discovery response to the initiating node for establishing a first link with the root node according to the first discovery message. In step S1414, the root node at level 0 determines whether the root node receives one or more first discovery responses from one or more nodes at a lower level which is lower than level 0. In step S1416, the root node establishes the first link with the inner node at level 1.

In step S1418, the inner node broadcasts a second discovery message and starts a third timer using a third timeout value after establishing the first link with the root node, wherein the third timeout value specifies an amount of time to broadcast the second discovery message. In step S1420, an outer node at level 2 transmits a second discovery response to the inner node at level 1 for establishing a second link with the inner node according to the second discovery message. In step S1422, the inner node at level 1 may determine whether the inner node receives one or more second discovery responses from one or more outer nodes at level 2. In step S1424, the inner node establishes the second link with the outer node after determining the inner node receives the second discovery response from the outer node at level 2.

In step S1426, the outer node at level 2 broadcasts a third discovery message and then starts a fourth timer using a fourth timeout value after establishing the second link with the inner node, wherein the fourth timeout value specifies an amount of time to broadcast the third discovery message. In step S1428, the outer node at level 2 determines whether the outer node receives one or more third discovery responses from one or more nodes at a lower level which is lower than level 2. When the outer node at level 2 determines that the outer node does not receive any third discovery responses from the nodes at the lower level which is lower than level 2 and the fourth timeout value elapses, the process for self-forming the persistent tree topology network is complete.

Figure 15:
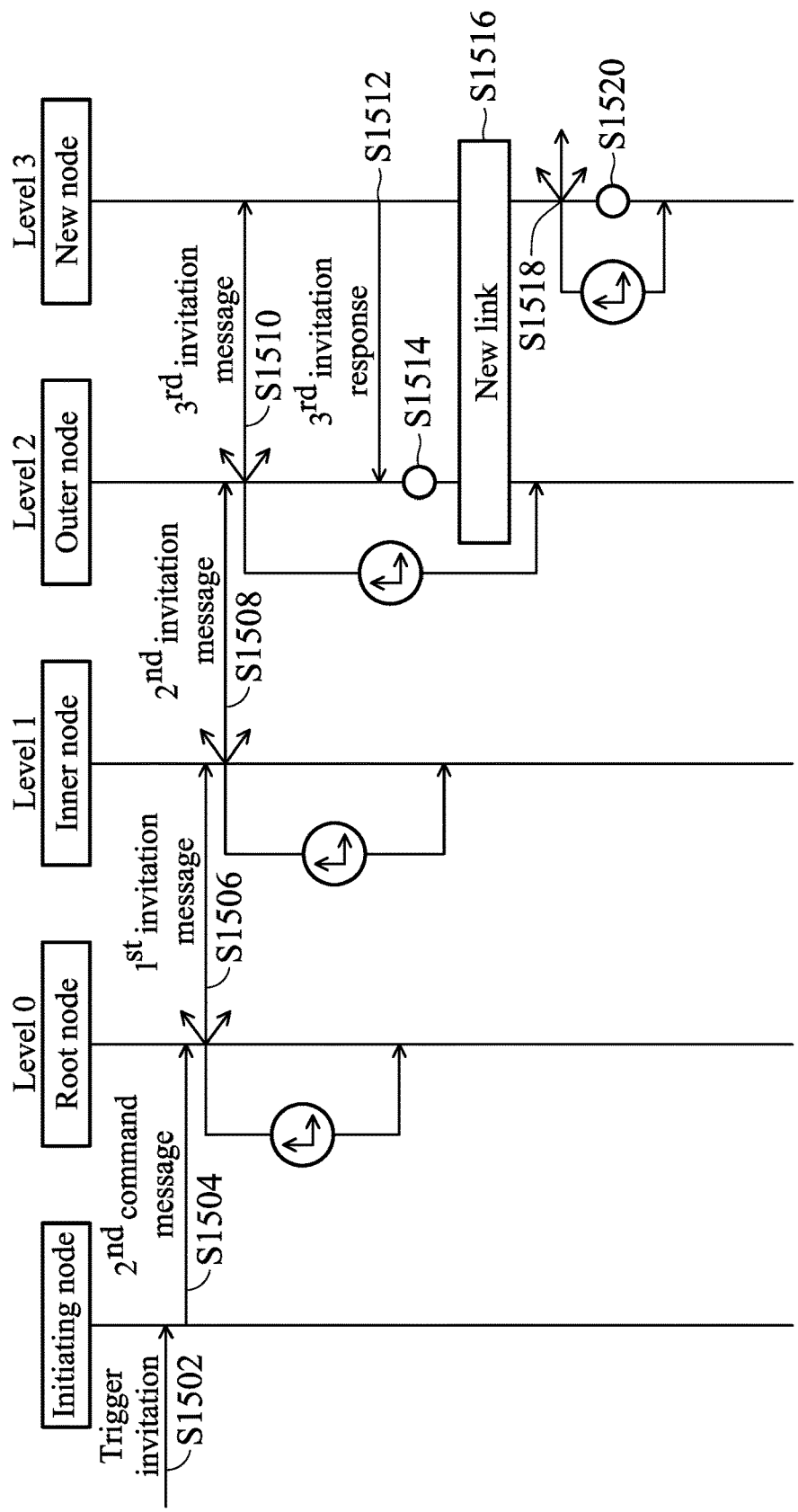
FIG. 15 is a communication flow diagram illustrating a joining process of a new node in the persistent tree topology network shown in FIG. 14 in accordance with one embodiment of the invention.

FIG. 15 is a communication flow diagram 1500 illustrating a joining process of a new node in the persistent tree topology network shown in FIG. 14 in accordance with one embodiment of the invention with reference to FIGS. 13J~13P.

After the persistent tree topology network is complete, the initiating node can be triggered to perform the joining process of a new node. In step S1502, the initiating node at level 0 may receive a trigger invitation message from a user. In step S1504, the initiating node transmits a second command message to the root node for instructing the root node to broadcast a first invitation message. In step S1506, the root node broadcasts the first invitation message, and then starts a fifth timer using a fifth timeout value after receiving the second command message from the initiating node, wherein the fifth timeout value specifies an amount of time to broadcast the first invitation message. In step S1508, the inner node at level 1 can broadcast a sixth invitation message and then starts a sixth timer using a sixth timeout value after receiving the first invitation message, wherein the sixth timeout value specifies an amount of time to broadcast the second invitation message. In step S1510, the outer node at level 2 can broadcast a third invitation message and then starts a seventh timer using a seventh timeout value after receiving the second invitation message, wherein the seventh timeout value specifies an amount of time to broadcast the third invitation message. In step S1512, a new node can transmit a third invitation response to the outer node to establish a new link with the outer node according to the third invitation message. In step S1514, the outer node at level 2 determines whether the outer node receives a third discovery response from the new node at a lower level which is lower than level 2. When the outer node at level 2 determines that the outer node receives the third discovery response from the new node, in step S1516, the outer node establishes the new link with the new node according to the third discovery response.

In step S1518, the new node broadcasts a new invitation message and starts a new timer using a new timeout value after establishing the new link with the outer node, wherein the new timeout value specifies an amount of time to broadcast the new invitation message. In step S1520, the new node determines whether the new node receives one or more new invitation responses from another new node. If the new node does not receive any new invitation responses and the new timeout value elapses, the joining process of the new node process is complete. Since the new node establishes the new link with the outer node at level 2, the new node becomes a leaf node at level 3 in the persistent tree topology network.

Figure 16:
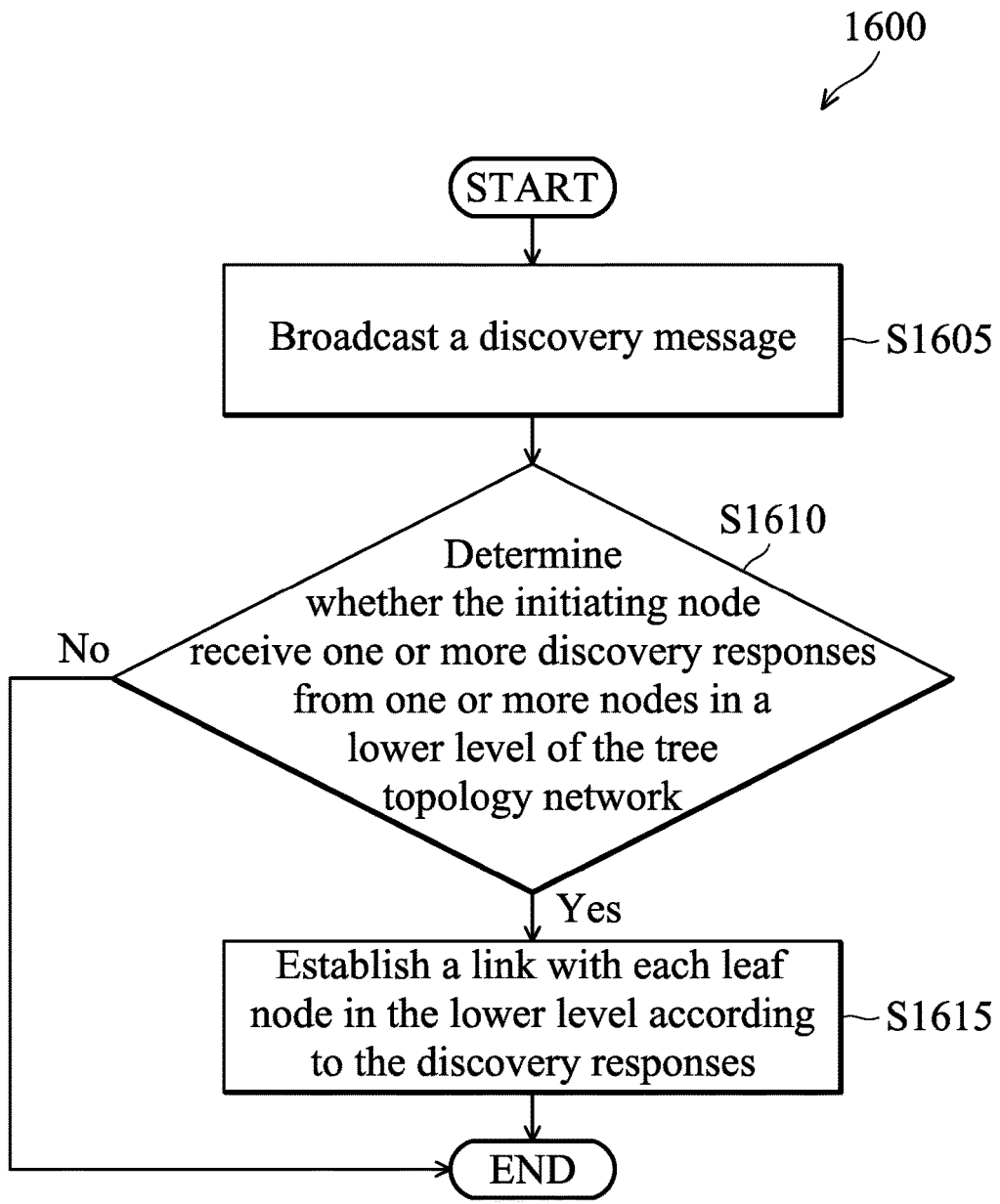
FIG. 16 is a flow chart illustrating a method for self-forming a tree topology network according to an embodiment of the invention with reference to the communication flow diagrams in FIGS. 5 and 11.

FIG. 16 is a flow chart 1600 illustrating a method for self-forming a tree topology network according to an embodiment of the invention with reference to the communication flow diagrams in FIGS. 5 and 11. It should be noted that the method can be performed by the initiating node of FIGS. 5 and 11.

First, in step S1605, the initiating node broadcasts a discovery message. In step S1610, the initiating node determines whether the initiating node receives one or more discovery responses from one or more nodes in a lower level of the tree topology network. When determining that the initiating node receives the discovery responses from the nodes in the lower level ("Yes" in step S1610), in step S1615, the initiating node establishes a link with each node in the lower level according to the discovery responses. Otherwise, the flow ends.

Figure 17:
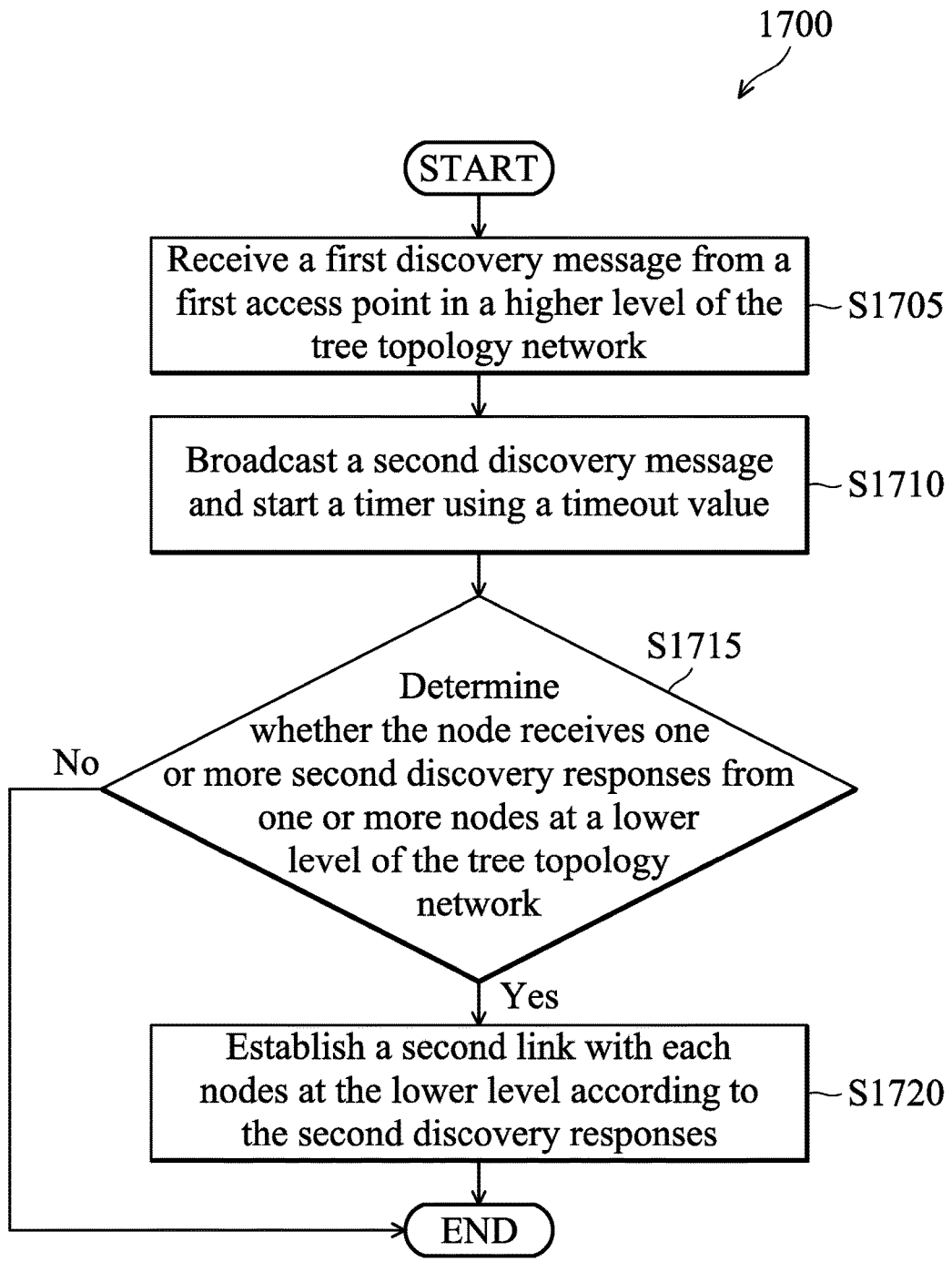
FIG. 17 is a flow chart illustrating a method for self-forming a tree topology network according to an embodiment of the invention with reference to the communication flow diagrams in FIGS. 5 and 8.

FIG. 17 is a flow chart 1700 illustrating a method for self-forming a tree topology network according to an embodiment of the invention with reference to the communication flow diagrams in FIGS. 5 and 8. It should be noted that the method can be performed by the node in the lower level of FIGS. 5 and 8.

First, in step S1705, the node receives a first discovery message from a first access point in a higher level of the tree topology network. In one embodiment, the first access point can be a root node. In step S1710, the node broadcasts a second discovery message and starts a timer using a timeout value, wherein the timeout value specifies an amount of time to broadcast the second discovery message. Then, in step S1715, the node determines whether the node receives one or more second discovery responses from one or more nodes at a lower level of the tree topology network. When determining that the node receives the second discovery responses from other nodes in the lower level ("Yes" in step S1715), in step S1720, the node establishes a second link with each nodes at the lower level according to the second discovery responses. Otherwise, the flow ends.

Figure 18:
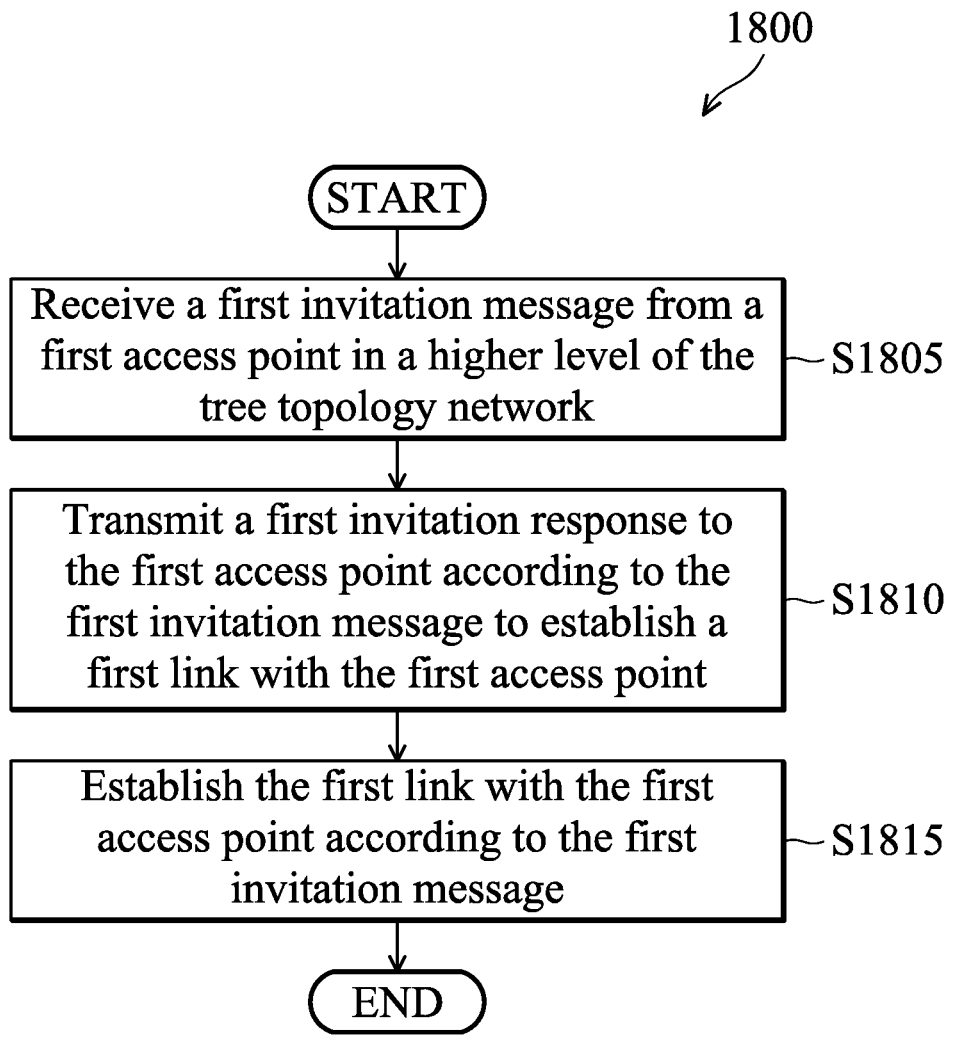
FIG. 18 is a flow chart illustrating a method for self-forming a tree topology network according to an embodiment of the invention with reference to the communication flow diagrams in FIGS. 6 and 9.

FIG. 18 is a flow chart 1800 illustrating a method for self-forming a tree topology network according to an embodiment of the invention with reference to the communication flow diagrams in FIGS. 6 and 9. It should be noted that the method can be performed by the new node of FIGS. 6 and 9.

First, in step S1805, the new node receives a first invitation message from a first access point in a higher level of the tree topology network. In step S1810, the new node transmits a first invitation response to the first access point according to the first invitation message to establish a first link with the first access point. In step S1815, the new node establishes the first link with the first access point according to the first invitation message.

Figure 19:
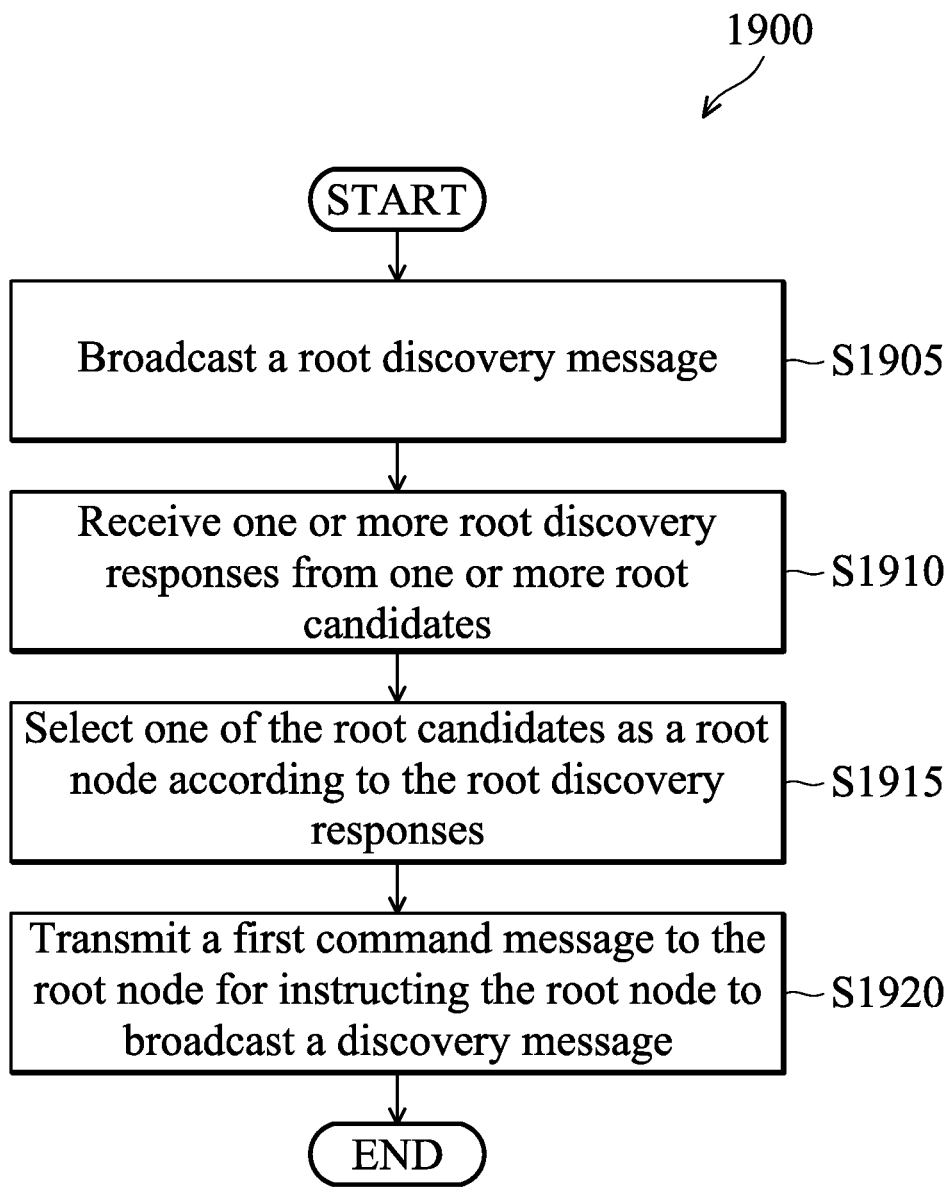
FIG. 19 is a flow chart illustrating a method for self-forming a tree topology network according to an embodiment of the invention with reference to the communication flow diagrams in FIGS. 8 and 14.

FIG. 19 is a flow chart 1900 illustrating a method for self-forming a tree topology network according to an embodiment of the invention with reference to the communication flow diagrams in FIGS. 8 and 14. It should be noted that the method can be performed by the initiating node of FIGS. 8 and 14.

First, in step S1905, the initiating node broadcasts a root discovery message. In step S1910, the initiating node receives one or more root discovery responses from one or more root candidates. Next, in step S1915, the initiating node selects one of the root candidates as a root node according to the root discovery responses. In step S1920, the initiating node transmits a first command message to the root node for instructing the root node to broadcast a discovery message.

Figure 20:
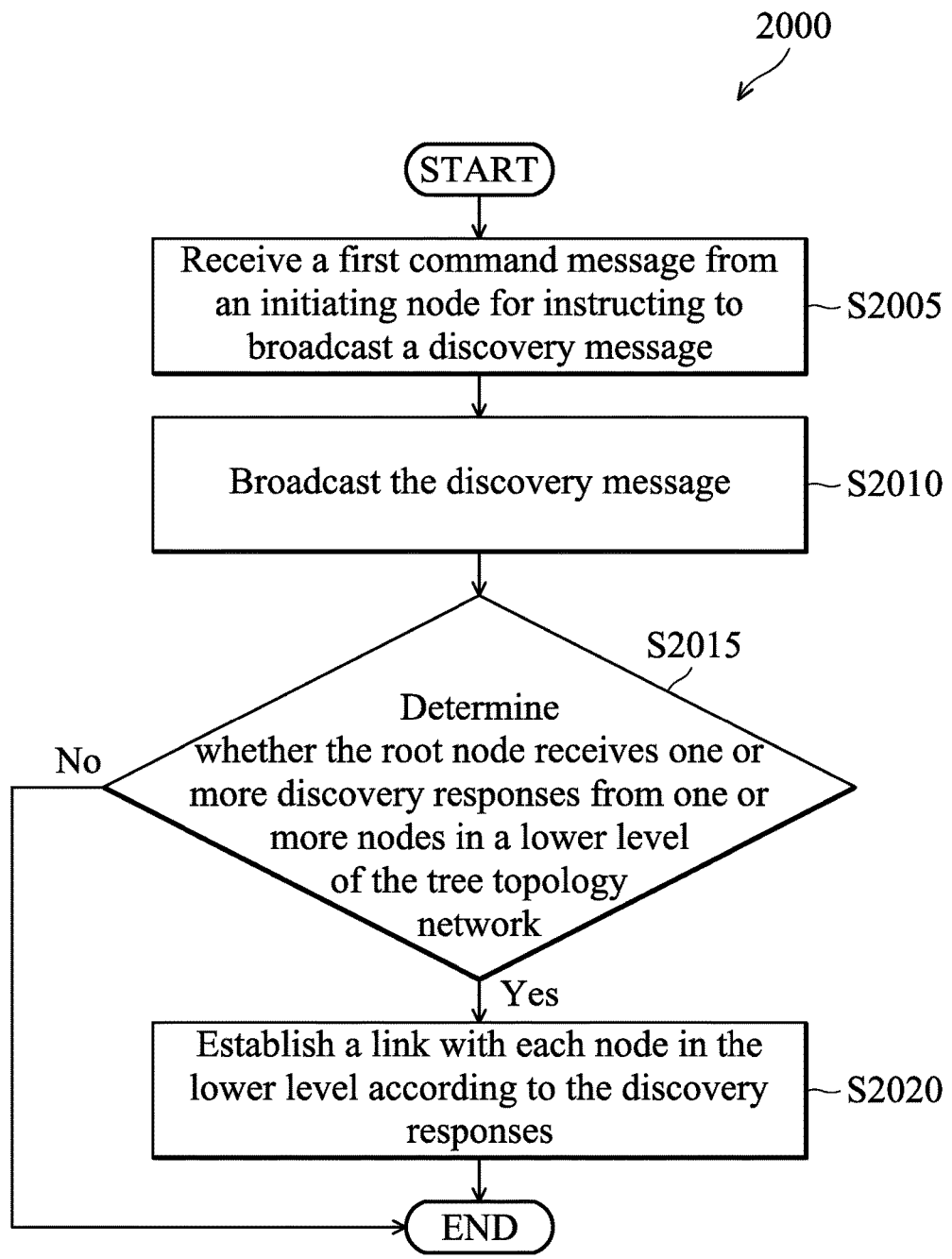
FIG. 20 is a flow chart illustrating a method for self-forming a tree topology network according to an embodiment of the invention with reference to the communication flow diagrams in FIGS. 8 and 14.

FIG. 20 is a flow chart 2000 illustrating a method for self-forming a tree topology network according to an embodiment of the invention with reference to the communication flow diagrams in FIGS. 8 and 14. It should be noted that the method can be performed by the root node of FIGS. 8 and 14.

First, in step S2005, the root node receives a first command message from an initiating node for instructing to broadcast a discovery message. In step S2010, the root node broadcasts the discovery message. Next, in step S2015, the root node determines whether the root node receives one or more discovery responses from one or more nodes in a lower level of the tree topology network. When determining that the root node receives the second discovery responses from other nodes in the lower level ("Yes" in step S2015), in step S2020, the root node establishes a link with each node in the lower level according to the discovery responses. Otherwise, the flow ends.

Figure 21:
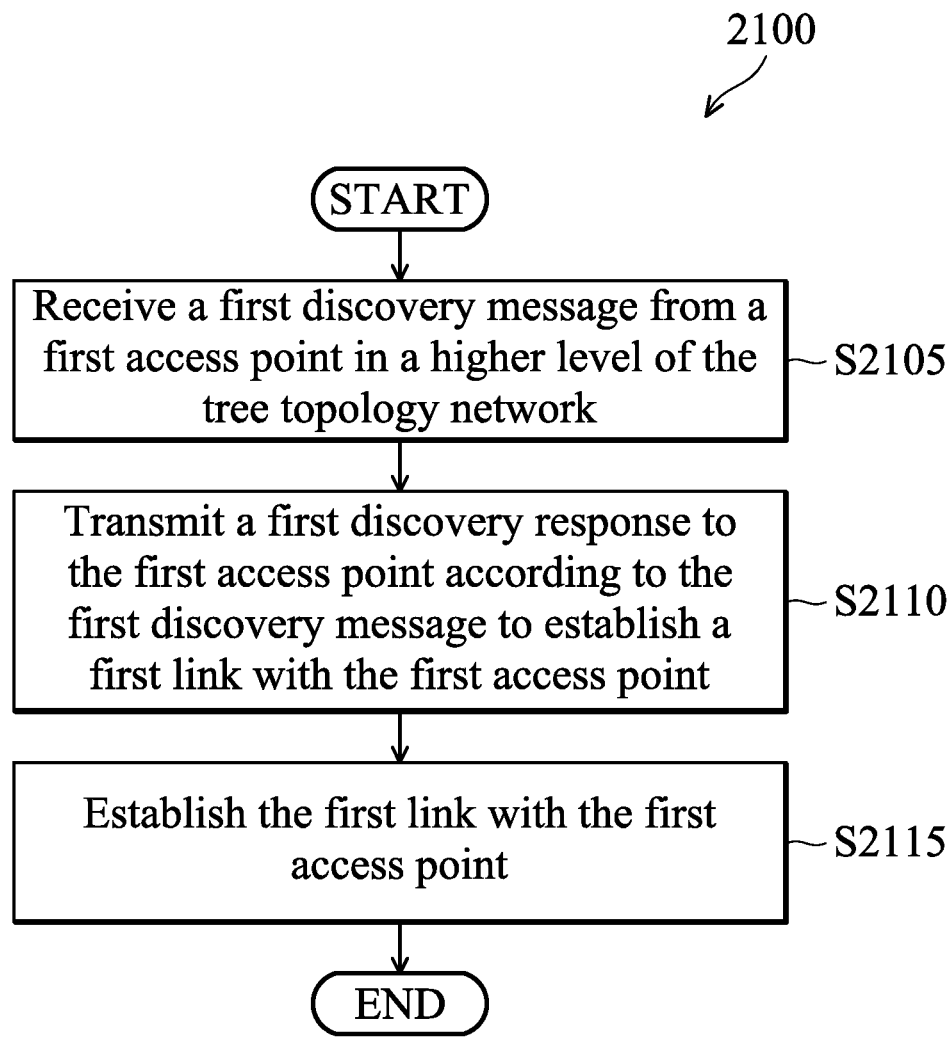
FIG. 21 is a flow chart illustrating a method for self-forming a tree topology network according to an embodiment of the invention with reference to the communication flow diagrams in FIGS. 11 and 14.

FIG. 21 is a flow chart 2100 illustrating a method for self-forming a tree topology network according to an embodiment of the invention with reference to the communication flow diagrams in FIGS. 11 and 14. It should be noted that the method can be performed by the child node of FIGS. 11 and 14.

First, in step S2105, the child node receives a first discovery message from a first access point in a higher level of the tree topology network. In one embodiment, the first access point can be a root node. In step S2110, the child node transmits a first discovery response to the first access point according to the first discovery message to establish a first link with the first access point. In step S2115, the child node establishing the first link with the first access point.

In addition, the processor 208 can execute the program code 212 to perform all of the above-described actions and steps or others described herein.

As described above, the tree topology network can be self-formed without human intervention.

Various aspects of the invention have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those with skill in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any specific order or hierarchy of steps in any disclosed process is an example of a sample approach. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the invention. In some aspects a computer program product may comprise packaging materials.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method executed in a receiving communication apparatus in a self-forming tree topology network, wherein a root node broadcasts a discovery message and starts a first timer using a first timeout value that specifies an amount of time to broadcast the discover message, the method comprising:
    receiving the discovery message broadcasted by the root node;
    broadcasting a second discovery message and starting a second timer using a second timeout value, wherein the second timeout value specifies an amount of time to broadcast the second discovery message;
    determining whether the receiving communications apparatus receives one or more second discovery responses from one or more second nodes at a lower level of the tree topology network;
    establishing a second link with each second node in the lower level according to the second discovery responses before the second timeout value of the receiving communications apparatus elapses;
    transmitting a discovery response to the root node after the second timeout value of the receiving communications apparatus elapses; and
    establishing a first link with the root node,
    wherein the first timeout value is set for a longer time than the second timeout value.

2. The method as claimed in claim 1, further comprising:
    broadcasting, by the root node, an invitation message;
    determining, by the root node, whether the root node receives one or more new invitation response from one or more new nodes; and
    establishing the first link with each new node according to the new invitation responses.

3. The method as claimed in claim 2, wherein before broadcasting the invitation message, the method further comprises:
    starting, by the root node, a third timer using a third timeout value,
    wherein the third timeout value specifies an amount of time to broadcast the invitation message.

4. The method as claimed in claim 1, further comprising:
    receiving, by a first new node, a first invitation message from the root node in a higher level of the tree topology network;

transmitting, by the first new node, a first invitation response to the root node according to the first invitation message to establish a first new link with the root node; and establishing, by the first new node, the first new link with the root node according to the first invitation message.

5. The method as claimed in claim 4, wherein after receiving the first invitation message, the method further comprises:

broadcasting, by the first new node, a second invitation message;

determining, by the first new node, whether the first new node receives one or more second invitation responses from one or more new nodes; and establishing, by the first new node, a second new link with each new node in the lower level according to the second invitation responses.

6. The method as claimed in claim 4, further comprising:

broadcasting, by the first new node, a second invitation message;

determining, by the first new node, whether the first new node receives one or more second invitation responses from one or more new nodes in the lower level; and establishing, by the first new node, a second new link with each new node in the lower level according to the second invitation responses.

7. A method for self-forming a tree topology network, used in a communications apparatus and a receiving communications apparatus, the method comprising:

receiving, by the communications apparatus, a first command message from an initiating node for instructing to broadcast a discovery message;

broadcasting, by the communications apparatus, the discovery message and starting a first timer using a first timeout value, wherein the first timeout value specifies an amount of time to broadcast the discovery message;

receiving, by the receiving communications apparatus, the discovery message from the communications apparatus;

broadcasting, by the receiving communications apparatus, a second discovery message and starting a second timer using a second timeout value, wherein the second timeout value specifies an amount of time to broadcast the second discovery message;

determining, by the receiving communications apparatus, whether the receiving communications apparatus receives one or more second discovery responses from one or more second nodes at a lower level of the tree topology network;

establishing, by the receiving communications apparatus, a second link with each second node in the lower level according to the second discovery responses before the second timeout value of the receiving communications apparatus elapses;

transmitting, by the receiving communications apparatus, a second discovery response to the communications apparatus after the second timeout value of the receiving communications apparatus elapses; and establishing, by the communications apparatus, a first link with the receiving communications apparatus according to the second discovery responses before the first timeout value of the communications apparatus elapses, wherein the first timeout value is set for a longer time than the second timeout value.

8. The method as claimed in claim 7, comprising:

receiving, by the communications apparatus, a second command message for instructing to broadcast an invitation message;

broadcasting, by the communications apparatus, the invitation message;

determining, by the communications apparatus, whether the communications apparatus receive one or more invitation responses from one or more new nodes in the lower level; and establishing, by the communications apparatus, a new link with each new node in the lower level according to the invitation responses.

9. The method as claimed in claim 7, wherein before receiving the first command message, the method further comprises:

receiving, by the communications apparatus, a root discovery message from the initiating node; and transmitting, by the communications apparatus, a root discovery response to the initiating node according to the root discovery message.

10. The method as claimed in claim 7, further comprising:

receiving, by a first new node, a first invitation message from the communications apparatus in a higher level of the tree topology network;

transmitting, by the first new node, a first invitation response to the communications apparatus according to the first invitation message to establish a first new link with the communications apparatus; and establishing, by the first new node, the first new link with the communications apparatus according to the first invitation message.

11. The method as claimed in claim 10, wherein after receiving the first invitation message, the method further comprises:

broadcasting, by the first new node, a second invitation message;

determining, by the first new node, whether the first new node receives one or more second invitation responses from one or more new nodes; and establishing, by the first new node, a second new link with each new node in the lower level according to the second invitation responses.

12. The method as claimed in claim 10, wherein after establishing the first new link with the communications apparatus, the method further comprises:

broadcasting, by the first new node, a second invitation message;

determining, by the first new node, whether the first new node receives one or more second invitation responses from one or more new nodes in the lower level; and establishing, by the first new node, a second new link with each new node in the lower level according to the second invitation responses.

* * * * *